US010089531B2

(12) United States Patent
Lee et al.

(10) Patent No.: US 10,089,531 B2
(45) Date of Patent: Oct. 2, 2018

(54) MOBILE TERMINAL AND METHOD FOR OPERATING THE SAME

(71) Applicant: LG Electronics Inc., Seoul (KR)

(72) Inventors: Juhyun Lee, Seoul (KR); Byoungzoo Jeong, Seoul (KR); Suyoung Lee, Seoul (KR); Eugene Myung, Seoul (KR); Nayeoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 27 days.

(21) Appl. No.: 15/093,999

(22) Filed: Apr. 8, 2016

(65) Prior Publication Data
US 2017/0068857 A1   Mar. 9, 2017

(30) Foreign Application Priority Data
Sep. 7, 2015   (KR) .................. 10-2015-0126176

(51) Int. Cl.
*H04N 5/222* (2006.01)
*G06K 9/00* (2006.01)
(Continued)

(52) U.S. Cl.
CPC ..... *G06K 9/00684* (2013.01); *G06F 17/3028* (2013.01); *G06F 17/30117* (2013.01);
(Continued)

(58) Field of Classification Search
CPC ........... H04N 5/23293; G06K 9/00684; G06K 9/00691; G06K 9/00697; G06K 9/00704;
G06F 17/3028; G06F 17/30265; G06F 17/30268; G06F 17/30106; G06F 17/30115; G06F 17/30117
See application file for complete search history.

(56) References Cited

U.S. PATENT DOCUMENTS 8,477,228 B2 * 7/2013 Stallings ............ H04N 1/00132
348/207.1
8,498,451 B1 * 7/2013 Agopian ........... H04M 1/27455
382/118

(Continued)

OTHER PUBLICATIONS

Kaji et al., "Location-Aware Reminders with Personal Life Content on Place-Enhanced Blogs," Springer-Verlag Berlin Heidelberg, 2008, 5373:164-177, 14 pages.
(Continued)

*Primary Examiner* — Ngoc-Yen Vu
(74) *Attorney, Agent, or Firm* — Fish & Richardson P.C.

(57) ABSTRACT

A method of operating a mobile terminal includes obtaining at least one image and determining event information that is to be associated with the obtained at least one image. The method also includes storing, in computer memory, the obtained at least one image and information that associates the obtained at least one image with the event information. The method additionally includes detecting an event on the mobile terminal, and determining that the detected event corresponds to the event information. The method further includes displaying, on a display of the mobile terminal and based on the determination that the detected event corresponds to the event information, a first image among the at least one image that has been stored and associated with the event information.

18 Claims, 47 Drawing Sheets

(51) Int. Cl.
    *G06F 17/30* (2006.01)
    *H04M 1/725* (2006.01)
    *H04N 1/21* (2006.01)
    *H04N 5/232* (2006.01)
    *H04N 5/235* (2006.01)
    *H04W 88/02* (2009.01)

(52) U.S. Cl.
    CPC .. *G06F 17/30265* (2013.01); *H04M 1/72522* (2013.01); *H04N 1/2125* (2013.01); *H04N 5/23293* (2013.01); *H04M 2250/22* (2013.01); *H04M 2250/74* (2013.01); *H04W 88/02* (2013.01)

(56) References Cited

U.S. PATENT DOCUMENTS

| | | | | |
|---|---|---|---|---|
| 8,520,907 | B2* | 8/2013 | Lai | H04M 1/575 348/14.02 |
| 8,730,337 | B2* | 5/2014 | Inoue | H04N 1/00244 348/211.5 |
| 8,831,352 | B2* | 9/2014 | Gao | G06K 9/00671 382/115 |
| 9,104,915 | B2* | 8/2015 | Conwell | G06F 17/30265 |
| 9,232,194 | B2* | 1/2016 | Kuroki | H04N 7/18 |
| 9,407,860 | B2* | 8/2016 | Barnes, Jr. | H04N 5/77 |
| 9,525,789 | B2* | 12/2016 | Dwan | H04N 1/00453 |
| 2009/0113340 | A1 | 4/2009 | Bender | |
| 2011/0099199 | A1* | 4/2011 | Stalenhoef | G06F 17/3028 707/770 |
| 2012/0220314 | A1* | 8/2012 | Altman | G06Q 30/0207 455/456.3 |
| 2012/0251011 | A1 | 10/2012 | Gao et al. | |
| 2013/0265450 | A1 | 10/2013 | Barnes, Jr. | |
| 2016/0028944 | A1* | 1/2016 | Ikeda | H04N 5/23219 348/239 |

OTHER PUBLICATIONS

Extended European Search Report in European Application No. 16178506.8, dated Feb. 07, 2017, 9 pages (with English translation).

* cited by examiner

FIG. 6C
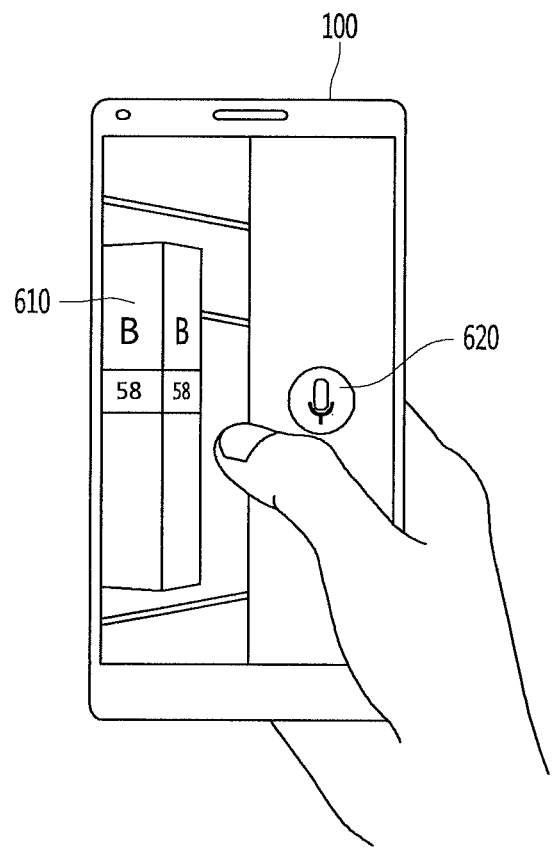
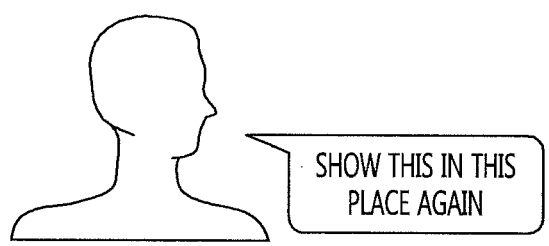
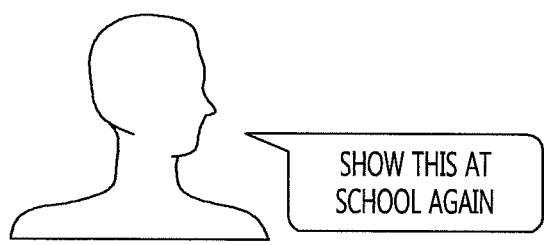

FIG. 7B
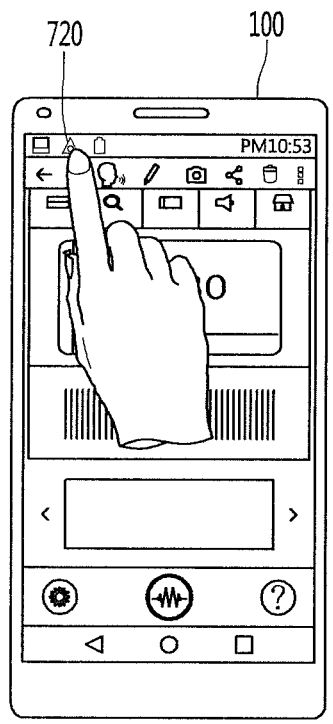
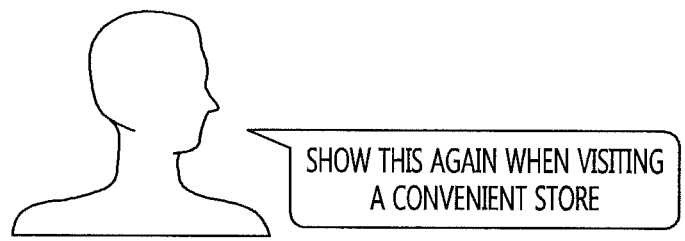
SHOW THIS AGAIN WHEN VISITING A CONVENIENT STORE

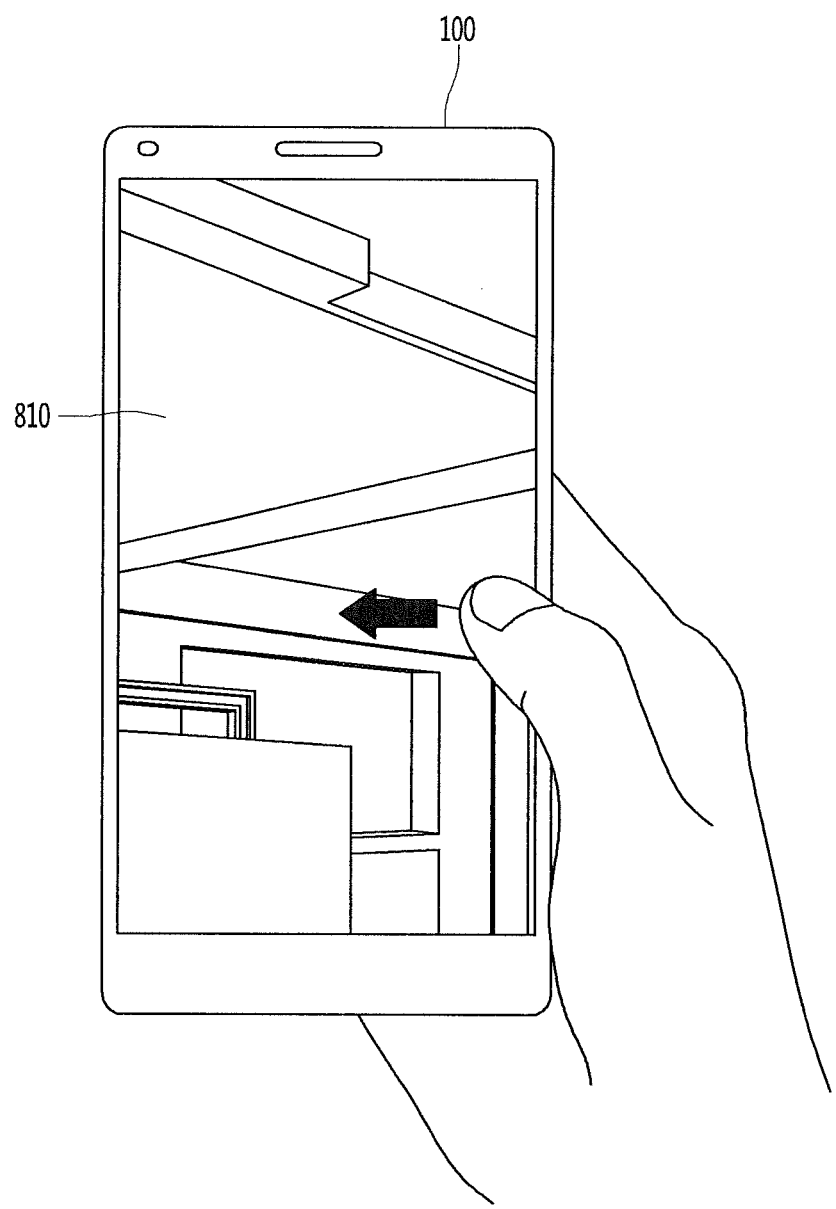

FIG. 8C
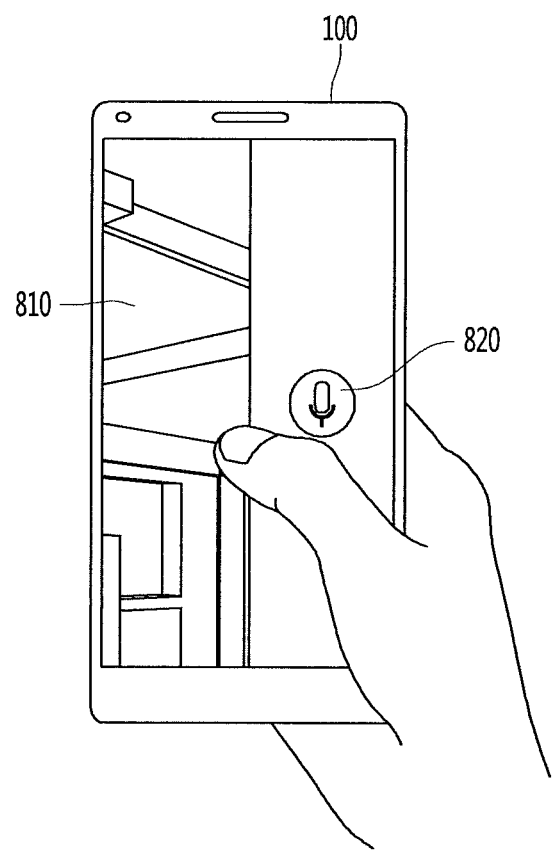
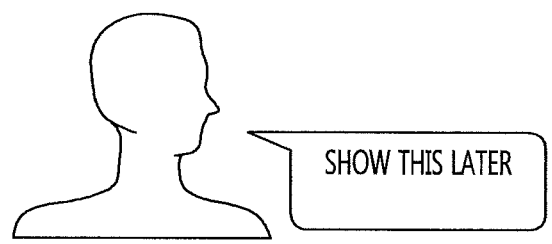

FIG. 8E
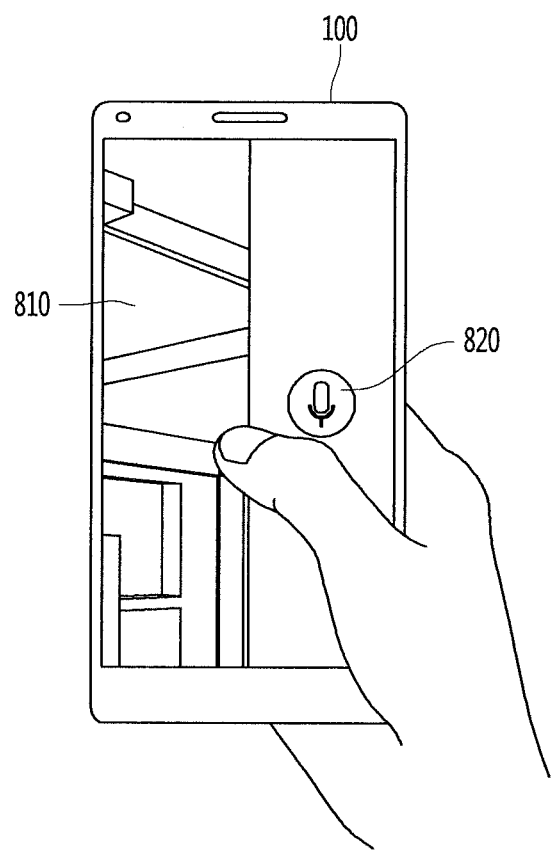
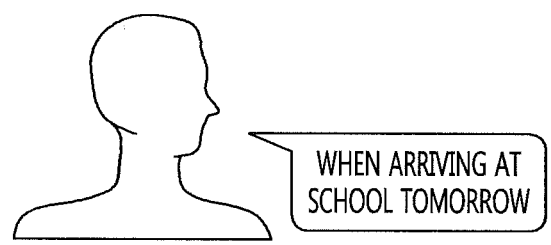

FIG. 9C
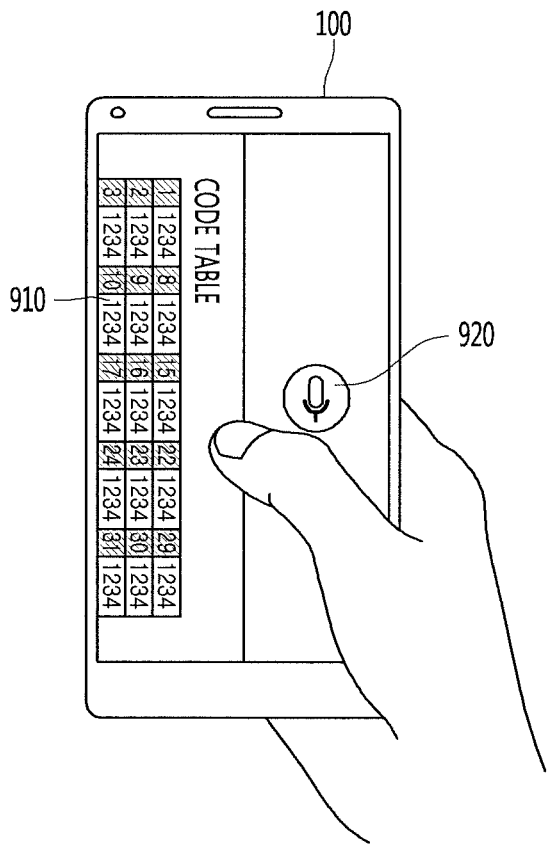
HIDE IT NOW AND SHOW IT LATER WHEN B BANK APPLICATION IS EXECUTED

FIG. 10B
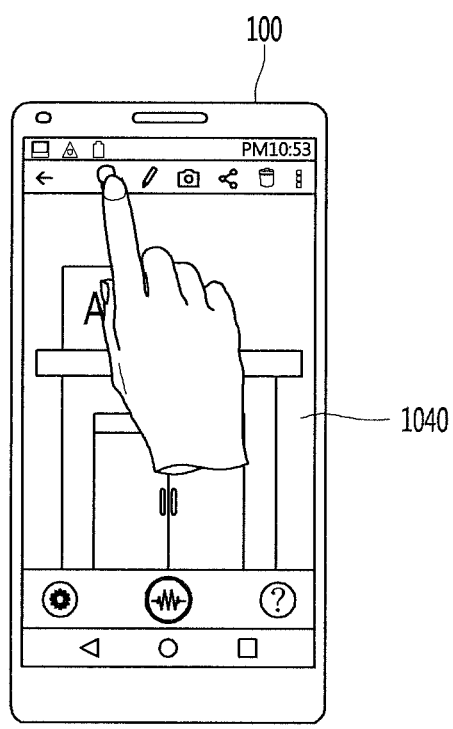
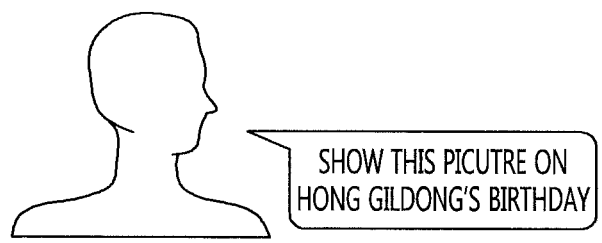

FIG. 12
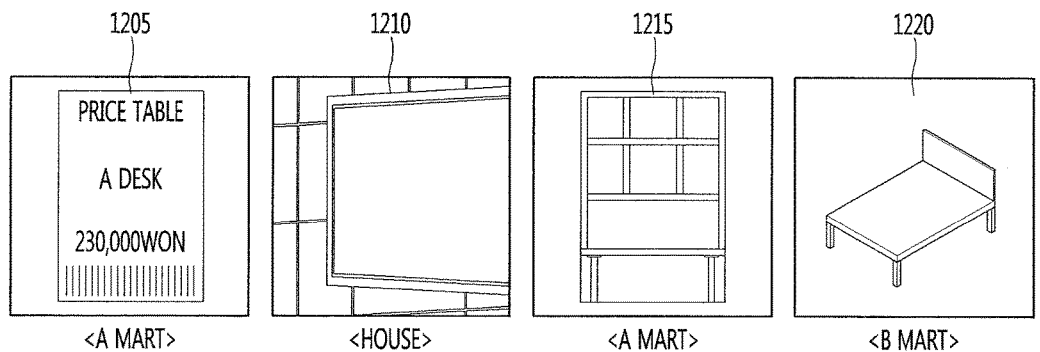
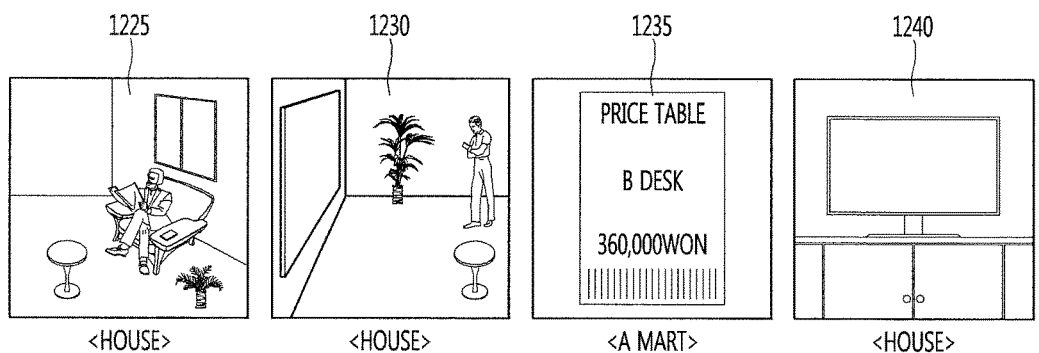
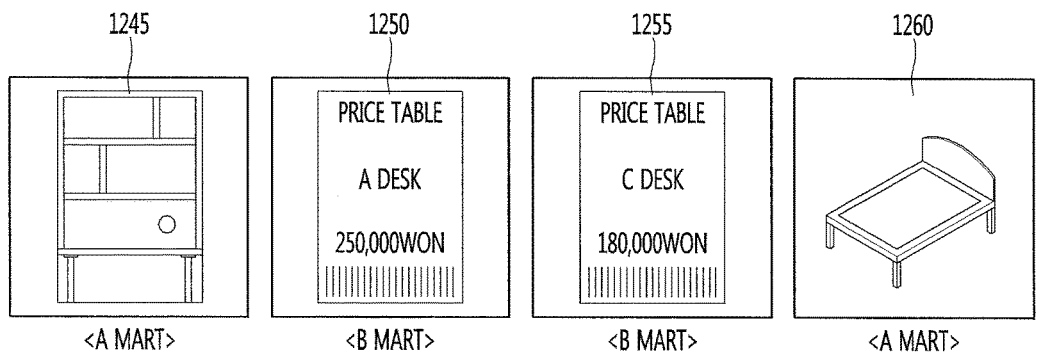

FIG. 17A
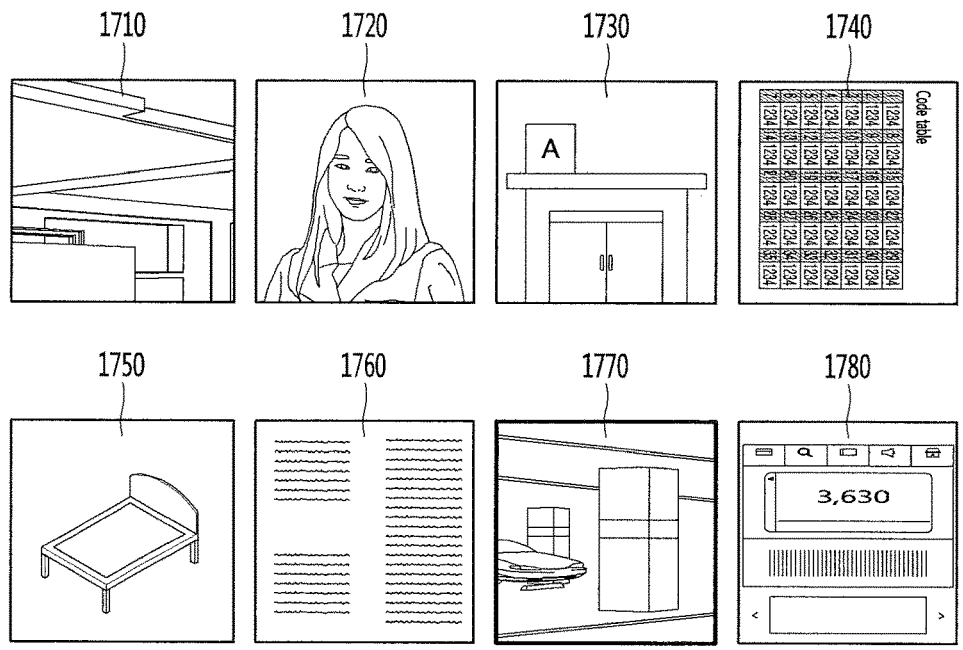
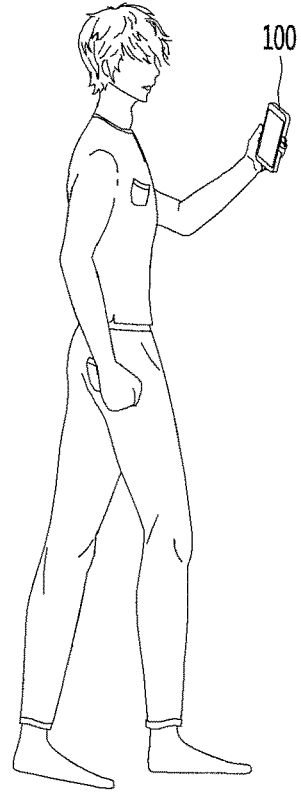

FIG. 18A
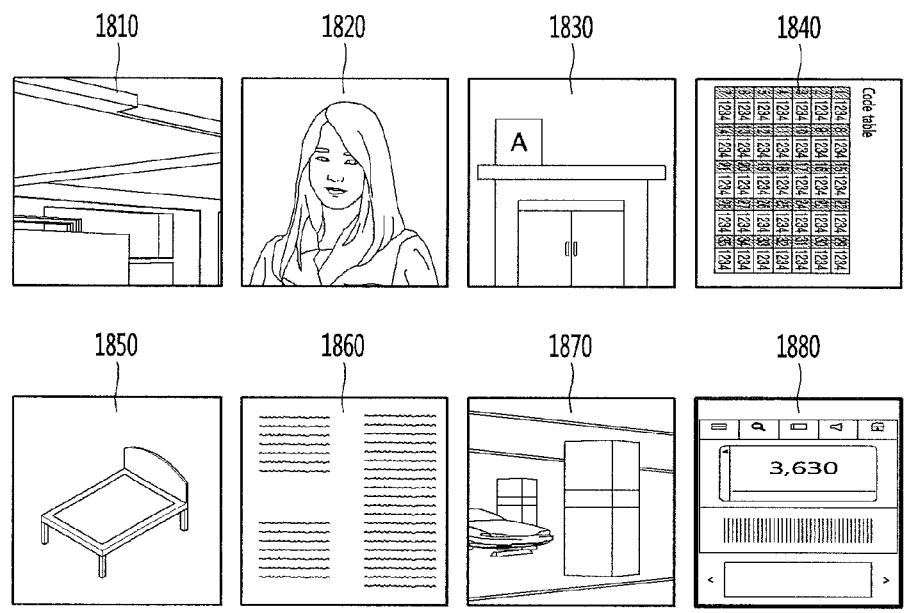
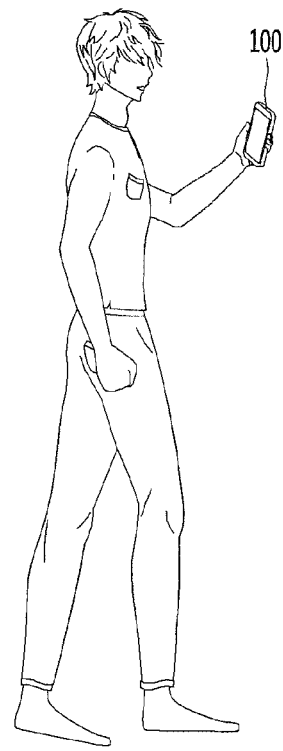

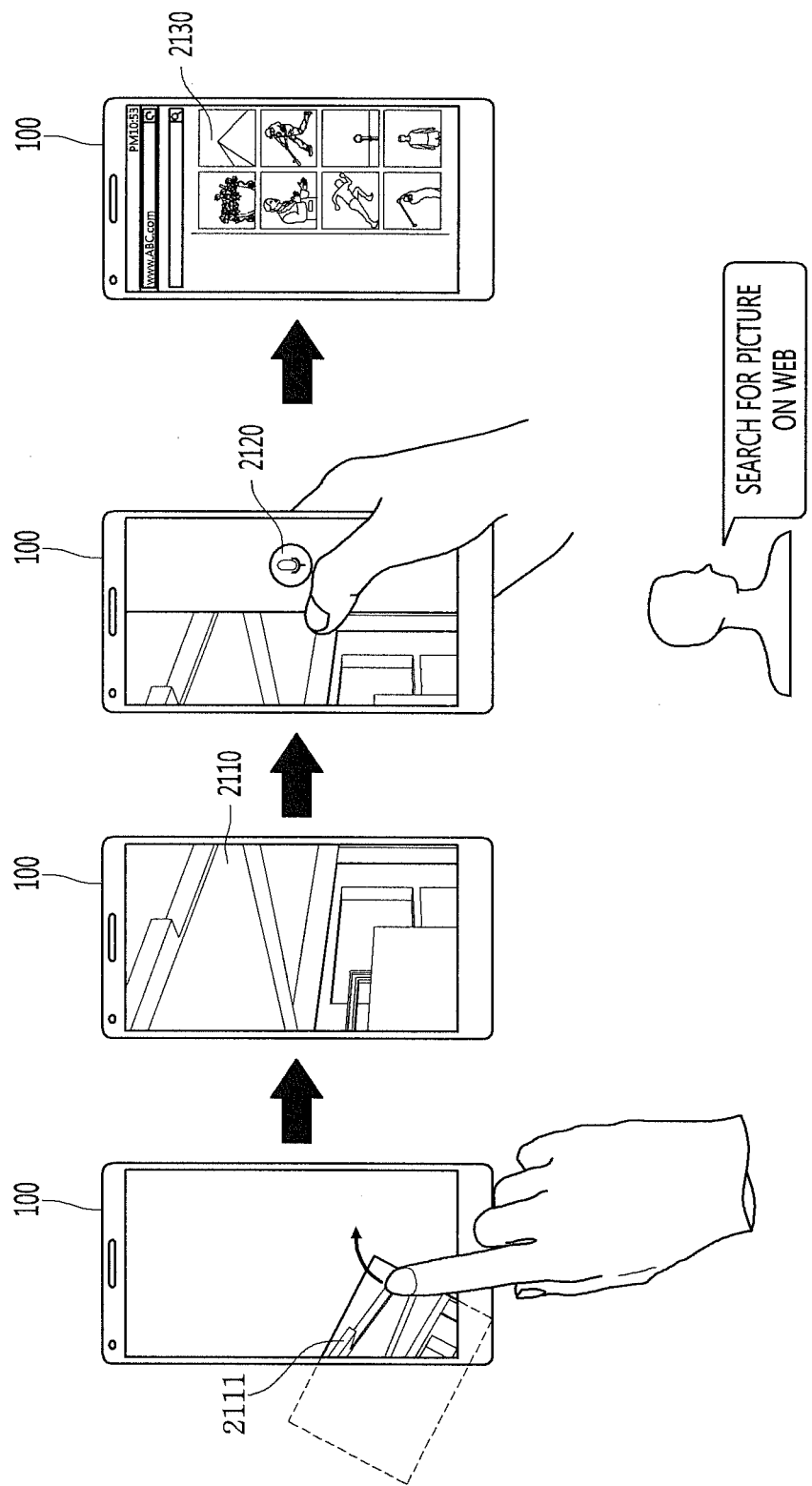

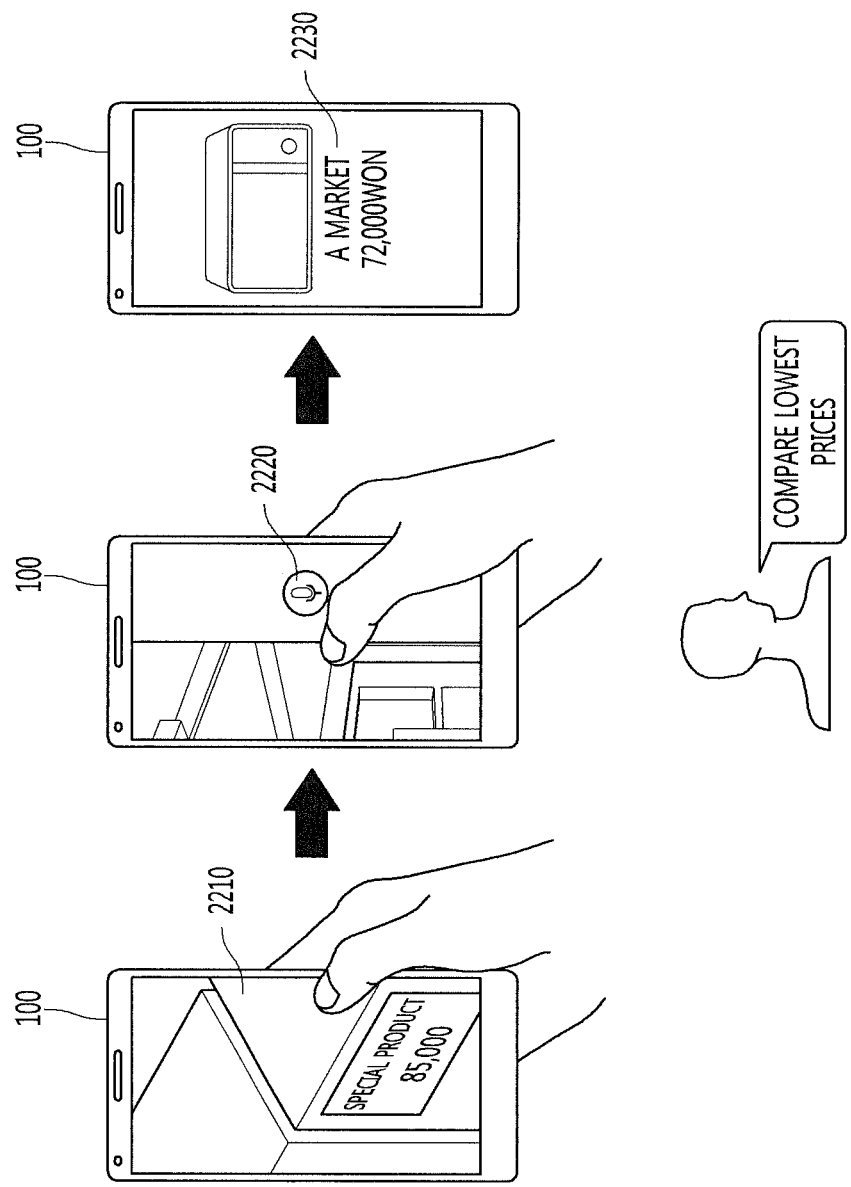

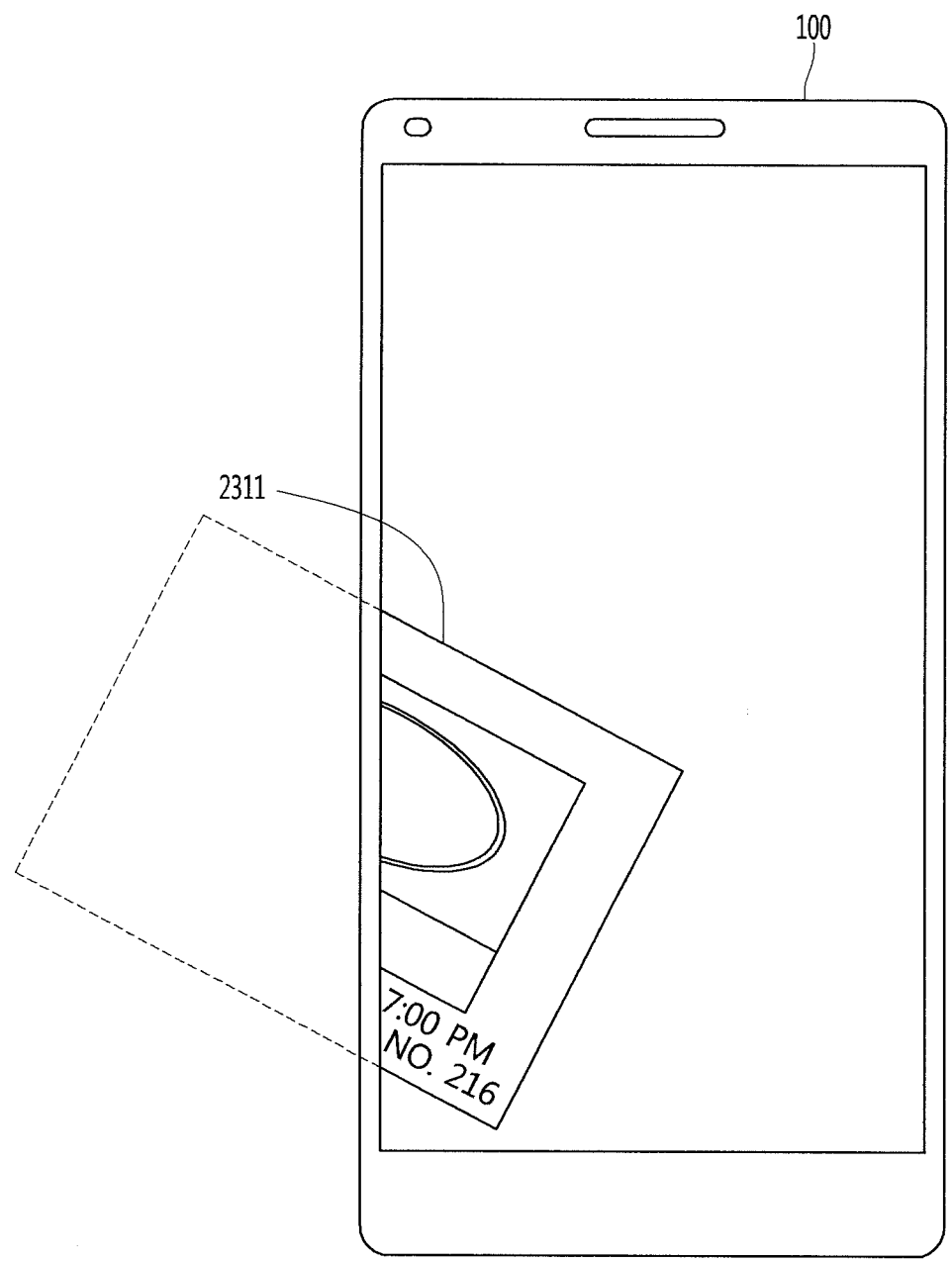

MOBILE TERMINAL AND METHOD FOR OPERATING THE SAME

CROSS-REFERENCE TO RELATED APPLICATIONS

Pursuant to 35 U.S.C. § 119(a), this application claims the benefit of an earlier filing date and right of priority to Korean Patent Application No. 10-2015-0126176, filed on Sep. 7, 2015 in the Korean Intellectual Property Office, the disclosure of which is incorporated herein by reference in its entirety.

TECHNICAL FIELD

The present application relates to a mobile terminal configured to classify, manage, and display images.

BACKGROUND

With the development of mobile communication technology, the utilization of mobile terminals has continued to increase. Mobile terminals, such as mobile phones and other portable electronic devices, are being used for a variety of purposes. For example, mobile terminals typically include image capture functionality, such as a camera, that allows users to capture images of events during the course of their everyday lives.

SUMMARY

Systems and techniques described herein enable a mobile terminal to classify, manage, and display images based on event information that is associated with the images. In some implementations, the mobile terminal may be configured to detect events that occur in a user's environment, and display previously-stored images that have been associated with the detect events.

In one aspect, a method of operating a mobile terminal may include obtaining at least one image; determining event information that is to be associated with the obtained at least one image; storing, in computer memory, the obtained at least one image and information that associates the obtained at least one image with the event information; detecting an event on the mobile terminal; determining that the detected event corresponds to the event information; and displaying, on a display of the mobile terminal and based on the determination that the detected event corresponds to the event information, a first image among the at least one image that has been stored and associated with the event information.

In some implementations, obtaining the at least one image may include obtaining, by the mobile terminal, an image that was captured through a first image-capturing mode of the mobile terminal. Determining the event information that is to be associated with the obtained at least one image may include determining that a user input has been received; and determining, based on the user input, the event information as being at least one of time information indicating a time at which the at least one image is to be displayed, location information indicating a location where the at least one image is to be displayed, or application information indicating an application that is to be displayed together with the at least one image.

In some implementations, obtaining the at least one image that was captured through the first image-capturing mode of the mobile terminal may include obtaining an image that was captured while a screen of the mobile terminal was turned off.

In some implementations, the method may further include displaying, on the display of the mobile terminal, a plurality of images including the first image. Determining the event information that is to be associated with the obtained at least one image may include: determining that a user input has been received indicating the event information that is to be associated with the first image of the plurality of images; and determining, based on the user input, the event information as including at least one of time information indicating a time at which the first image is to be displayed, location information indicating a location where the first image is to be displayed, and application information indicating an application that is to be displayed together with the first image.

In some implementations, obtaining the at least one image may include obtaining, by the mobile terminal, an image that was captured through a first image-capturing mode of the mobile terminal. Determining the event information that is to be associated with the at least one image may include: determining the event information from the image that was captured through the first image-capturing mode.

In some implementations, determining the event information from the image that was captured through the first image-capturing mode may include: determining the event information based on at least one of an object detected in the image, a text detected in the image, location information indicating a location where the image was captured, time information indicating a time at which the image was captured, or application information indicating an application that was executed when the image was captured.

In some implementations, displaying, on the display of the mobile terminal and based on the determination that the detected event corresponds to the event information, the first image among the at least one image that has been stored and associated with the event information may include: determining a plurality of images, among the at least one image, that includes the first image and that have in common at least one of an object detected in the plurality of images or location information indicating a location where the plurality of images was obtained; and displaying the plurality of images including the first image.

In some implementations, displaying, on a display of the mobile terminal and based on the determination that the detected event corresponds to the event information, the first image among the at least one image that has been stored and associated with the event information may include: determining that the event detected on the mobile terminal is a first event; determining event occurrence information for each image of the at least one image that has been stored and associated with the event information; determining that the event occurrence information for the first image among the at least one image corresponds to the first event detected on the mobile terminal; and displaying the first image for which the event occurrence information corresponds to the first event detected on the mobile terminal.

In some implementations, displaying, on a display of the mobile terminal and based on the determination that the detected event corresponds to the event information, the first image among the at least one image that has been stored and associated with the event information may include: displaying a first portion of the first image at an edge of the display of the mobile terminal; determining that a user touch-input has been applied to the displayed first portion of the first image; and based on the determination that the user touch-input has been applied to the displayed first portion of the first image, displaying a second portion of the first image that includes both the first portion and a third portion of the first image different than the first portion.

In some implementations, the method may further include: based on displaying the second portion of the first image that includes both the first portion and the third portion of the first image different than the first portion, displaying a first user interface configured to receive a user input to delete the first image, and a second user interface configured to receive a user input to store the first image.

In some implementations, a mobile terminal includes a storage unit; a display unit; and a control unit communicative with the storage unit and the display unit. The control unit may be configured to: obtain at least one image; determine event information that is to be associated with the obtained at least one image; store, in the storage unit, the obtained at least one image and information that associates the obtained at least one image with the event information. The control unit may also be configured to detect an event on the mobile terminal; determine that the detected event corresponds to the event information; and display, on the display unit and based on the determination that the detected event corresponds to the event information, a first image among the at least one image that has been stored and associated with the event information.

In some implementations, the mobile terminal may further include: an image-capturing unit configured to capture the at least one image; and an input unit configured to receive a user input. The control unit may further be configured to control the image-capturing unit to capture the at least one image through a first image-capturing mode of the mobile terminal. The control unit may be configured to determine the event information that is to be associated with the at least one image by: receiving, through the input unit, the user input; and determining, based on the user input, the event information as being at least one of time information indicating a time at which the at least one image is to be displayed, location information indicating a location at which the at least one image is to be displayed, and application information indicating an application that is to be displayed together with the at least one image.

In some implementations, the control unit may be configured to control the image-capturing unit to capture the at least one image through the first image-capturing mode of the mobile terminal by: controlling the image-capturing unit to capture an image while a screen of the mobile terminal is turned off.

In some implementations, the mobile terminal may further include an input unit configured to receive a user input. The control unit may be configured to control the display unit to display a plurality of images including the first image. The control unit may also be configured to determine the event information that is to be associated with the at least one image by: receiving, through the input unit, a user input indicating the event information that is to be associated with the first image of the plurality of images; and determining, based on the user input, the event information as including at least one of time information indicating a time at which the first image is to be displayed, location information indicating a location at which the first image is to be displayed, and application information indicating an application to be displayed together with the first image.

In some implementations, the mobile terminal may further include an image-capturing unit configured to capture an image. The control unit may further be configured to control the image-capturing unit to capture an image through a first image-capturing mode. The control unit may be configured to determine the event information that is to be associated with the at least one image by: determining the event information from the image that was captured through the first image-capturing mode.

In some implementations, determining the event information from the image that was captured through the first image-capturing mode may include: determining the event information based on at least one of an object detected in the image, a text detected in the image, location information indicating a location where the image was captured, time information indicating a time at which the image was captured, or application information indicating an application that was executed when the image was captured.

In some implementations, the control unit may be configured to display, on the display unit and based on the determination that the detected event corresponds to the event information, the first image among the at least one image that has been stored and associated with the event information by: determining a plurality of images, among the at least one image, that includes the first image and that have in common at least one of an object detected in the plurality of images or location information indicating a location where the plurality of images was obtained; and controlling the display unit to display the plurality of images including the first image.

In some implementations, the control unit may be configured to display, on the display unit and based on the determination that the detected event corresponds to the event information, the first image among the at least one image that has been stored and associated with the event information by: determining that the event detected on the mobile terminal is a first event; determining event occurrence information for each image of the at least one image that has been stored and associated with the event information; determining that the event occurrence information for the first image among the at least one image corresponds to the first event detected on the mobile terminal; and controlling the display unit to display the first image for which the event occurrence information corresponds to the first event detected on the mobile terminal.

In some implementations, the mobile terminal may further include an input unit configured to receive a user input. The control unit may be configured to display, on the display unit and based on the determination that the detected event corresponds to the event information, the first image among the at least one image that has been stored and associated with the event information by: controlling the display unit to display a first portion of the first image at an edge of a screen of the display unit; determining that a user input has been received, through the input unit, to select the displayed first portion of the first image; and based on the determination that the user input has been received to select the displayed first portion of the first image, controlling the display unit to display a second portion of the first image that includes both the first portion and a third portion of the first image different than the first portion.

In some implementations, the control unit may further be configured to: based on controlling the display unit to display the second portion of the first image that includes both the first portion and the third portion of the first image different than the first portion, control the display unit to display a first user interface configured to receive a user input to delete the first image, and a second user interface configured to receive a user input to store the first image.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

BRIEF DESCRIPTION OF THE DRAWINGS

FIGS. 6A, 6B, 6C, 7A, and 7B are diagrams illustrating examples of associating an image with a location where the image is to be displayed, according to a user input;

FIGS. 8A to 8E are diagrams illustrating examples of associating an image with a time at which the image is to be displayed, according to a user input;

FIGS. 9A to 9C are diagrams illustrating examples of associating an image with an application that is to be executed when the image is displayed, according to a user input;

FIGS. 10A and 10B are diagrams illustrating examples of associating event information to a plurality of images obtained by a mobile terminal, according to some implementations;

FIG. 12 is a diagram illustrating an example of a plurality of images obtained by a mobile terminal;

FIGS. 17A to 17D are diagrams illustrating examples of displaying an image based on the event information indicating a location where the image is displayed, according to some implementations;

FIGS. 18A and 18B are diagrams illustrating examples of displaying an image based on the event information indicating location information in the form of a wireless signal information;

FIG. 21 is a diagram illustrating an example of displaying additional information on an image displayed when an event occurs;

FIG. 22 is a diagram illustrating an example of displaying additional information on a displayed image according to another implementation;

FIGS. 23A to 23C are diagrams illustrating examples of updating a schedule based on detecting that a text is included in an image captured through a specific image-capturing mode.

DETAILED DESCRIPTION

In some scenarios, a user may capture images of the user's environment and use those images as part of an information management technique. As an example, a user may capture an image of a parking zone identification mark for a particular parking zone in a parking lot and, upon subsequently returning to the same parking lot, the user may easily find the parking zone by retrieving the stored image. As another example, a user may capture images of teaching material on a board or display, and the user may subsequently retrieve those images for review of the teaching content. In general, users may capture images, either as a single picture or multiple frames of a video, of an event of interest and subsequently retrieve those images for review of that event.

In such scenarios where images are used as an information management technique, a user may desire particular functionality for interacting with the images that differ from functionality for other images that are not used for information management. For example, images that are used for information management may only be relevant to a user in a particular scenario or timeframe, and may otherwise be irrelevant and appropriately deleted. Additionally, images used for information management may need to be easily and quickly accessed by a user in particular scenarios or timeframes, and clearly distinguished from other types of images that are not used for information management.

Figure 1:
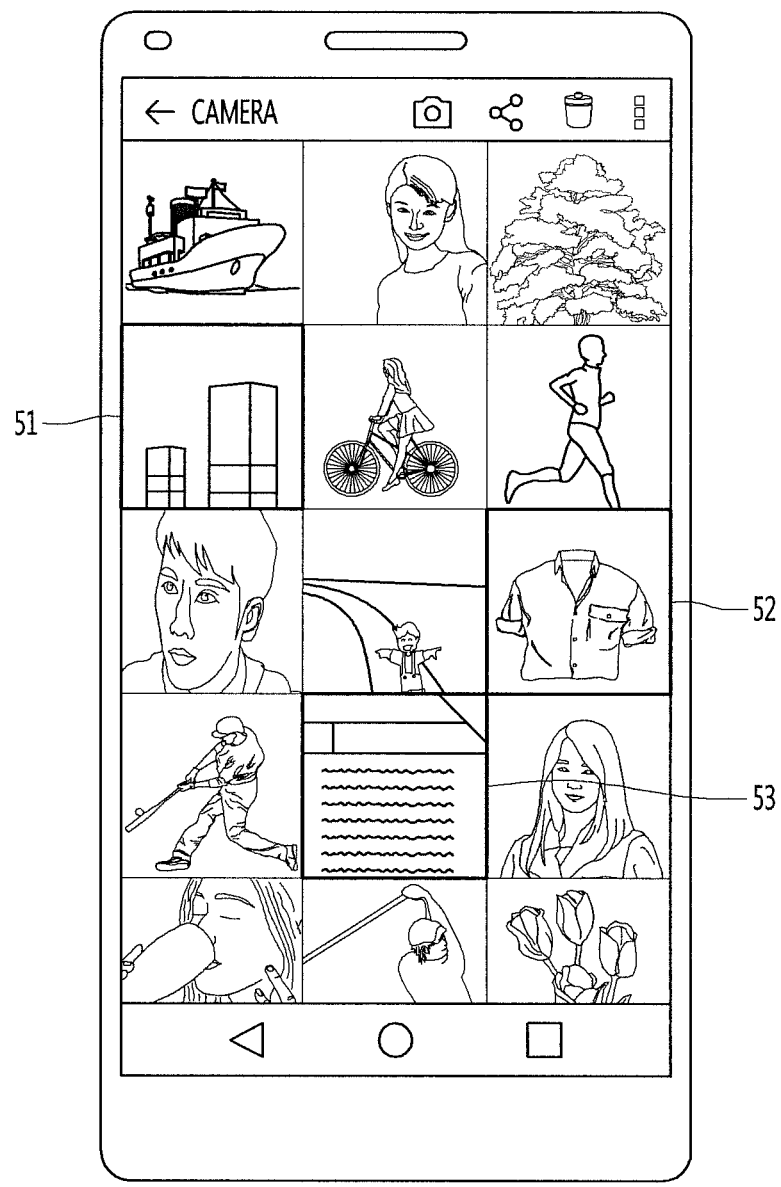
FIG. 1 is a diagram illustrating an example of picture management.

As an example, consider a scenario where images are stored and classified as an aggregate, as shown in FIG. 1. In this example, images 51, 52, and 53 have been captured for information management but have been stored and classified together with other types of images that are not used for information management. In this example, it may be difficult for a user to easily access and retrieve images 51, 52, and 53 to obtain the desired information.

In this example, a user may face additional delay in searching through the aggregate collection of images at a time or a place when the user may need to quickly access the relevant information.

Additionally, images that are captured for information management may lose relevance after some period of time after a user accesses and uses the information, such as images of a parking zone after the user has left a parking lot or images of teaching material after a user has completed a course. However, a user may face additional delay and effort in searching through an aggregate collection of images to find and delete such irrelevant images.

Systems and techniques are described herein that enable a mobile terminal to classify, manage, and display images based on event information that is associated with the images. The mobile terminal is configured to detect events that occur in a user's environment, and display previously-stored images that have been associated with the detect events.

In some implementations, the mobile terminal is configured to determine event information that is to be associated with particular images. When the mobile terminal detects that an event has occurred and determines that the event corresponds to a particular event information, the mobile terminal may display previously-stored images that have been associated with that event information.

Herein, a mobile terminal is described as one example of an electronic device that may be used to implement various systems and techniques. However, implementations are not limited to a mobile terminal and may be applied to any suitable electronic device that is configured to capture images.

Figure 2:
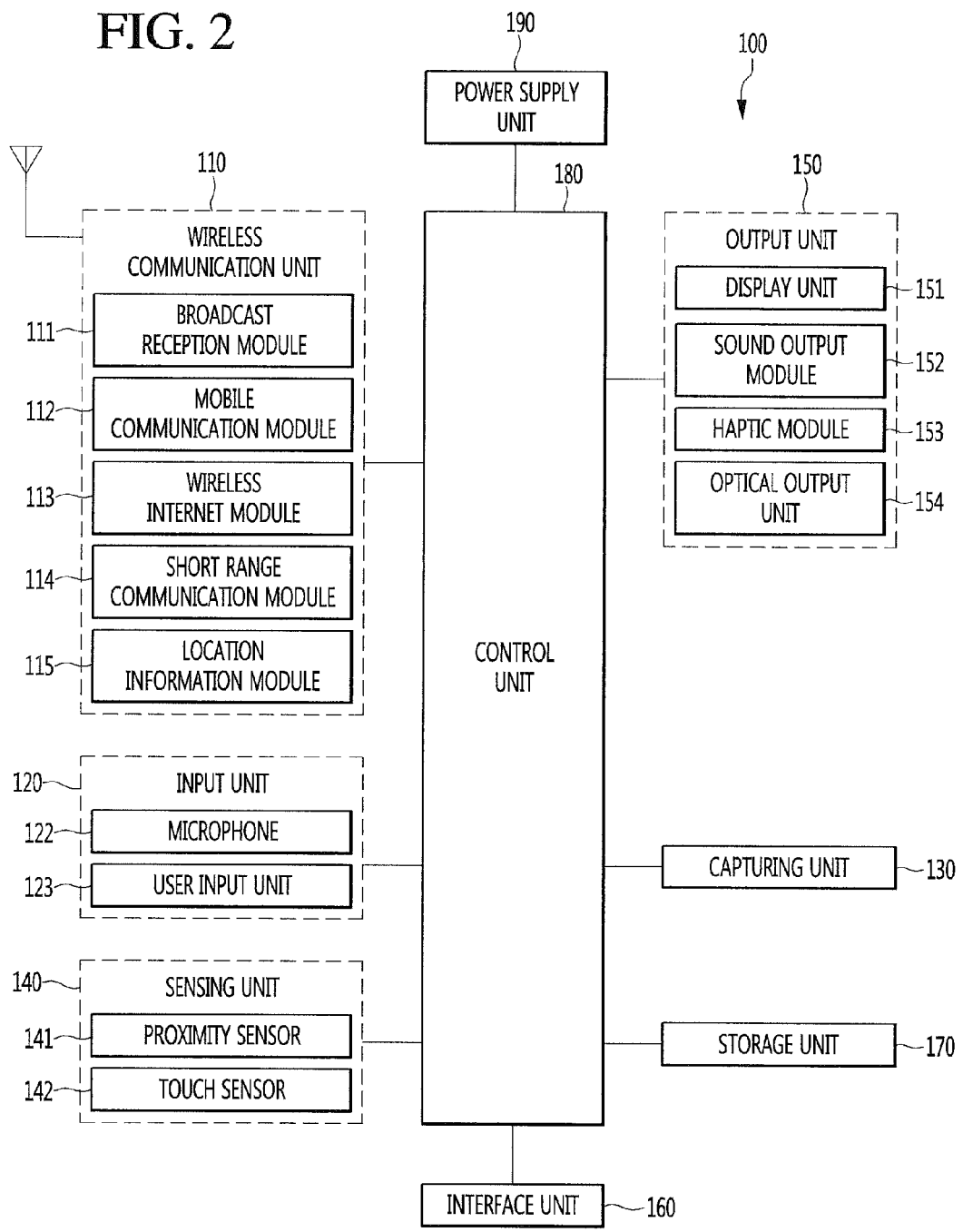
FIG. 2 is a block diagram illustrating an example of a mobile terminal according to some implementations.

FIG. 2 is a block diagram illustrating a mobile terminal according to some implementations.

The mobile terminal 100 may include a wireless communication unit 110, an input unit 120, a capturing unit 130, a sensing unit 140, an output unit 150, an interface unit 160, a storage unit 170, a control unit 180, and a power supply unit 190. In implementing a portable device, components shown in FIG. 1 are not necessary, so that a portable device described in this specification may include components less or more than the components listed above.

In more detail, the wireless communication unit 110 in the components may include at least one module allowing wireless communication between the mobile terminal 100 and a wireless communication system, between the mobile terminal 100 and another mobile terminal 100, or between the mobile terminal 100 and an external server. Additionally, the wireless communication unit 110 may include at least one module connecting the mobile terminal 100 to at least one network.

The wireless communication unit 110 may include at least one of a broadcast receiving module 111, a mobile communication module 112, a wireless internet module 113, a short-range communication module 114, and a location information module 115.

The input unit 120 may include a camera 121 or an image input unit for image signal input, a microphone 122 or an audio input unit for audio signal input, and a user input unit 123 (for example, a touch key and a mechanical key)) for receiving information from a user. Voice data or image data collected by the input unit 120 are analyzed and processed as a user's control command.

The sensing unit 140 may include at least one sensor for sensing at least one of information in a watch-type mobile terminal, environmental information around a watch-type mobile terminal, and user information. For example, the sensing unit 140 may include at least one of a proximity sensor 141, an illumination sensor, a touch sensor 142, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, the mobile terminal 100 disclosed in this specification may combine information sensed by at least two or more sensors among such sensors and may then utilize it.

The output unit 150 is used to generate a visual, auditory, or haptic output and may include at least one of a display unit 151, a sound output unit 152, a haptic module 153, and an optical output unit 154. The display unit 151 may be formed with a mutual layer structure with a touch sensor or formed integrally, so that a touch screen may be implemented. Such a touch screen may serve as the user input unit 123 providing an input interface between the mobile terminal 100 and a user and an output interface between the mobile terminal 100 and a user at the same time.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, a video I/O port, and an earphone port. In correspondence to that an external device is connected to the interface unit 160, the mobile terminal 100 may perform an appropriate control relating to the connected external device.

Additionally, the storage unit 170 may store data supporting various functions of the mobile terminal 100. The storage unit 170 may store a plurality of application programs (for example, application programs or applications) running on the mobile terminal 100 and also data and commands for operations of the mobile terminal 100. At least part of such an application program may be downloaded from an external server through a wireless communication. Additionally, at least part of such an application program may be included in the mobile terminal 100 from the time of shipment in order to perform a basic function (for example, an incoming call, a transmission function, and a message reception) of the mobile terminal 100. Moreover, an application program may be stored in the storage unit 170 and installed on the mobile terminal 100, so that it may run to perform an operation (or a function) of the mobile terminal 100 by the control unit 180.

The control unit 180 may control overall operations of the mobile terminal 100 generally besides an operation relating to the application program. The control unit 180 may provide appropriate information or functions to a user or process them by processing signals, data, and information inputted/outputted through the above components or executing application programs stored in the storage unit 170.

Additionally, in order to execute an application program stored in the storage unit 170, the control unit 180 may control at least part of the components shown in FIG. 1. Furthermore, in order to execute the application program, the control unit 180 may combine at least two of the components in the mobile terminal 100 and may then operate it.

The power supply unit 190 may receive external power or internal power under a control of the control unit 180 and may then supply power to each component in the mobile terminal 100. The power supply unit 190 includes a battery and the battery may be a built-in battery or a replaceable battery.

At least part of the each component may operate cooperatively in order to implement operations, controls, or control methods of a mobile terminal 100 according to various implementations described below. Additionally, the operations, controls, or control methods of a mobile terminal 100 may be implemented on the mobile terminal 100 by executing at least one application program stored in the storage unit 170.

Hereinafter, prior to examining various implementations implemented through the mobile terminal 100, the above-listed components are described in more detail with reference to FIG. 1.

First, in describing the wireless communication unit 110, the broadcast receiving module 111 of the wireless communication unit 110 may receive a broadcast signal and/or broadcast related information from an external broadcast management server through a broadcast channel. The broadcast channel may include a satellite channel and a terrestrial channel. At least two broadcast receiving modules for simultaneous broadcast reception for at least two broadcast channels or broadcast channel switching may be provided to the mobile terminal 100.

The mobile communication module 112 may transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include various types of data according to a voice call signal, a video call signal, or text/multimedia message transmission.

The wireless internet module 113 refers to a module for wireless internet access and may be built in or external to the mobile terminal 100. The wireless internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

From the viewpoint that wireless internet access by WiBro, HSDPA, HSUPA, GSM, CDMA, WCDMA, LTE, and LTE-A is achieved through a mobile communication network, the wireless internet module 113 performing wireless internet access through the mobile communication network may be understood as one type of the mobile communication module 112.

The short-range communication module 114 may support short-range communication by using at least one of Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, and Wireless Universal Serial Bus (USB) technologies. The short-range communication module 114 may support wireless communication between the mobile terminal 100 and a wireless communication system, between the mobile terminal 100 and another mobile terminal 100, or between networks including the mobile terminal 100 and another mobile terminal 100 (or an external server) through wireless area networks. The wireless area networks may be wireless personal area networks.

The short-range communication module 114 may detect (or recognize) another mobile device around the mobile terminal 100, which is capable of communicating with the mobile terminal 100. Furthermore, if the other mobile terminal is a device authenticated to communicate with the mobile terminal 100, the control unit 180 may transmit at least part of data processed in the mobile terminal 100 to the other mobile terminal through the short-range communication module 114. Accordingly, a user of the other mobile terminal may use the data processed in the mobile terminal 100 through another mobile terminal. For example, according thereto, when a call is received by the mobile terminal 100, a user may take a phone call through another mobile terminal or when a message is received by the mobile terminal 100, a user may check the received message through another mobile terminal.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module. As another example, the mobile terminal may obtain its position on the basis of information of a wireless access point (AP) transmitting/receiving a wireless signal to/from the Wi-Fi module, through the Wi-Fi module. In some implementations, the position information module 115 may perform a function of another module in the wireless communication unit 110 in order to obtain data on the location of the mobile terminal alternatively or additionally. The location information module 115 is a module for obtaining the position (or the current position) of the mobile terminal and is not limited to a module directly calculating and obtaining the position of the mobile terminal.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the control unit may control an operation of the mobile terminal 100 to correspond to the inputted information. The user input unit 123 may include a mechanical input means (or a mechanical key, for example, a button, a dome switch, a jog wheel, and a jog switch at the front/back or side of the mobile terminal 100) and a touch type input means. As one example, a touch type input means may include a virtual key, a soft key, or a visual key, which is displayed on a touch screen through software processing or may include a touch key disposed at a portion other than the touch screen. Moreover, the virtual key or visual key may have various forms and may be disposed on a touch screen and for example, may include graphic, text, icon, video, or a combination thereof.

Then, the mobile terminal 100, as a unit for inputting image information (or signal), audio information (or signal), data, or information inputted from a user, may include a capturing unit 130. Moreover, the capturing unit 130 may include one or more cameras. The capturing unit 130 processes image frames such as a still image or a video obtained by an image sensor in a video call mode or a capturing mode. The processed image frame may be displayed on the display unit 151 or stored in the storage unit 170. Moreover, a plurality of cameras equipped in the capturing unit 130 may be arranged in a matrix structure and through the cameras forming such a matrix structure, a plurality of image information having various angles or focuses may be inputted to the mobile terminal 100. Additionally, a plurality of cameras may be arranged in a stereo structure to obtain the left and right images for implementing a three-dimensional image.

The sensing unit 140 may sense at least one of information in a mobile terminal, environmental information around a mobile terminal, and user information and may then generate a sensing signal corresponding thereto. On the basis of such a sensing signal, the control unit 180 may control the drive or control of the mobile terminal 100 or may perform data processing, functions, or operations relating to an application program installed in the mobile terminal 100. Representative sensors among various sensors included in the sensing unit 140 will be described in more detail.

First, the proximity sensor 141 refers to a sensor detecting whether there is an object approaching a predetermined detection surface or whether there is an object around by using the strength of an electromagnetic field or infrared, without mechanical contact. The proximity sensor 141 may disposed in an inner area of a mobile terminal surrounded by the touch screen or around the touch screen.

Examples of the proximity sensor 141 may include a transmission-type photoelectric sensor, a direct reflective-type photoelectric sensor, a mirror reflective-type photoelectric sensor, a high-frequency oscillation-type proximity sensor, a capacitive-type proximity sensors, a magnetic-type proximity sensor, and an infrared proximity sensor. If the touch screen is a capacitive type, the proximity sensor 141 may be configured to detect the proximity of an object by changes in an electric field according to the proximity of the object having conductivity. In this case, the touch screen (or a touch sensor) itself may be classified as a proximity sensor.

Moreover, for convenience of description, an action for recognizing the position of an object on the touch screen as the object is close to the touch screen without contacting the touch screen is called "proximity touch" and an action that the object actually contacts the touch screen is called "contact touch". A position that an object is proximity-touched on the touch screen is a position that the object vertically corresponds to the touch screen when the object is proximity-touched. The proximity sensor 141 may detect a proximity touch and a proximity touch pattern (for example, a proximity touch distance, a proximity touch direction, a proximity touch speed, a proximity touch time, a proximity touch position, and a proximity touch movement state). Moreover, the control unit 180 processes data (for information) corresponding to a proximity touch operation and a proximity touch pattern, detected through the proximity sensor 141, and furthermore, may output visual information corresponding to the processed data on the touch screen. Furthermore, according to whether a touch for the same point on the touch screen is a proximity touch or a contact touch, the control unit 180 may control the mobile terminal 100 to process different operations or data (or information).

The touch sensor 142 detects a touch (or a touch input) applied to the touch screen (or the display unit 151) by using at least one of various touch methods, for example, a resistive film method, a capacitive method, an infrared method, an ultrasonic method, and a magnetic field method.

For example, the touch sensor 142 may be configured to convert a pressure applied to a specific portion of the touch screen or changes in capacitance occurring at a specific portion into electrical input signals. The touch sensor 142 may be configured to detect a position and area that a touch target applying a touch on the touch screen touches the touch sensor 142, a pressured when touched, and a capacitance when touched. Here, the touch target, as an object applying a touch on the touch sensor, may be a finger, a touch pen, a stylus pen, or a pointer, for example.

In such a way, when there is a touch input on the touch sensor 142, signal(s) corresponding thereto is/are sent to a touch controller. The touch controller processes the signal(s) and then transmits corresponding data to the control unit 180. Therefore, the control unit 180 may recognize which area of the display unit 151 is touched. Herein, the touch controller may be an additional component separated from the control unit 180 or may be the control unit 180 itself.

Moreover, the control unit 180 may perform different controls or the same control according to types of a touch target touching the touch screen (or a touch key equipped separated from the touch screen). Whether to perform different controls or the same control according to types of a touch target may be determined according to a current operation state of the watch-type mobile terminal 100 or an application program in execution.

Moreover, the above-mentioned touch sensor 142 and proximity sensor 141 are provided separately or combined and may thus sense various types of touches, for example, short (or tap) touch), long touch, multi touch, drag touch, flick touch, pinch-in touch, pinch-out touch, swipe touch, and hovering touch on the touch screen.

The sensing unit 140 may include a movement sensing unit. The movement sensing unit, for example, a gyro sensor, may sense a movement of a mobile terminal, for example, a movement direction, a movement angle, a movement speed, a current location, a rotation direction, and a rotation angle of a mobile terminal, and output a signal corresponding to the movement of the mobile terminal to the control unit 180. The control unit 180 may detect movement related information from signals generated from the gyro sensor, for example, a movement direction, a movement angle, a movement speed, an intensity, a current location, a rotation direction, and a rotation angle of a mobile terminal.

Moreover, the capturing unit 130 may include at least one of a camera sensor (for example, CCD and CMOS), a photo sensor (or an image sensor), and a laser sensor.

The capturing unit 130 and the laser sensor may be combined to detect a touch of a detection target for a three-dimensional image. The photo sensor may be stacked on a display device and is configured to scan a movement of a detection target close to the touch screen. In more detail, the photo sensor mounts a photo diode and a transistor (TR) in a row/column and scans content disposed on the photo sensor by using an electrical signal changing according to an amount of light applied to the photo diode. That is, the photo sensor may calculate the coordinates of a detection target according to the amount of change in light and through this, may obtain the position information of the detection target.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The sound output unit 152 may output audio data received from the wireless communication unit 110 or stored in the storage unit 170 in a call signal reception or call mode, a recording mode, a voice recognition mode, or a broadcast reception mode. The sound output unit 152 may output a sound signal relating to a function (for example, a call signal reception sound and a message reception sound) performed by the mobile terminal 100. The sound output unit 152 may include a receiver, a speaker, and a buzzer.

The haptic module 153 generates various haptic effects that a user can feel. A representative example of a haptic effect that the haptic module 153 generates is vibration. The intensity and pattern of vibration generated by the haptic module 153 may be controlled by a user's selection or a setting of a control unit. For example, the haptic module 153 may synthesize and output different vibrations or output different vibrations sequentially.

The haptic module 153 may generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 153 may be implemented to deliver a haptic effect through a direct contact and also allow a user to feel a haptic effect through a muscle sense such as a finger or an arm. The haptic module 153 may be more than two according to a configuration aspect of the mobile terminal 100.

The optical output unit 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

A signal outputted from the optical output unit 154 is implemented as a mobile terminal emits single color of multi-color to the front or the back. The signal output may be terminated when a mobile terminal detects user's event confirmation.

The interface unit 160 may serve as a path to all external devices connected to the mobile terminal 100. The interface unit 160 may receive data from an external device, receive power and deliver it to each component in the mobile terminal 100, or transmit data in the mobile terminal 100 to an external device. For example, the interface unit 160 may include at least one of a wired/wireless headset port, an external charger port, a wired/wireless data port, a memory card port, a port connecting a device equipped with an identification module, an audio I/O port, a video I/O port, and/or an earphone port.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

Additionally, when the mobile terminal 100 is connected to an external cradle, the interface unit 160 may become a path through which power of the cradle is supplied to the mobile terminal 100 or a path through which various command signals inputted from the cradle are delivered to the mobile terminal 100 by a user. The various command signals or the power inputted from the cradle may operate as a signal for recognizing that the mobile terminal 100 is accurately mounted on the cradle.

The storage unit 170 may store a program for an operation of the control unit 180 and may temporarily store input/output data (for example, a phone book, a message, a still image, and a video). The memory 170 may store data on various patterns of vibrations and sounds outputted during a touch input on the touch screen.

The storage unit 170 may include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The mobile terminal 100 may operate in relation to a web storage performing a storage function of the storage unit 170 on internet.

Moreover, as mentioned above, the control unit 180 may control operations relating to an application program and overall operations of the mobile terminal 100 in general. For example, if a state of the mobile terminal 100 satisfies set conditions, the control unit 180 may execute or release a lock state limiting an output of a control command of a user for applications.

Additionally, the control unit 180 may perform a control or processing relating to a voice call, data communication, and a video call may perform pattern recognition processing for recognizing handwriting input or drawing input on the touch screen as a text and an image, respectively. Furthermore, the control unit 180 may use at least one or a combination of the above components to perform a control in order to implement various implementations described below on the watch-type mobile terminal 100.

The power supply unit 190 may receive external power or internal power under a control of the control unit 180 and may then supply power for an operation of each component. The power supply unit 190 includes a battery. The battery is a rechargeable built-in battery and may be detachably coupled to a terminal body in order for charging.

Additionally, the power supply unit 190 may include a connection port and the connection port may be configured as one example of the interface unit 160 to which an external charger supplying power for charging of the battery is electrically connected.

As another example, the power supply unit 190 may be configured to charge a battery through a wireless method without using the connection port. In this case, the power supply unit 190 may receive power from an external wireless power transmission device through at least one of an inductive coupling method based on a magnetic induction phenomenon, and a magnetic resonance coupling method based on an electromagnetic resonance phenomenon.

Then, a communication system using the mobile terminal 100 is described according to an implementation.

First, the communication system may use different wireless interfaces and/or physical layers. For example, a wireless interface available to the communication system may include Frequency Division Multiple Access (FDMA), Time Division Multiple Access (TDMA), Code Division Multiple Access (CDMA), and Universal Mobile Telecommunications Systems (UMTS) (especially, Long Term Evolution (LTE), Long Term Evolution-Advanced (LTE-A), and Global System for Mobile Communications (GSM)).

Hereinafter, for convenience of description, description is made limited to CDMA. However, implementations are applicable to any suitable communication system, such as Orthogonal Frequency Division Multiplexing (OFDM) wireless communication systems in addition to CDMA wireless communication systems.

The CDMA wireless communication system may include at least one terminal 100, at least one base station (BS) (it may be referred to as Node B or Evolved Node B), at least one base station controllers (BSCs), and a mobile switching center (MSC). MSC may be configured to be connected to Public Switched Telephone Network (PSTN) and BSCs. BSCs may be connected being paired with a BS through a backhaul line. The backhaul line may be provided according to at least one of E1/T1, ATM, IP, PPP, Frame Relay, HDSL, ADSL, and xDSL. Accordingly, a plurality of BSCs may be included in a CDMA wireless communication system.

Each of a plurality of BSs may include at least one sensor and each sensor may include an omni-directional antenna or an antenna indicating a specific radial direction from a BS. Additionally, each sensor may include at least two antennas in various forms. Each BS may be configured to support a plurality of frequency allocations and each of the plurality of frequency allocations may have a specific spectrum (for example, 1.25 MHz, 5 MHz, and so on).

The intersection of a sector and a frequency allocation may be referred to as a CDMA channel. A BS may be referred to as a Base Station Transceiver Subsystem (BTS). In such a case, one BSC and at least one BS together may be referred to as "BS". A BS may also represent "cell site". Additionally, each of a plurality of sectors for a specific BS may be referred to as a plurality of cell sites.

A Broadcasting Transmitter (BT) transmits broadcast signals to the terminals 100 operating in a system. The broadcast reception module 111 shown in FIG. 1 is provided in the terminal 100 for receiving broadcast signals transmitted from the BT.

Additionally, GPS may be linked to a CDMA wireless communication system in order to check the location of the mobile terminal 100. Then, a satellite helps obtaining the location of the mobile terminal 100. Useful location information may be obtained by at least one satellite. Herein, the location of the mobile terminal 100 may be traced by using all techniques for tracing the location in addition to GPS tracking technique. Additionally, at least one GPS satellite may be responsible for satellite DMB transmission selectively or additionally.

The location information module 115 in a mobile terminal is for detecting and calculating the position of the mobile terminal and its representative example may include a GPS module and a WiFi module. In some implementations, the position information module 115 may perform a function of another module in the wireless communication unit 110 in order to obtain data on the location of the mobile terminal alternatively or additionally.

The GPS module 115 may calculate information on a distance from at least three satellites and accurate time information and then apply triangulation to the calculated information, in order to accurately calculate the 3D current location information according to latitude, longitude, and altitude. A method for calculating location and time information by using three satellites and correcting errors of the calculated location and time information by using another one satellite is being widely used. Additionally, the GPS module 115 may speed information as continuously calculating the current location in real time. However, it is difficult to accurately measure the location of a mobile terminal by using a GPS module in a shadow area of a satellite signal such as a room. Accordingly, in order to compensate for the measurement of a GPS method, a WiFi Positioning System (WPS) may be utilized.

WPS is a technique for tracking the location of the mobile terminal 100 by using a WiFi module in the mobile terminal 100 and a wireless Access Point (AP) for transmitting or receiving wireless signals to or from the WiFi module and may mean a Wireless Local Area Network (WLAN) based location measurement technique using WiFi.

A WiFi location tracking system may include a WiFi location measurement server, a mobile terminal 100, a wireless AP connected to the mobile terminal 100, and a database for storing arbitrary wireless AP information.

The mobile terminal 100 in access to a wireless AP may transmit a location information request message to a WiFi location measurement server.

The WiFi location measurement server extracts information of a wireless AP connected to the mobile terminal 100 on the basis of a location information request message (or signal) of the mobile terminal 100. Information of a wireless AP connected to the mobile terminal 100 may be transmitted to the WiFi location measurement server through the mobile terminal 100 or may be transmitted from a wireless AP to a WiFi location measurement server.

Based on the location information request message of the mobile terminal 100, the extracted information of a wireless AP may be at least one of MAC Address, Service Set Identification (SSID), Received Signal Strength Indicator (RSSI), Reference Signal Received Power (RSRP), Reference Signal Received Quality (RSRQ), channel information, Privacy, Network Type, Signal Strength, and Noise Strength.

As mentioned above, the WiFi position measurement server may extract wireless AP information corresponding to a wireless AP that the mobile terminal 100 access from a pre-established database by using information of the wireless AP connected to the mobile terminal 100. At this point, information of arbitrary wireless APs stored in the database may information such as MAC Address, SSID, channel information, Privacy, Network Type, latitude and longitude coordinates of a wireless AP, a building name where a wireless AP is located, the number of floors, indoor detailed location (GPS coordinates available), the address of the owner of an AP, and phone numbers. At this point, in order to remove a mobile AP or a wireless AP provided using illegal MAC address during a measurement process, a WiFi location measurement server may extract only a predetermined number of wireless AP information in high RSSI order.

Then, the WiFi location measurement server may extract (or analyze) the location information of the mobile terminal 100 by using at least one wireless AP information extracted from the database. By comparing the included information and the received wireless AP information, location information of the mobile terminal 100 is extracted (or analyzed).

As a method of extracting (or analyzing) the location information of the mobile terminal 100, a Cell-ID method, a finger-print method, a triangulation method, and a landmark method may be used.

The Cell-ID method is a method for determining the location of a wireless AP having the strongest signal intensity in neighbor wireless AP information that a mobile terminal collects as the location of the mobile terminal. Implementation is simple, no additional cost is required, and location information is obtained quickly but when the installation density of wireless APs is low, measurement precision is poor.

The finger-print method is a method for collecting signal intensity information by selecting a reference location from a service area and estimating the location through signal intensity information transmitted from a mobile terminal on the basis of the collected information. In order to use the finger-print method, there is a need to provide a database for storing propagation characteristics in advance.

The triangulation method is a method for calculating the location of a mobile terminal on the basis of a distance between coordinates of at least three wireless APs and a mobile terminal. In order to measure a distance between a mobile terminal and a wireless AP, a signal intensity converted into distance information, Time of Arrival (ToA), Time Difference of Arrival (TDoA), and Angle of Arrival (AoA) may be used.

The landmark method is a method for measuring the location of a mobile terminal by using a landmark transmitter knowing the location.

In addition to the listed methods, a variety of algorithms may be utilized as methods for extracting (or analyzing) the location information of a mobile terminal.

As the extracted location information of the mobile terminal 100 is transmitted to the mobile terminal 100 through the WiFi location measurement server, the mobile terminal 100 may obtain the location information.

As connected to at least one wireless AP, the mobile terminal 100 may obtain location information. At this point, the number of wireless APs, which are required for obtaining the location information of the mobile terminal 100, may vary according to a wireless communication environment where the mobile terminal 100 is located.

Moreover, some components of the mobile terminal 100 may be omitted or changed.

Moreover, an input unit 120 may further include a sensing unit 140

Moreover, various implementations below may be implemented in a computer or device similar thereto readable medium by using software, hardware, or a combination thereof.

Figure 3:
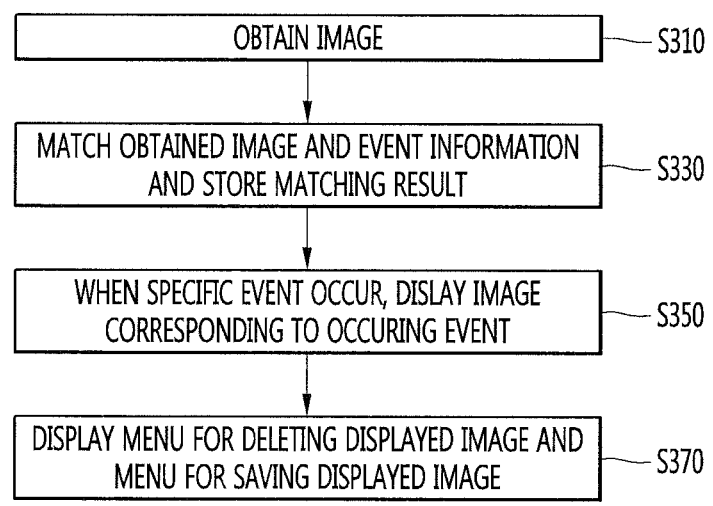
FIG. 3 is a flowchart illustrating an example of a method of operating a mobile terminal according to some implementations.

FIG. 3 is a flowchart illustrating a method of operating a mobile terminal according to some implementations.

Referring to FIG. 3, a method of operating the mobile terminal 100 includes obtaining an image in operation S310, and matching the obtained image to event information and storing the image matched to the event information in operation S330. In some implementations, storing the image matched to the event information may include storing the image, the event information, and information that matches the image with the event information. The method further includes detecting that a specific event occurs, and displaying an image corresponding to the specific event among at least one image matched to each of at least one event information and stored in operation S350, and displaying a menu for receiving a user input for deleting a displayed image and a menu for receiving a user input for storing a displayed image in operation S370.

Among operations, operation S310 for obtaining an image is described with reference to FIG. 4.

Figure 4:
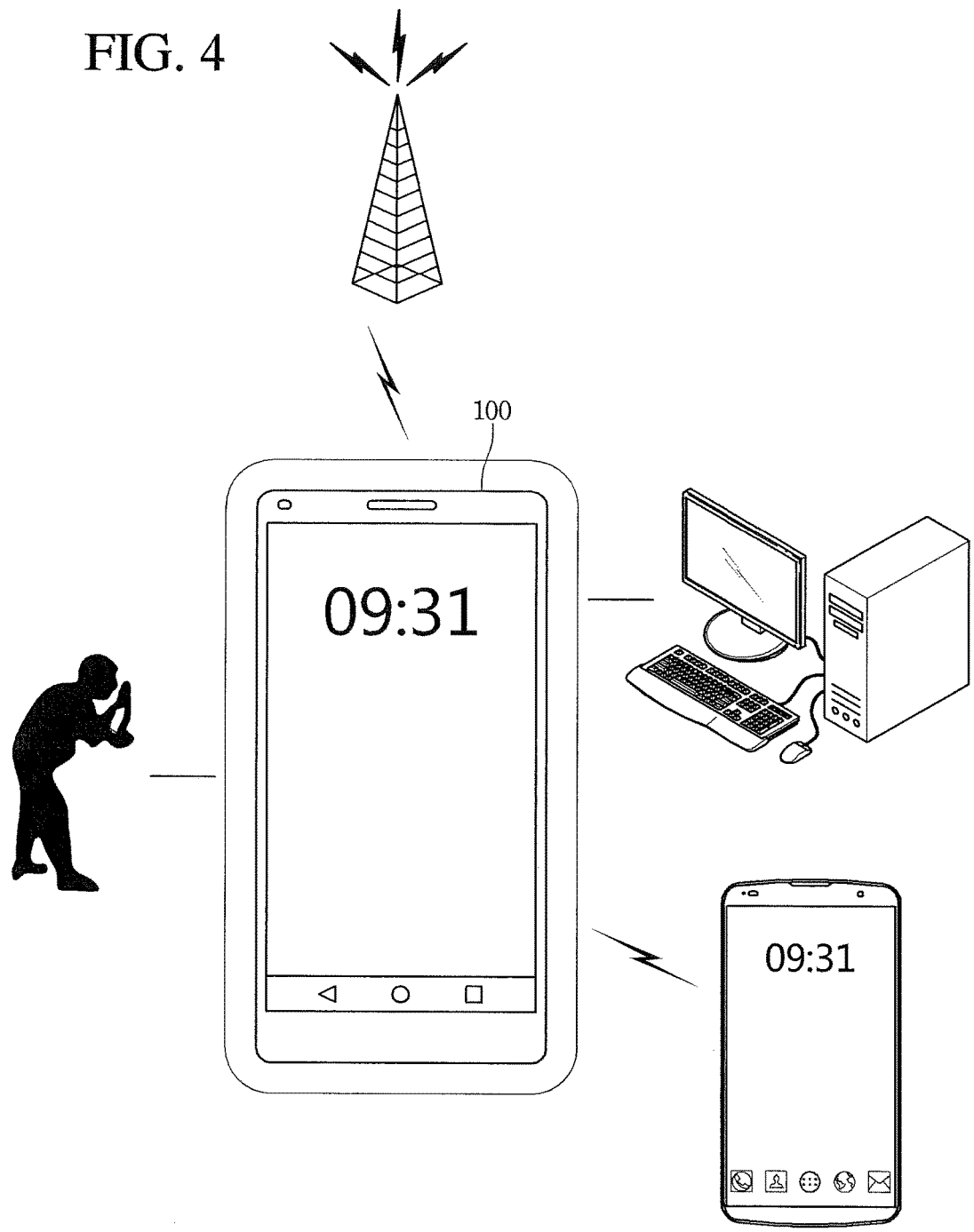
FIG. 4 is a diagram illustrating an example of a mobile terminal operating to obtain an image.

FIG. 4 is a view illustrating a method of the mobile terminal 100 to obtain an image.

Referring to FIG. 4, the mobile terminal 100 may receive an image from the outside through a mobile communication network and a wireless internet network. Additionally, the mobile terminal 100 may obtain an image by receiving the image from an external device through the wireless communication unit 110 or the interface unit 160.

Moreover, the mobile terminal 100 may obtain an image by capturing the image through the capturing unit 130. In more detail, when a user input for capturing an image is received, the control unit 180 may control the capturing unit 130 to capture an image received through the capturing unit 130.

Moreover, the control unit 180 may classify at least part of the obtained images as an image for providing information and manage it. For example, the control unit 180 may control the display unit 151 to display only an image providing information among the obtained images according to a specific user input and delete an image for providing information, which is stored in the storage unit 170, automatically after a specific time point elapses after the acquisition. Herein, an image for providing information refers to all images used for a user to obtain information and may be distinguished from a just viewing picture.

Additionally, an obtained image may be stored as an image for providing information as a user a capture an image through a specific image capturing mode. Additionally, when a general capturing technique instead of a specific capturing technique is performed, a user may match an obtained image to event information and store it as an image for providing information. Additionally, when an image obtained as capturing is performed through a general image capturing mode, since event information is matched according to place information of the obtained image, the obtained image may be stored as an image for providing information.

Referring to FIG. 3 again, the method of operating a mobile terminal may include matching the obtained image and the event information and storing it in operation S330. This will be described with reference to FIGS. 5 and 11.

FIGS. 5 to 9 are views illustrating a method of matching an image, which is captured through a specific image capturing mode and stored, and event information by a user input.

Figure 5:
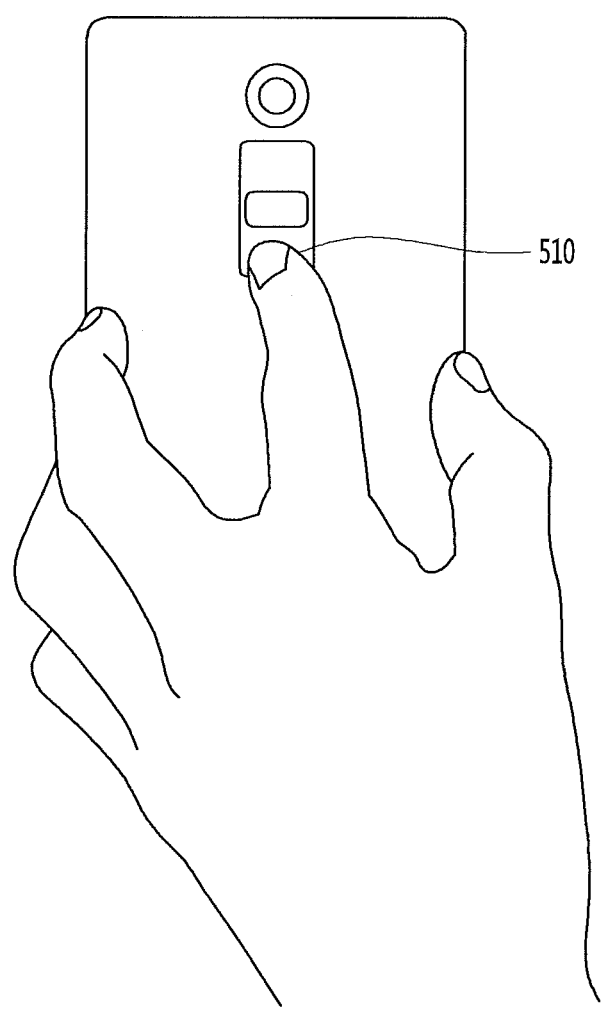
FIG. 5 is a diagram illustrating an example of capturing an image through an image capturing technique according to some implementations.

FIG. 5 is a view illustrating capturing an image through a specific image capturing mode according to some implementations.

The control unit 180 may obtain an image captured through a specific image capturing mode in the mobile terminal 100.

Herein, the specific image capturing mode may be a capturing mode through "quick shoot". Herein, "quick shoot" refers to a capturing mode for executing a capture application and capturing an image by clicking a specified button 510 at the rear of the mobile terminal 100 two times while the screen of the mobile terminal 100 is not turned on. Moreover, the capturing unit 130 may include a first camera mounted at the front of the mobile terminal 100, that is, the same surface as a touch screen and a second camera mounted at the rear of the mobile terminal 100, that is, an opposite surface to the touch screen, and when an image is captured through quick shoot, capturing is performed by using the first camera.

Moreover, the specific capturing mode is not limited to "quick shoot". For example, the control unit 180 displays a capture menu for providing information on a screen during image capturing and captures an image according to a user input for selecting the capture menu for providing information so that it obtains an image captured through a specific capturing mode.

For another example, by capturing an image as a user input for touching the image capture menu for more than a predetermined time is received, the control unit 180 may obtain an image captured through a specific capturing mode.

For another example, when the capturing unit 130 includes a first camera and a second camera, the control unit 180 may obtain an image captured through the first camera as an image captured through a specific capturing mode. Herein, the first camera may be a camera mounted at the front of the mobile terminal 100 and the second camera may be a camera mounted at the rear of the mobile terminal 100. Additionally, the first camera may be a camera mounted at the rear of the mobile terminal 100 and the second camera may be a camera mounted at the front of the mobile terminal 100.

For another example, the specific capturing mode may be a mode of capturing an image while the screen of the mobile terminal 100 is turned off. In more detail, when the screen of the mobile terminal 100 is turned off, as a user input for a specific button of the mobile terminal 100 is received, the control unit 180 may control the capturing unit 130 to capture an image.

For another example, the specific capturing mode may be a mode of capturing an image while a camera application is not in execution. In more detail, while a camera application is not in execution, as a specific user input is received by the mobile terminal 100, the control unit 180 may control the capturing unit 130 to capture an image.

In such a way, the system enables classification of an image that is captured through a specific capturing mode so that a user may easily access images and associated information.

Hereinafter, for convenience of description, the specific capturing mode is a capturing mode by "quick shoot". However, implementations are not limited thereto and any suitable capturing mode distinguished from the capturing mode described with reference to FIG. 5 and a general capturing mode for capturing an image for recollection and viewing may be performed as a specific capturing mode.

In some implementations, the matching of the obtained image to the event information and the storing of it in operation S330 may include receiving a user input for inputting the event information, matching the image captured through a specific capturing mode to the inputted event information and storing the image matched to the inputted event information. In such a scenario, the event information inputted by a user may be at least one of information on a time point that an obtained image is displayed, information on a place where an obtained image is displayed, and information on an application to be displayed together with an image obtained when the application is executed.

FIGS. 6A, 6B, 6C, 7A, and 7B are diagrams illustrating an example of matching information on a location where an image is displayed according to a user input.

Figure 6A:
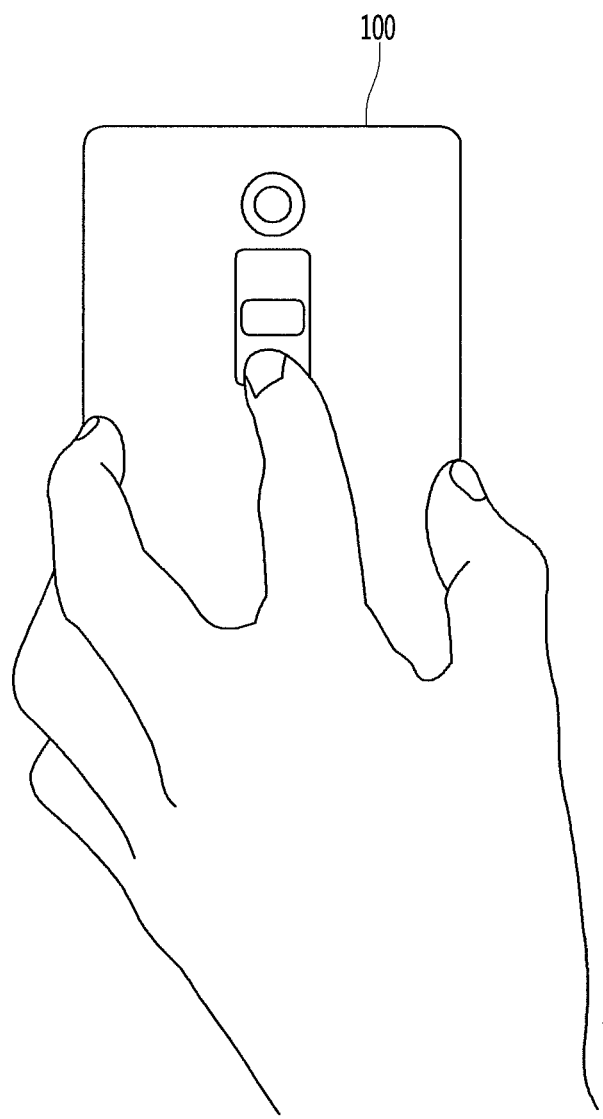
Figure 6B:
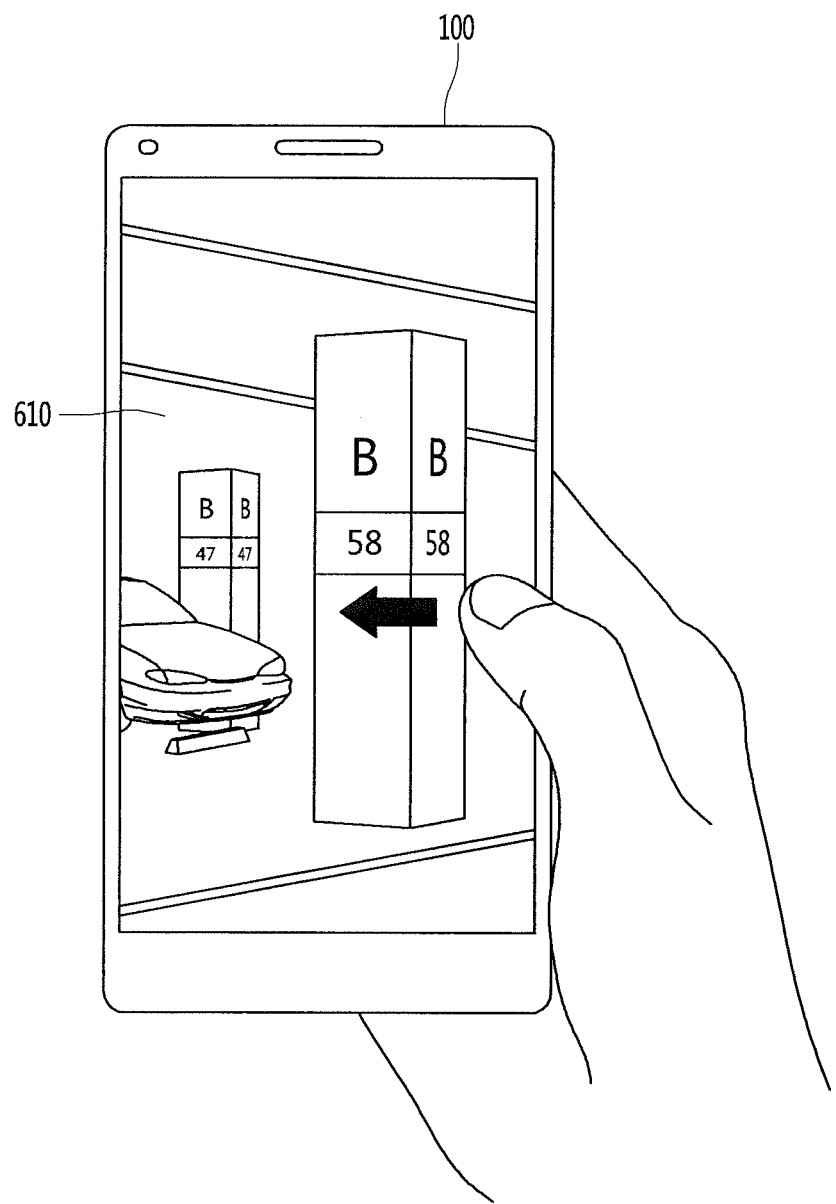

As shown in FIG. 6A, when image-capturing is performed through a specific capturing mode, the control unit 180 may obtain an image captured through the specific capturing mode and, as shown in FIG. 6B, control the display unit 151 to display the obtained image 610.

Moreover, the control unit 180 may store the obtained image 610 in the storage unit 170.

In some implementations, as a user input for dragging the displayed image 610 is received, the control unit 180, as shown in FIG. 6C, may display a UI object 620 for inputting event information through a user voice input. Additionally, when a user voice input for inputting event information is received through the input unit 120, the control unit 180 may match the received event information to the obtained image 610 and store it in the storage unit 170. For example, the control unit 180 may store the image 610 matched to the event information by matching the event information to the image 610 and storing the image 1110 and the event information or by matching the event information that was received in the user voice input to a pre-stored image 610 and event information.

Herein, the event information inputted by the user may be information on a place where the obtained image is displayed. In more detail, when a user input for specifying a place where the displayed image 610 is displayed is received, the control unit 180 may match location information on a specific place specified by a user as event information to the displayed image 610 and store it.

For example, as shown in FIG. 6C, if a user input for displaying the displayed image 610 at a place where the image is captured is received, the control unit 180 may obtain location information on a location where the image is captured and match the obtained location information as event information to the displayed image 610 and store it.

In more detail, the control unit 180 may obtain location information of the mobile terminal 100 at a time point that an image is captured on the basis of GPS information of the mobile terminal 100 at a time point that the image is captured and information on a wireless signal detected by the mobile terminal 100. For example, when a place where an image is captured is a parking lot, the control unit 180 may obtain location information of the mobile terminal 100 when an image is captured on the basis of GPS coordinates of the parking lot or wireless signal information such as Bluetooth signals transmitted from an electronic device in a vehicle parked in the parking lot, BLE signals transmitted from Beacon, WiFi signals transmitted from a wireless Access Point (AP), and signals transmitted during an NFC process.

For another example, if a user input for displaying the displayed image 610 on another place instead of a place where the image is captured is received, the control unit 180 may match location information on a location specified by a user as event information to the displayed image 610 and store it. For example, as shown in FIG. 6C, when a user input for displaying an image captured at a parking lot on a school is received, the control unit 180 may match location information on the school as event information to the displayed image 610 and store it.

Herein, location information on a specific place specified by a user may be location information obtained by using context information. In more detail, the control unit 180 may learn location information on a specific place on the basis of location information of the mobile terminal 100 and context information obtained from information inputted by a user.

For example, the control unit 180 may learn that a school is located at a specific location on the basis of a user input related to "school" and location information of the mobile terminal 100 at the school. Then, if a user input for displaying the displayed image 610 again at the "school" is received, the control unit 180 may match location information on the "school" as event information to the displayed image 610 and store it.

Moreover, the event information inputted by the user may be information on a place where an obtained image is displayed and herein, the information on the place is not limited to one place located in a specific region.

Figure 7A:
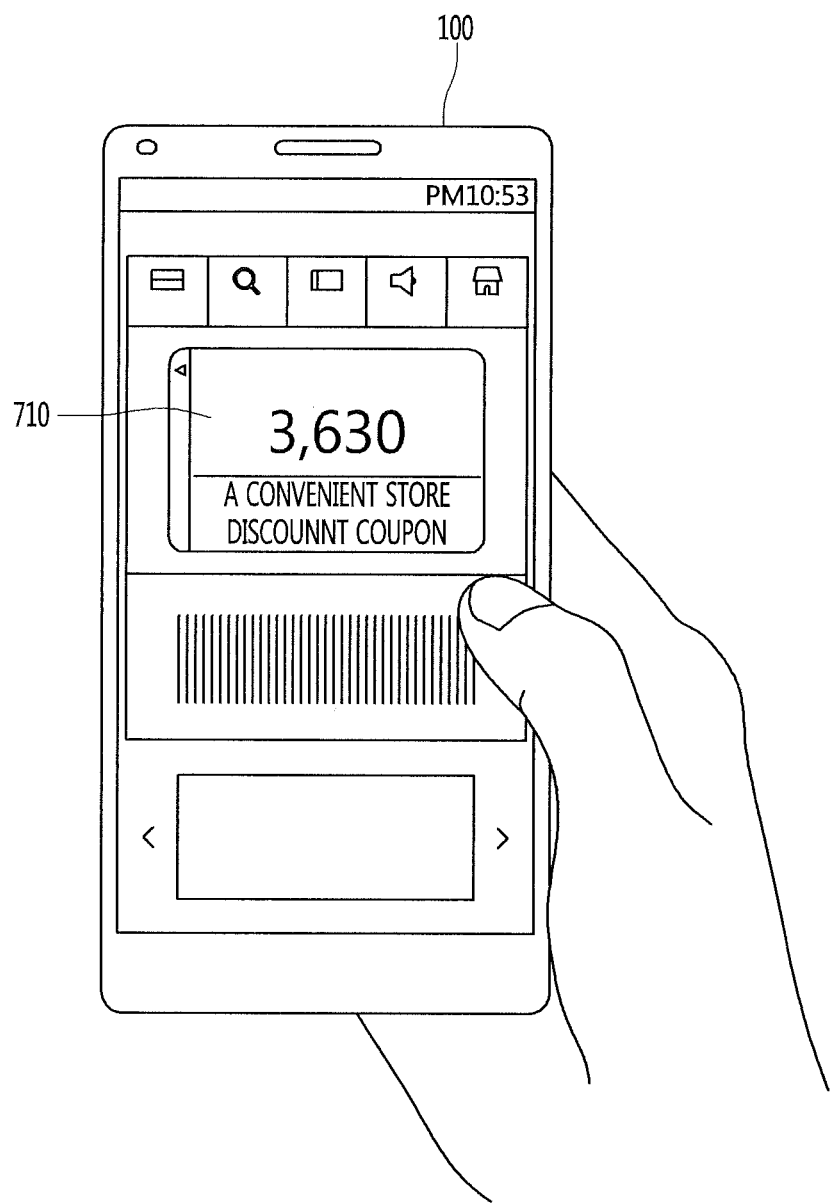

An example of this will be described in detail with reference to FIGS. 7A and 7B. In this implementation, as shown in FIG. 7A, event information is matched to allow a discount coupon image 710 used at a plurality of "convenience stores A" to be used at the plurality of "convenience stores A."

A "place" specified by a user may refer to a single place located at specific coordinates and also a plurality of places corresponding to each other. For example, a "convenience store A" that is a place specified by a user as shown in FIG. 7A may include a plurality of places corresponding to each other, that is, all chain stores of the convenience store A.

Moreover, as shown in FIG. 7B, after a touch on a specific menu 720 is detected, when a user input for specifying a place where the displayed image 710 is displayed is received, the control unit 180 may match location information on a place specified by a user as event information to the displayed image 710 and store it.

In this case, the location information may be wireless signal information. In more detail, the control unit 180 may match wireless signal information commonly transmitted from a plurality of places corresponding to each other as location information on a place specified by a user to the displayed image 710 and store it.

For example, the control unit 180 may match wireless signals (for example, unique BLE signals from the "convenience store A") commonly transmitted from the plurality of "convenience stores A" located in a plurality of regions as location information on a place specified by a user to the displayed image 710 and store it.

In this case, location information on a place specified by a user may be location information obtained by using context information. For example, the control unit 180 may learn wireless signals transmitted from the "convenience store A" on the basis of a "convenience store A" related user input, a user's visit history on the "convenience store A", and wireless signal information sensed by the mobile terminal 100 when visiting the "convenience store A". Then, when a user input for displaying the displayed image 710 again at the "convenience store A" is received, the control unit 180 may match wireless signals transmitted from the "convenience store A" as event information to the displayed image 710 and store it.

FIGS. 8A to 8E are diagrams illustrating examples of matching information on a time point that an image is displayed according to a user input to an image.

Figure 8A:
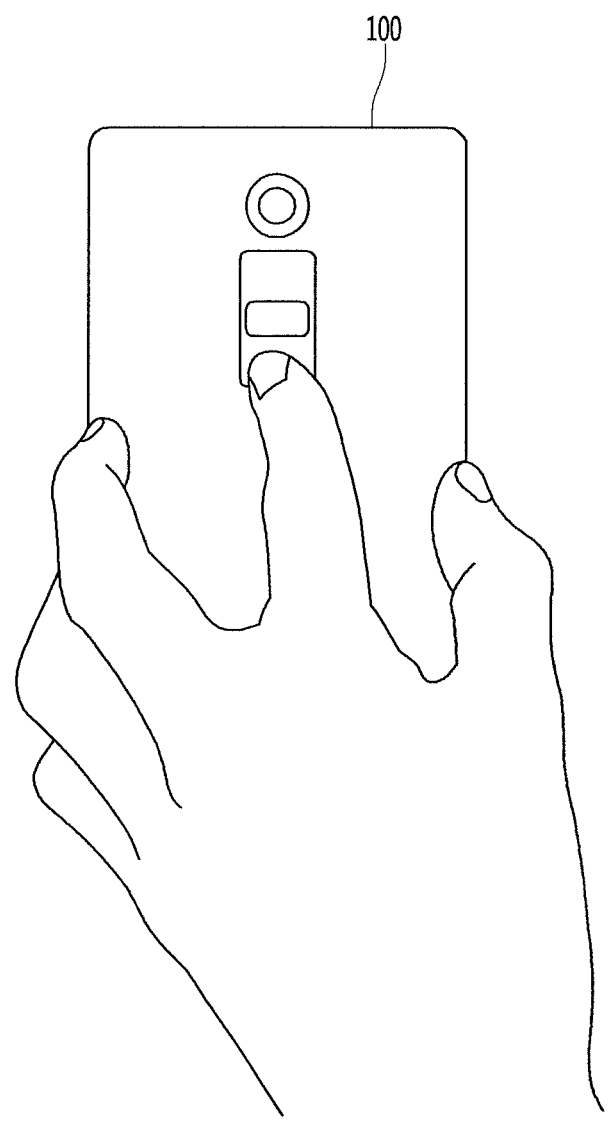

As shown in FIG. 8A, when capturing is performed through a specific capturing mode, the control unit 180 may obtain an image captured through the specific capturing mode, and as shown in FIG. 6B, control the display unit 151 to display the obtained image 810.

Moreover, as a user input for dragging the displayed image 810 is received, the control unit 180, as shown in FIG. 8C, may display a UI object 820 for inputting event information through a user voice input. Additionally, when a user voice input for inputting event information is received through the input unit 120, the control unit 180 may match the received event information to the obtained image 810 and store it in the storage unit 170.

Herein, the event information inputted by the user may be information on a time point that the obtained image is displayed. In more detail, when a user input for specifying a time point that the displayed image 810 is displayed is received, the control unit 180 may match information on a time point specified by a user as event information to the displayed image 810 and store it.

For another example, when a user input for displaying the displayed image 810 on "November 26th" is received, the control unit 180 may match time point information of "November 26th" as event information to the displayed image 810 and store it.

Moreover, the control unit 180 may obtain information on a time point that the image 810 is displayed by using a user input and information pre-stored in the mobile terminal 100 and match the obtained time point information as event information to the displayed image 810 and store the obtained information on a time point. For example, when a user input for "show this picture again on my birthday" is received, the control unit 180 may match time point information of "November 26th" as event information to the displayed image 810 and store the time point information of "November 26th" by using information that the user's birthday is "November 26th" pre-stored in the storage unit 170.

Figure 8D:
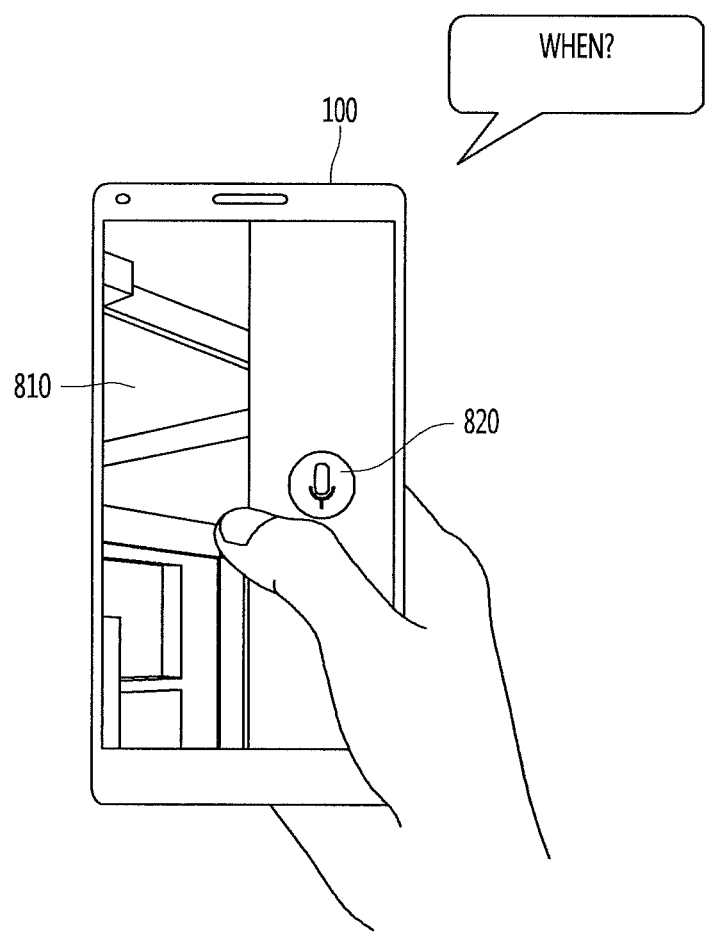

Moreover, when the information on the time point that the image 810 is displayed again is not obtained through a user input, for example, as shown in FIG. 8C, when the display time point of the image 810 is not specified after a user input for "show this picture again later" is received, as shown in FIG. 8D, the control unit 180 may output a query for obtaining a time point that the image 810 is displayed again.

Furthermore, this implementation describes that a query for obtaining a time point that the image 810 is displayed again but is not limited thereto and a query outputted from the mobile terminal 100 may be a query for obtaining a place where an image is displayed again or a query for obtaining information on an application to be displayed together with an image.

Moreover, as shown in FIG. 8E, when a user input for inputting event information is received in response to a query outputted from the mobile terminal 100, the control unit 180 may obtain event information from the received user input and match the obtained event information to the displayed image 810 and store it.

Figure 9A:
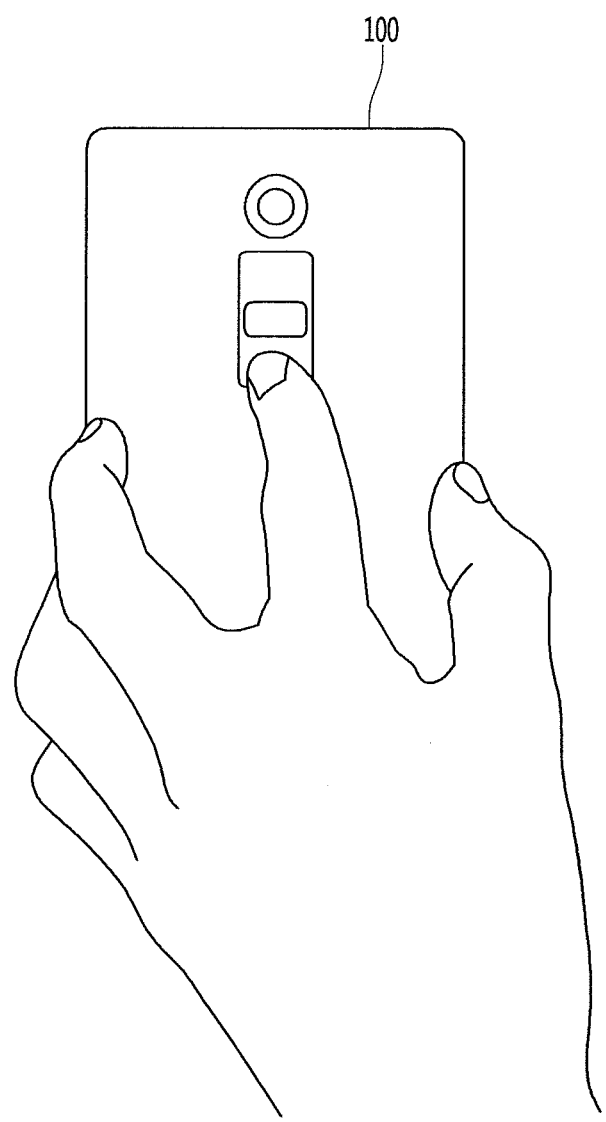
Figure 9B:
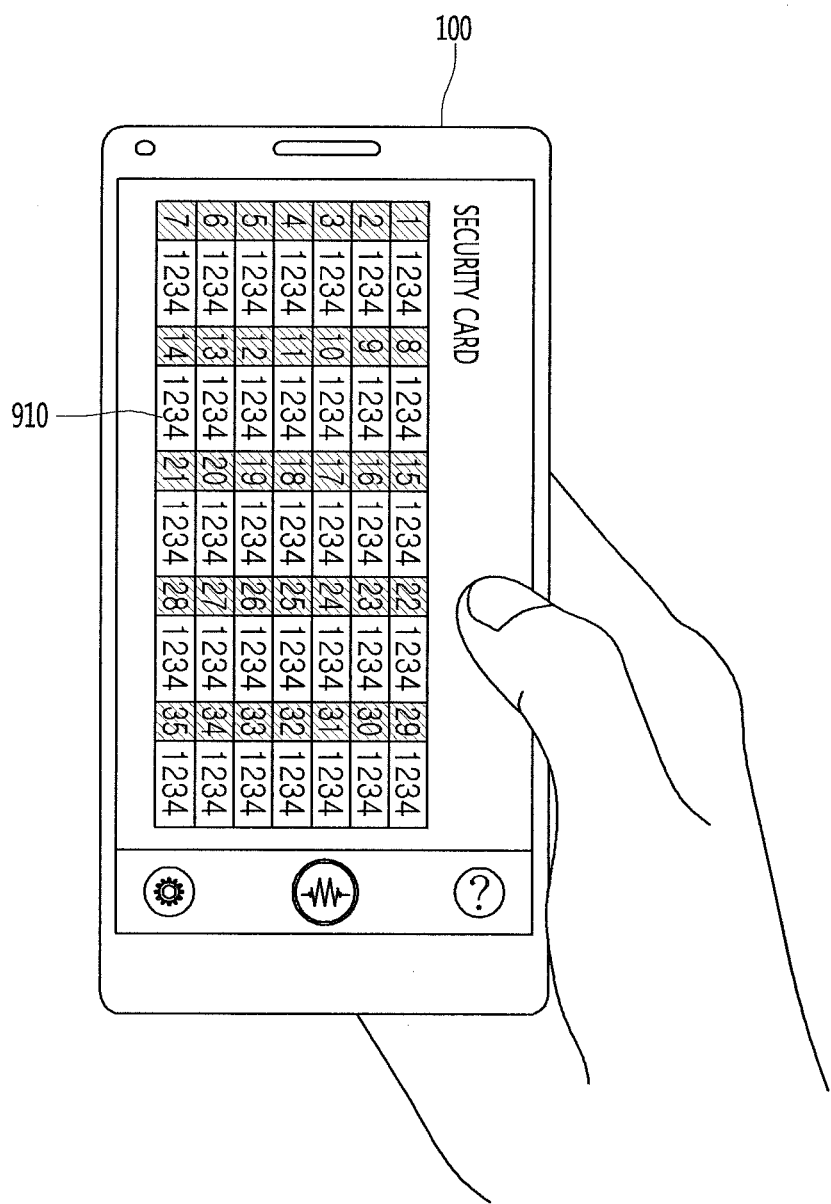

FIGS. 9A to 9C are diagrams illustrating examples of matching application information to be displayed together with an image during application execution to the image according to a user input.

As shown in FIG. 9A, when capturing is performed through a specific capturing mode, the control unit 180 may obtain an image captured through the specific capturing mode, and as shown in FIG. 9B, control the display unit 151 to display the obtained image 910.

Moreover, as a user input for dragging the displayed image 910 is received, the control unit 180, as shown in FIG. 9C, may display a UI object 920 for inputting event information through voice. Additionally, when a user voice input for inputting event information is received through the input unit 120, the control unit 180 may match the received event information to the obtained image 910 and store it in the storage unit 170.

Herein, the event information inputted by the user may be information on a specific application to be displayed together with the obtained image 910 during application execution. In more detail, when a user input for specifying a specific application to be displayed together with the displayed image 910 during application execution, the control unit 180 may match information on an application specified by a user as event information to the displayed image 910 and store it.

For example, when a user input for displaying the obtained image 910 during a "bank B application" execution is received, the control unit 180 may match "bank B application" information as event information to the displayed image 910 and store it.

Moreover, although it is described with reference to FIGS. 6A to 9C that event information is matched by receiving a user voice input and voice-recognizing the received user voice input, implementations are not limited thereto and any suitable user input method for specifying a time point, a place, and/or an application that an obtained image is displayed may be used.

For example, when capturing is performed through a specific mode as shown in FIG. 5, the control unit 180 may obtain an image for specifying a place where an obtained image is displayed again. A displayed image may include location information on a place where an image is obtained or a place frequently visited by a user and when a user input for selecting a specific place among displayed places is received, the control unit 180 may match location information on a place selected by a user to an obtained image and store it in the storage unit 170.

For another example, when capturing is performed through a specific mode as shown in FIG. 5, the control unit 180 may display an image for specifying a time point that an obtained image is displayed again and match time point information inputted by a user to the obtained image and store it in the storage unit 170.

For another example, when capturing is performed through a specific mode as shown in FIG. 5, the control unit 180 may display a list of applications installed on the mobile terminal 100 and match a specific application selected by a user to the obtained image and store it in the storage unit 170.

Additionally, although it is described with reference to FIGS. 6A to 9C that when an image captured through a specific capturing mode is obtained, the obtained image is displayed and as a user input for dragging the displayed image is received, a user input for inputting event information is received, implementations are not limited thereto.

For example, when an image is obtained through a specific capturing mode, the control unit 180 may receive a user input for inputting event information may be received, without a process for displaying the obtained image and a process for receiving a user's drag input.

For another example, when an image captured through a specific capturing mode is obtained and a specific menu displayed on a screen is selected in a state of displaying the obtained display, a user input for inputting event information may be received.

In such a way, according to some implementations, by inputting event information to an image captured through a specific capturing mode, an image for providing information may be easily displayed when a user wants to obtain information.

Figure 10A:
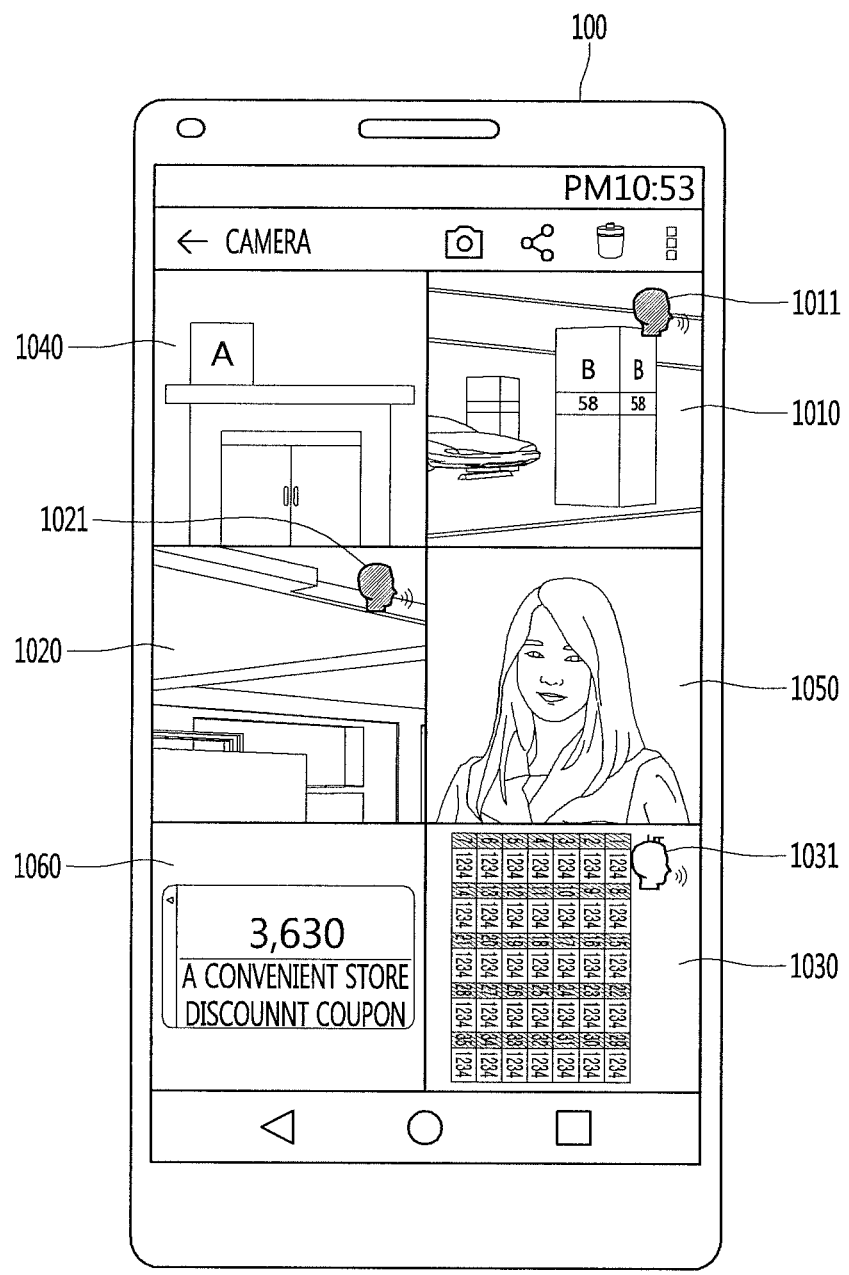

FIGS. 10A and 10B are diagrams illustrating examples of matching event information to a plurality of images obtained by a mobile terminal or setting whether to provide them according to some implementations.

Referring to FIG. 10A, the control unit 180 may obtain a plurality of images and store the plurality of images. The control unit 180 may control the display unit 151 to display a plurality of images obtained by the mobile terminal 100. Herein, the plurality of images may include at least one of an image received from the outside through a mobile communication network or a wireless internet network, an image received from an external device through the wireless communication unit 110 or the interface unit 160, an image obtained through the specific capturing mode of FIG. 5, and an image obtained through another capturing mode instead of a specific capturing mode.

Moreover, icons 1011, 1021, and 1031 for identifying whether event information is matched may be displayed together on an image where event information is matched and stored among a plurality of displayed images. For example, as shown in FIGS. 10A and 10B, images 1010, 1020, and 1030 where event information is matched and stored may be displayed together with the icons 1011, 1021, and 1031 for identifying whether event information is matched.

Moreover, the icons 1011, 1021, and 1031 for identifying whether event information is matched may include activation icons 1011 and 1021 and a deactivation icon 1031.

Herein, among the images 1010, 1020, and 1030 where event information is matched, the activation icons 1011 and 1021 are icons for identifying the images 1010 and 1020 displayed when an event occurs and among the images 1010, 1020, and 1030 where event information is matched, the deactivation icon 1032 is an icon for identifying the image 1030 not displayed even when an event occurs.

For example, when event information "A region" is matched to the first image 1010, the control unit 180 may display the first image 1010 when the mobile terminal 100 is located in the "A region". For another example, when event information "B time point" is matched to the third image 1030, the control unit 180 may not display the third image 1030 when the "B time point" arrives.

Moreover, the activation icons 1011 and 1021 and the deactivation icon 1031 may be displayed with different colors.

Whether to activate the display when an event occurs may be set according to a user input.

For example, when a user input for the first activation icon 1011 is received, the control unit 180 may change the activation icon 1011 into a deactivation icon and display it and even when an event corresponding to the first image 1010 occurs, may not display the first image 1010.

For another example, when a user input for the third deactivation icon 1031 is received, the control unit 180 may change the deactivation icon 1031 into an activation icon and display it and even when an event corresponding to the third image 1030 occurs, display the third image 1030.

Moreover, a plurality of displayed images may include images 1040, 1050, and 1060 where event information is not matched. In this case, when a user input for inputting event information to one of the images 1040, 1050, and 1060 where event information is not matched is received, the control unit 180 may match event information inputted by a user to an image selected by a user and store it in the storage unit 170. That is, the control unit 180 may store the image matched to the inputted event information by matching the inputted event information to a pre-stored image and storing the inputted event information. Herein, the event information inputted by a user may include at least one of information on a time point that an image selected by a user is displayed, information on a place where an image selected by a user is displayed, and information on a specific application to be displayed together with an image an image selected by a user when an application is executed.

For example, as shown in FIG. 10B, after the fourth image 1040 is selected by a user input, if a user input for a time point that the fourth image 1040 is displayed is received, the control unit 180 may match the fourth image 1040 to event information on the time point that the fourth image 1040 is displayed and store the fourth image 1040 matched to the event information on the time point that the fourth image 1040 is displayed in the storage unit 170.

In such a way, by allowing a user to input event information to an obtained image, the obtained image may be managed as an image for providing information even if it is not an image captured through a specific capturing mode.

Figure 11A:
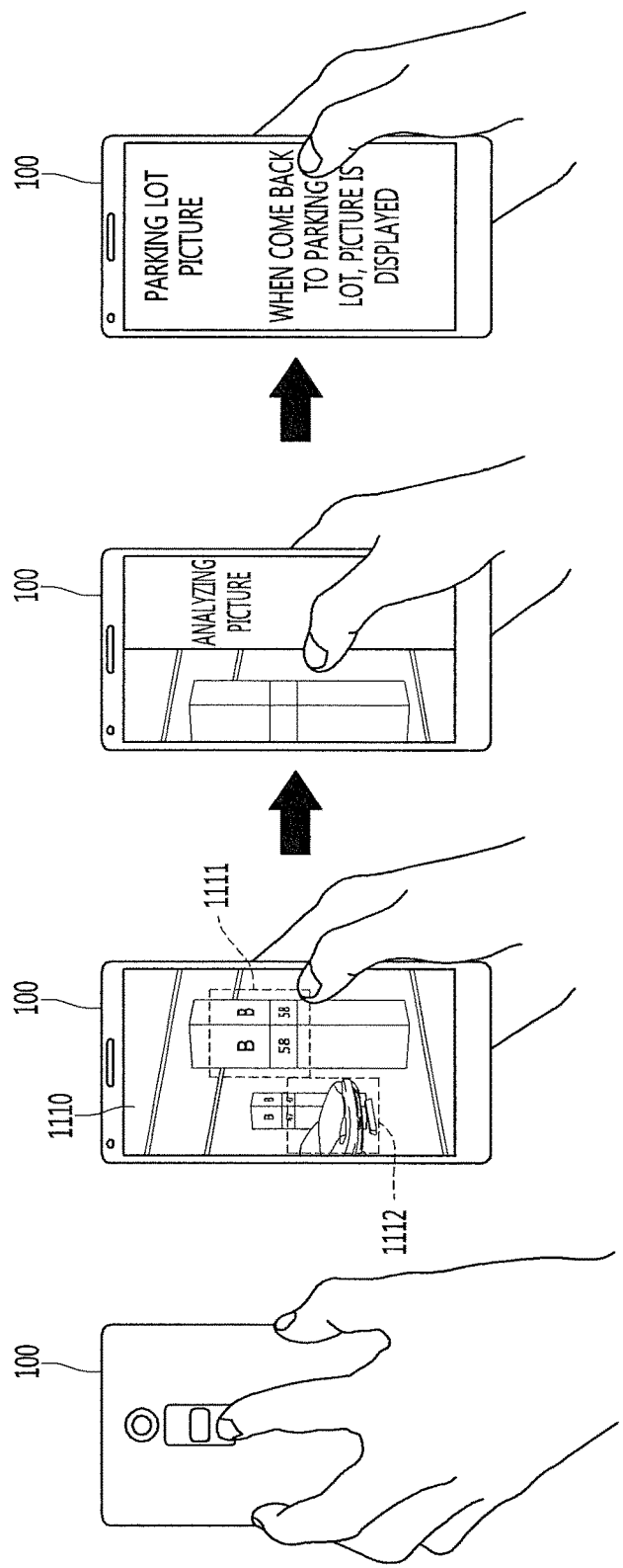
FIGS. 11A and 11B are diagrams illustrating examples of obtaining event information that is to be associated with an image captured through a specific image capturing mode, and associating the event information to the image according to some implementations.
Figure 11B:
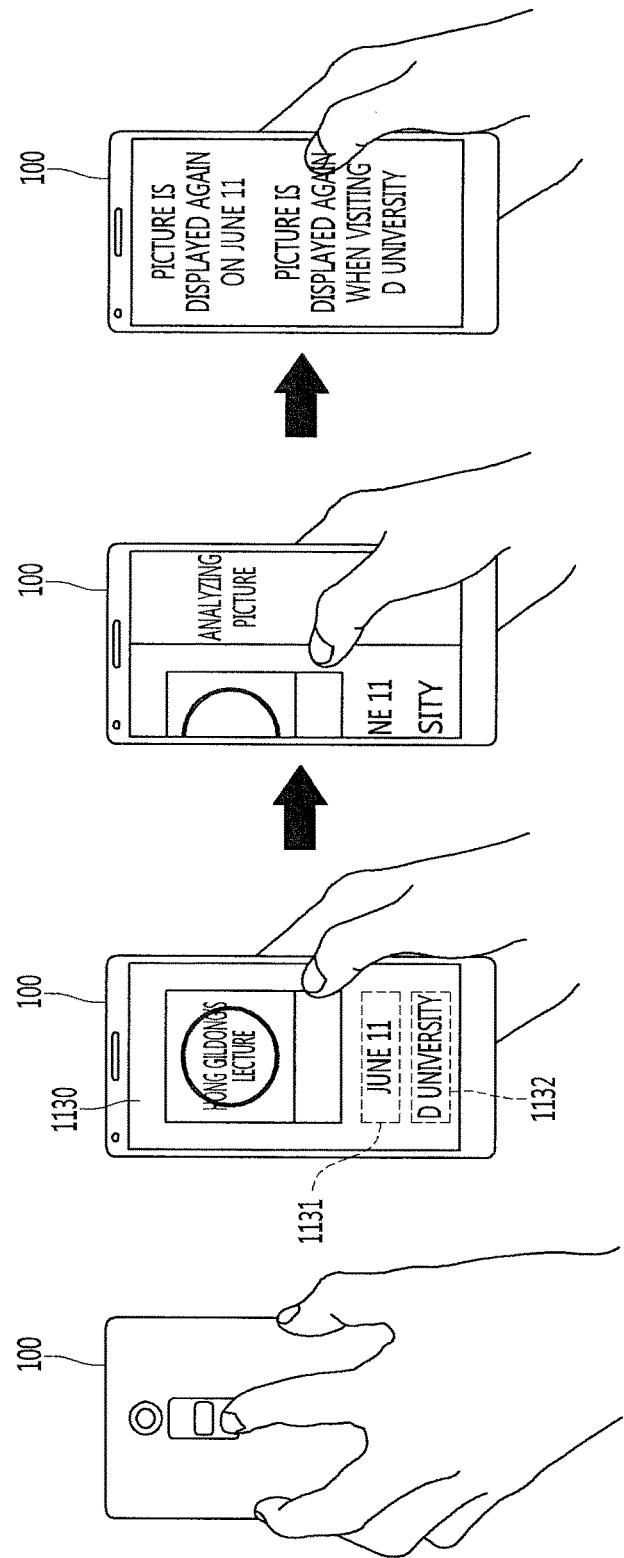

FIGS. 11A and 11B are diagrams illustrating examples of obtaining event information on an image captured through a specific capturing mode and matching it to an image according to some implementations.

The control unit 180 may obtain event information on an image captured through a specific capturing mode and match the captured image to the event information and store the image matched the event information.

Herein, the event information may be obtained based on at least one of an object included in an image captured through a specific capturing mode, a text included in an image captured through a specific capturing mode, information on a time point that an image is captured through the specific capturing mode, and information on an application executed when an image is captured through the specific capturing mode.

For example, as shown in FIG. 11A, the control unit 180 may obtain information on a place where a picture is taken based on objects 1111 and 1112 included in an image 1110 captured through a specific capturing mode. That is, since the object representing a parking zone sign and the object 1112 representing a vehicle are included in the image 1110 captured through a specific capturing mode, the control unit 180 may determine that the image 1110 is taken at a parking lot.

Then, the control unit 180 may match information on a place where the image 1110 is captured through a specific capturing mode, as event information, to the image 1110 captured through the specific capturing mode and store it. For example, the control unit 180 may match place information "parking lot" as event information to the image 1110 captured through a specific capturing mode and store it. That is, the control unit 180 may store the image 1110 matched to the event information (parking lot) by matching the event information (parking lot) to the image 1110 and storing the image 1110 and the event information (parking lot).

Moreover, the location information "parking lot" may be obtained by using context information. For example, the control unit 180 may learn location information of a parking lot (for example, the coordinates of a parking lot or wireless signals detected from a parking lot) on the basis of coordinates when a user visits the "parking lot" and wireless signals when a user visits the "parking lot".

Then, when the mobile terminal 100 moves to the location of a parking lot obtained by using context information, the control unit 180 may display the image 1110 where location information "parking lot" is matched as event information.

Additionally, the control unit 180 may match the location information of a mobile terminal (for example the coordinates of a parking lot or wireless signals detected from a parking lot) when the image 1110 is captured, as event information, to the image 1110 and store it.

Then, when the mobile terminal 100 moves to the location of a mobile terminal where the image 1110 is captured, the control unit 180 may display the image 1110 where the location information of the mobile terminal is matched as event information.

Moreover, as shown in FIG. 11B, the control unit 180 may obtain at least one of information on a place and time information that an image is to be displayed based on the texts 1131 and 1132 included in the image 1130 captured through a specific capturing mode.

For example, the text 1131 representing a time and the text 1132 representing a place are included in the image 1130 captured through a specific capturing mode.

Then, the control unit 180 may obtain event information on a time point that the image 1130 is displayed on the basis of the text 1131 representing a time in the image 1130. For example, as shown in FIG. 11B, when Hong Gildong's lecture is held June 11, the control unit 180 may display the image 1130 when it comes to June 11.

Additionally, the control unit 180 may obtain event information on a place where the image 1130 is displayed on the basis of the text 1132 representing a place in the image 1130. For example, as shown in FIG. 11B, when Hong Gildong's lecture is held in a "D university," the control unit 180 may allow a user to check the details of the lecture by displaying the image 1130 when a mobile terminal moves to the "D university."

Additionally, the control unit 180 may match event information obtained from the image 1130 to the image 1130 and store it.

Moreover, the location information of the "D university" may be obtained by using context information. For example, the control unit 180 may learn location information of the "D university" (for example, the coordinates of the D university or wireless signals detected from the D university) on the basis of at least one of the coordinates when a user visits the "D university" and wireless signals when a user visits the "D university".

Additionally, the location information of the "D university" may be obtained through wired/wireless network. For example, the control unit 180 may obtain the location information of the "D university" by obtaining the location information of the "D university" on internet through wired/wireless network.

Then, when the mobile terminal 100 moves to the location of the "D university", the control unit 180 may display the image 1130 where the location information of the "D university" is matched as event information.

Then, when it comes to "June 11", the control unit 180 may display the image 1130 where time point information "June 11" is matched as event information.

Moreover, the control unit 180 may match information on a time point that an image is captured through a specific capturing mode, as event information, to the image captured through the specific capturing mode and store it. For example, when an image is captured at 03:00 pm Aug. 15, 2015, the control unit 180 may match time point information "03:00 pm Aug. 15, 2015" as event information to an image.

Then, the control unit 180 may display an image at a time point corresponding to the time point information matched as event information. For example, the control unit 180 may display an image where the time point information "03:00 pm Aug. 15, 2015" is matched as event information every day. For another example, the control unit 180 may display an image where the time point information "03:00 pm Aug. 15, 2015" is matched as event information, at 03:00 pm Aug. 15, 2016.

Moreover, the control unit 180 may match information on an application executed at a time point that an image is captured through a specific capturing mode, as event information, to the image captured through the specific capturing mode and store it. For example, in a state that an execution screen of an "A application" is displayed on the screen of the mobile terminal 100 as the "A application" is executed, when a "B image" is captured through a specific capturing mode, the control unit 180 may match the "A application" as event information to the "B image" and store it.

Then, in the case that specific application information is matched to a specific image, when a specific application is executed, the control unit 180 may display a specific image where the specific application information is matched. For example, when the "A application" is executed, the control unit 180 may display the "B image" together with the execution screen of the "A application."

In such a way, unlike the implementations of FIGS. 6A to 10B in which event information is matched to an image by a user input, according to this implementation, event information is automatically matched to an image on the basis of a captured image, location information during capturing, time point information during capturing, and information on an application executed during capturing, so that a user's convenience may be improved.

FIGS. 12 to 15 are diagrams illustrating a process of classifying a plurality of images obtained by a mobile terminal and displaying them by each category according to some implementations.

FIG. 12 is a view illustrating a plurality of images 1205, 1210, 1215, 1220, 1225, 1230, 1235, 1240, 1245, 1250, 1255, and 1260 obtained by the mobile terminal 100. The plurality of images shown in FIG. 12 are images obtained through a specific capturing mode but implementations are not limited thereto.

The control unit 180 may determine a category of each of the plurality of obtained images 1205, 1210, 1215, 1220, 1225, 1230, 1235, 1240, 1245, 1250, 1255, and 1260, and display some of the plurality of obtained images 1205, 1210, 1215, 1220, 1225, 1230, 1235, 1240, 1245, 1250, 1255, and 1260 by each category. In more detail, the control unit 180 may determine a category of each of the plurality of obtained images 1205, 1210, 1215, 1220, 1225, 1230, 1235, 1240, 1245, 1250, 1255, and 1260 on the basis of at least one of an object detected in the image and information on a place where a plurality of images are obtained, which are included in each of the plurality of obtained images 1205, 1210, 1215, 1220, 1225, 1230, 1235, 1240, 1245, 1250, 1255, and 1260, and display some of the plurality of obtained images 1205, 1210, 1215, 1220, 1225, 1230, 1235, 1240, 1245, 1250, 1255, and 1260 by each category.

Figure 13A:
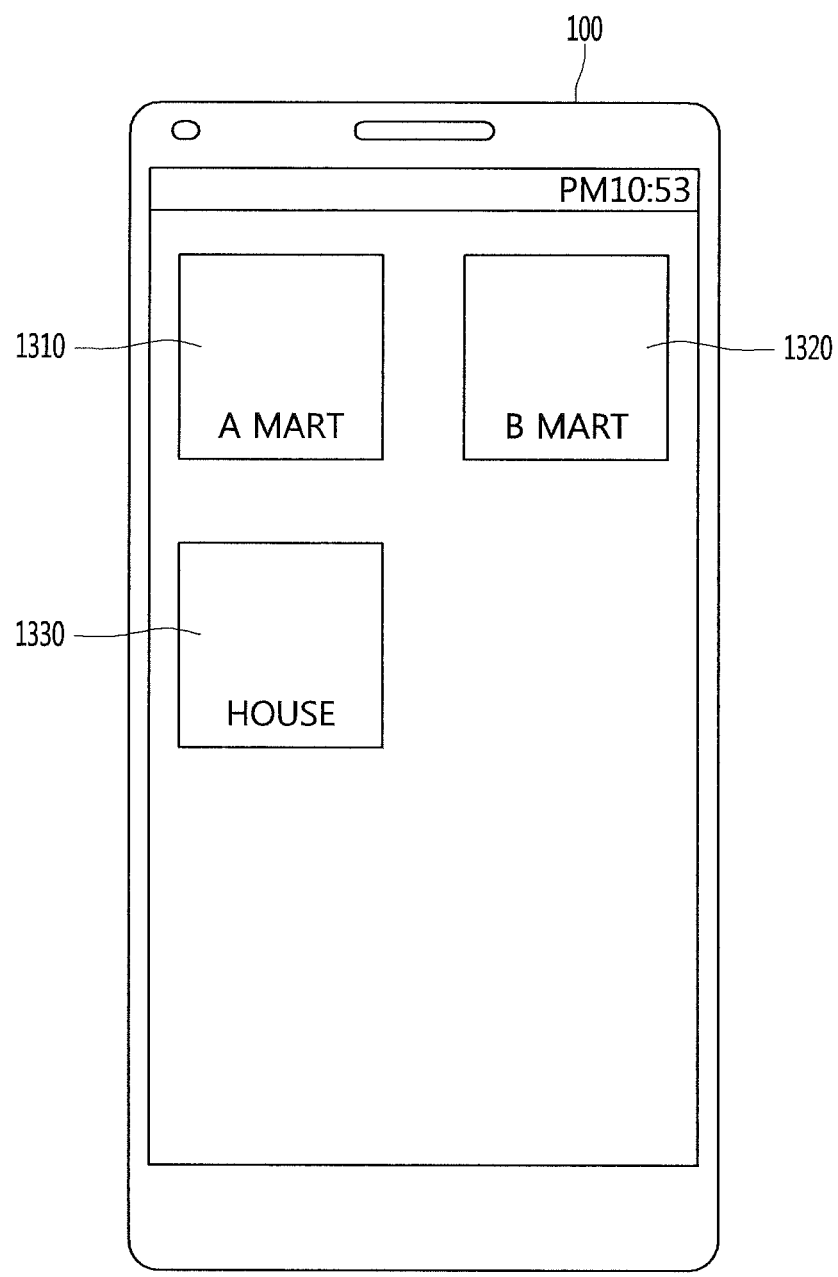
FIGS. 13A and 13B are diagrams illustrating examples of displaying a plurality of images by category, according to some implementations.
Figure 13B:
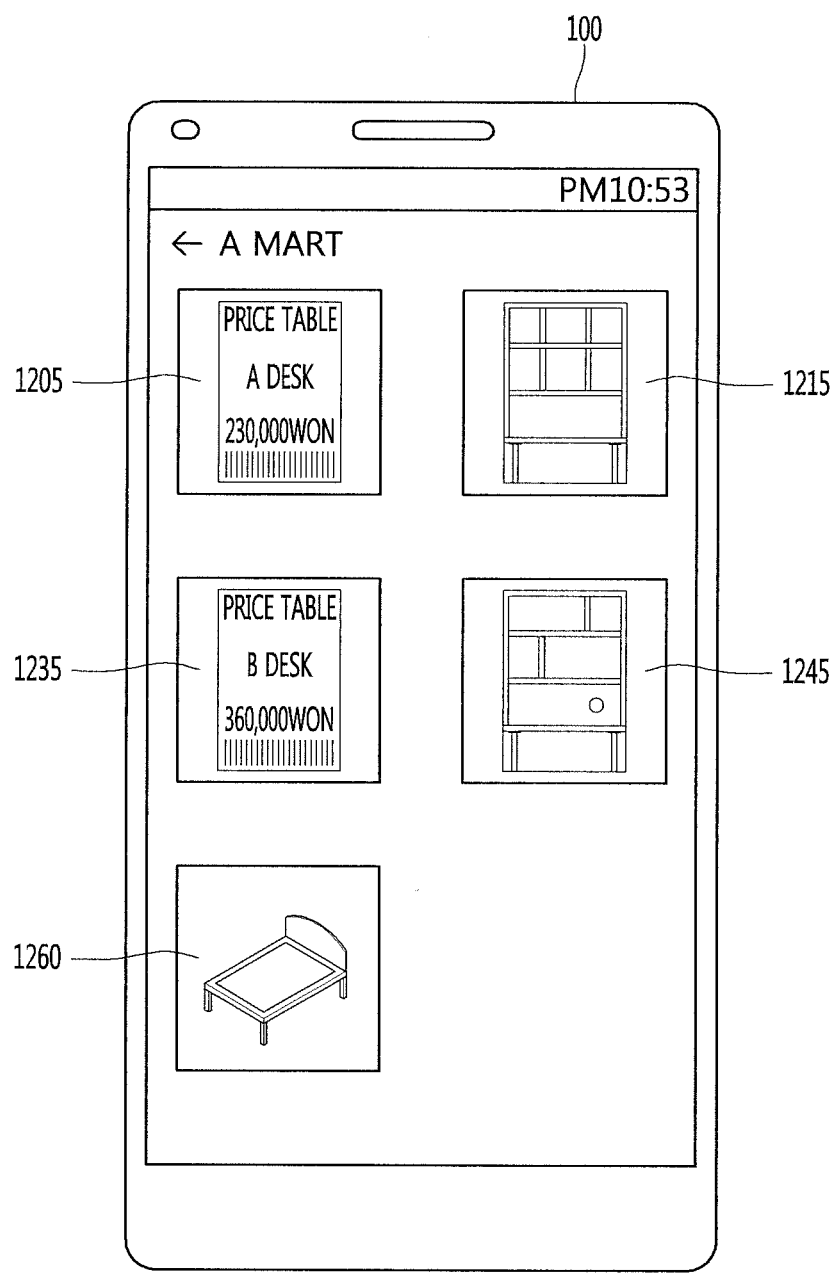

FIGS. 13A and 13B are diagrams illustrating examples of displaying a plurality of images by each category according to some implementations.

When an image is captured, the control unit 180, as mentioned above, may obtain location information of the captured image. In more detail, the control unit 180 may obtain information on a location where an image is captured on the basis of, for example, GPS coordinates, wireless signals, or context information during image capturing, etc.

Additionally, the control unit 180 may classify a plurality of images (e.g., the plurality of images 1205, 1210, 1215, 1220, 1225, 1230, 1235, 1240, 1245, 1250, 1255, and 1260 in FIG. 12) by each category and display UI objects 1310, 1320, and 1330 for displaying an image by each category according to a user selection. For example, the control unit 180 may classify, as a first category, a subset of images among the plurality of images (e.g., a subset of the plurality of images 1205, 1210, 1215, 1220, 1225, 1230, 1235, 1240, 1245, 1250, 1255, and 1260 in FIG. 12) that were obtained at a first location. The control unit 180 may then display a first UI object 1310 for displaying the subset of images classified as the first category according to a user selection.

Additionally, as shown in FIG. 13A, when a category is classified according to locations where the plurality of images 1205, 1210, 1215, 1220, 1225, 1230, 1235, 1240, 1245, 1250, 1255, and 1260 are obtained, the control unit 180 may display information regarding a location where an image is obtained together with the UI objects 1310, 1320, and 1330 for displaying an image by each category. For example, when a location where images classified as the first category is determined to be an "A mart" location, then the "A mart" icon may be displayed together on the first UI object 1310.

Moreover, when the first UI object 1310 is selected from the plurality of displayed UI objects 1310, 1320, and 1330, the control unit 180 may display images classified as the first category, that is, a subset of images 1205, 1215, 1235, 1245, 1260 obtained at the first location.

In such a way, pictures that a user captures to obtain information are classified by a location and displayed, so that user's information acquisition may be accomplished easily. For example, when a user shops at an A mart and takes pictures of the types, designs, prices of products sold in the A mart to remember them, according to some implementations, the pictures captured at the A mart are classified and displayed, so that user's information acquisition may become easy.

Figure 14A:
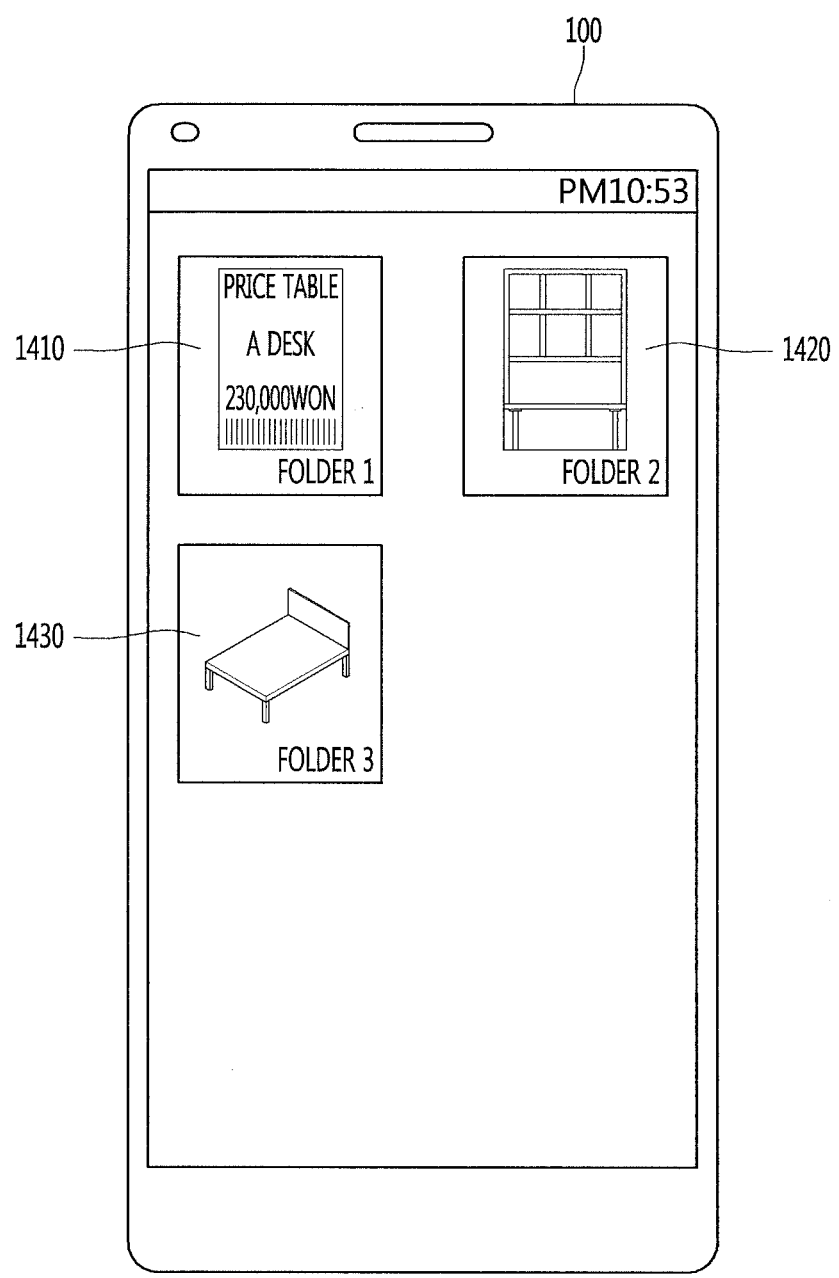
FIGS. 14A to 14C are diagrams illustrating examples of displaying a plurality of images based on an object detected in the images, according to some implementations.
Figure 14B:
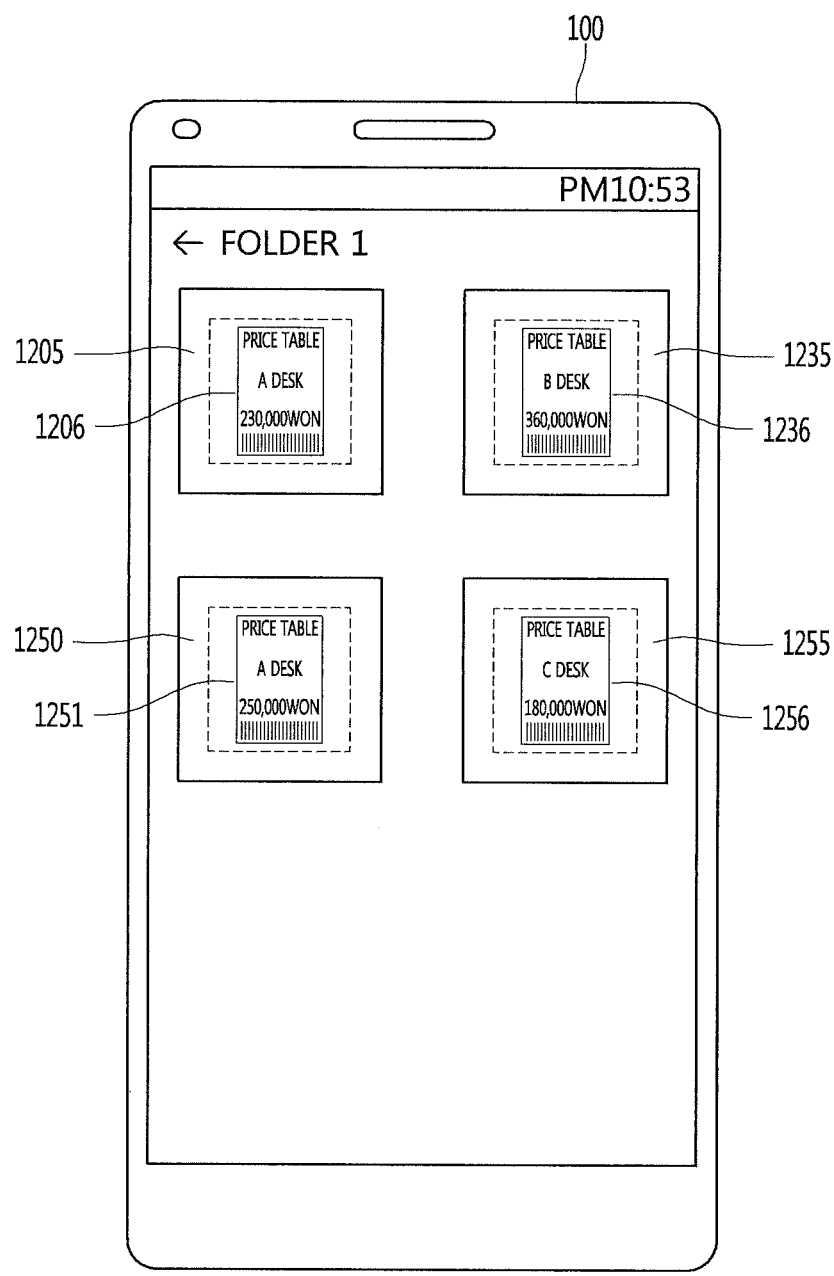
Figure 14C:
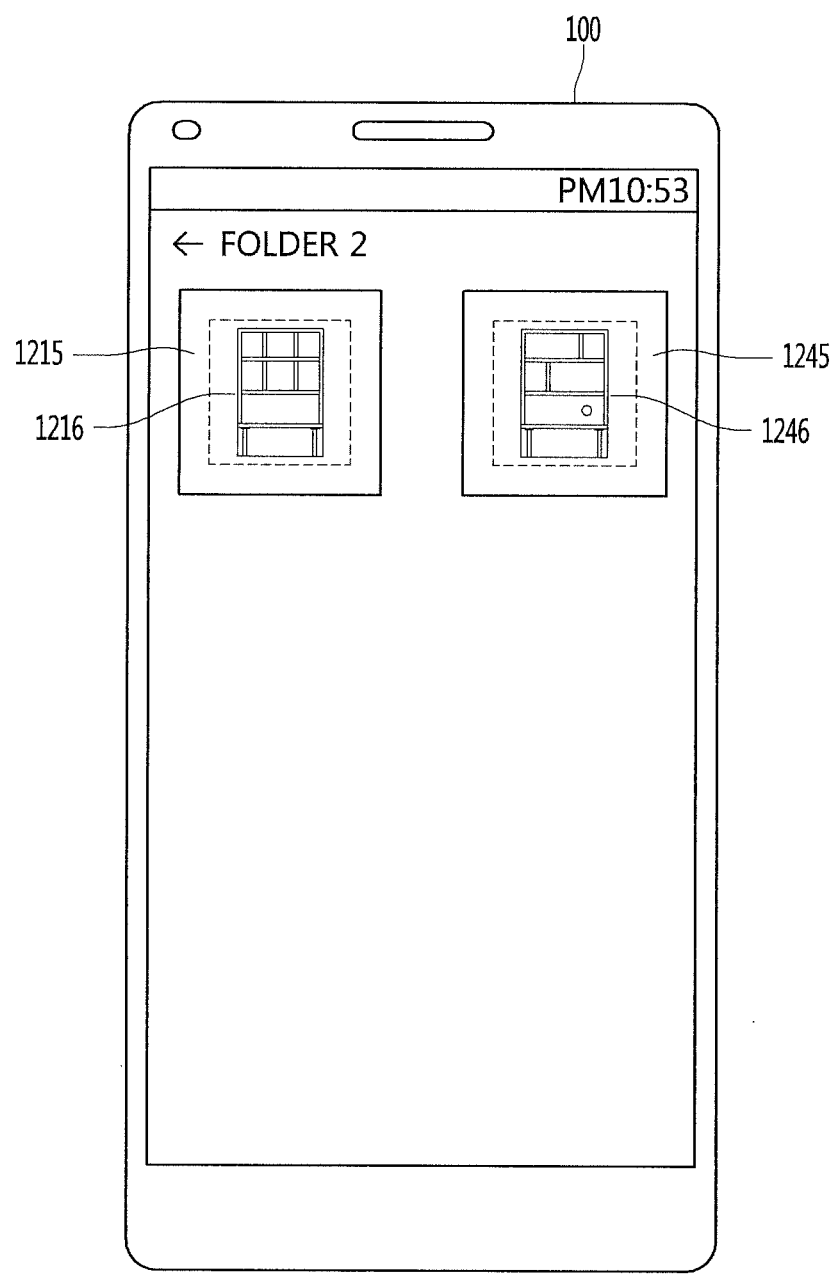

FIGS. 14A to 14C are diagrams illustrating examples of displaying a plurality of images depending on an object detected in an image, according to some implementations.

The control unit 180 may extract a feature vector from a plurality of images (e.g., the plurality of images 1205, 1210, 1215, 1220, 1225, 1230, 1235, 1240, 1245, 1250, 1255, and 1260 in FIG. 12), and compare the extracted feature vector with a feature vector database, so that it may determine which object is included in each of the plurality of images 1205, 1210, 1215, 1220, 1225, 1230, 1235, 1240, 1245, 1250, 1255, and 1260. For example, the control unit 180 may determine that an object included in each image of a subset of images 1205, 1235, 1250, and 1255 is a "price tag" by using a feature vector extracted from the images 1205, 1235, 1250, and 1255 of FIG. 12. For another example, the control unit 180 may determine that an object included in each of the images 1215 and 1245 is a "bookshelf" by using a feature vector extracted from the images 1215 and 1245 of FIG. 12.

As shown in FIG. 14A, the control unit 180 may classify the plurality of images (e.g., the plurality of images 1205, 1210, 1215, 1220, 1225, 1230, 1235, 1240, 1245, 1250, 1255, and 1260 in FIG. 12) by each category and display UI objects 1410, 1420, and 1430 for displaying an image by each category according to a user selection. For example, the control unit 180 may classify, as a first category, images including a first object among the plurality of images 1205, 1210, 1215, 1220, 1225, 1230, 1235, 1240, 1245, 1250, 1255, and 1260 and display a first UI object 1410 for displaying images classified as the first category according to a user selection. For another example, the control unit 180 may classify, as a second category, images including a second object among the plurality of images 1205, 1210, 1215, 1220, 1225, 1230, 1235, 1240, 1245, 1250, 1255, and 1260 and display a second UI object 1420 for displaying images classified as the second category according to a user selection.

Moreover, when a specific UI object 1410 is selected from the plurality of displayed UI objects 1410, 1420, and 1430, the control unit 180 may display at least a part of an image corresponding to a UI object selected by a user.

For example, as shown in FIG. 14B, when the first UI object 1410 is selected from the plurality of displayed UI objects 1410, 1420, and 1430, the control unit 180 may display images classified as the first category, that is, at least part of the images 1205, 1235, 1250, and 1255 including the first objects 1206, 1235, 1251, and 1256.

For another example, as shown in FIG. 14C, when the second UI object 1420 is selected from the plurality of displayed UI objects 1410, 1420, and 1430, the control unit 180 may display images classified as the second category, that is, at least part of the images 1215 and 1245 including the second objects 1216 and 1246.

In such a way, pictures that a user captures to obtain information are classified by an object detected in an image and displayed, so that user's information acquisition may be accomplished easily.

For example, when a user takes a picture of a "price tag" in order to compare prices for the same product while shopping in an A mart and a B mart, implementations described herein may classify and display the "price tag" pictures, so that user's information acquisition may become easy.

For another example, when a user takes a picture of a "bookshelf" in order to compare designs for the "bookshelf" while shopping in an A mart and a B mart, implementations described herein may classify and display the "bookshelf" pictures, so that user's information acquisition may become easy.

Figure 15:
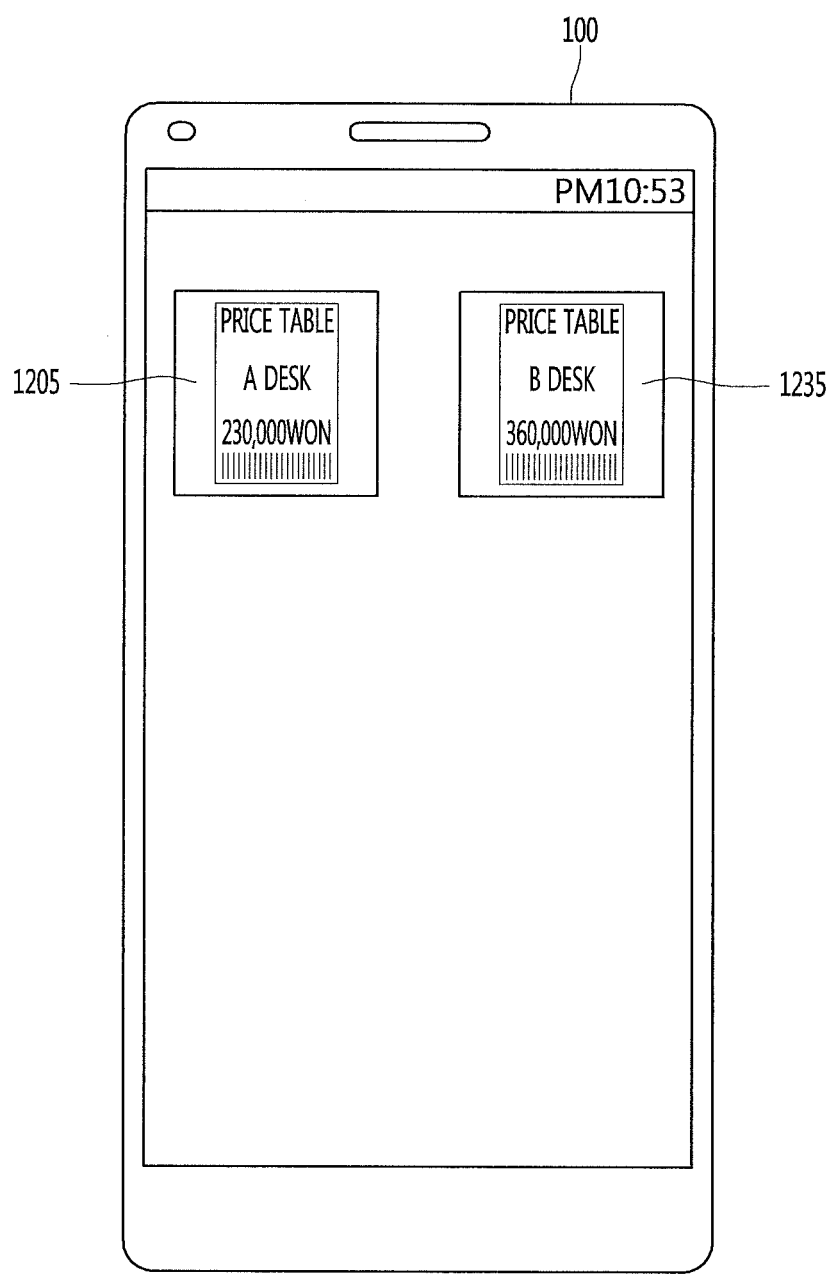
FIG. 15 is a diagram illustrating an example of displaying a plurality of images based on a location associated with the images and an object detected in the images, according to some implementations.

FIG. 15 is a diagram illustrating a process of displaying a plurality of images depending on a place and an object detected in the image, according to some implementations.

When capturing a plurality of images (e.g., images 1205, 1210, 1215, 1220, 1225, 1230, 1235, 1240, 1245, 1250, 1255, and 1260 in FIG. 12), the control unit 180 may obtain place information of the captured images. Additionally, the control unit 180 may extract a feature vector from a plurality of images 1205, 1210, 1215, 1220, 1225, 1230, 1235, 1240, 1245, 1250, 1255, and 1260, and compare the extracted feature vector with a feature vector database, so that it may determine which object is included in each of the plurality of images 1205, 1210, 1215, 1220, 1225, 1230, 1235, 1240, 1245, 1250, 1255, and 1260.

Then, the control unit 180 may display the plurality of images 1205, 1210, 1215, 1220, 1225, 1230, 1235, 1240, 1245, 1250, 1255, and 1260 by each category on the basis of a place where an image is captured and an object included in an image. For example, the control unit 180 may classify a category of the plurality of images 1205, 1210, 1215, 1220, 1225, 1230, 1235, 1240, 1245, 1250, 1255, and 1260 according to whether an image includes an object that is common to each other and is obtained at the same place. Then, the control unit 180 may display a selected subset of the plurality of images, such as images 1205 and 1235 in FIG. 15, that have an object common to each other and that were obtained at the same place.

In such a way, pictures that a user captures to obtain information are classified by an object detected in an image and displayed, so that user's information acquisition may be accomplished easily.

For example, when a user takes pictures of the price tags of bookshelves in order to compare the prices of the bookshelves while shopping in an "A mart" and takes pictures of beds in order to compare the designs of the beds while shopping in the "A mart" and takes pictures of the price tags of chairs in order to compare the prices of the chairs while shopping in a "B mart," implementations described herein may classify and display the price tag images of the bookshelves captured in the "A mart," so that user's information acquisition may become easy.

Figure 16A:
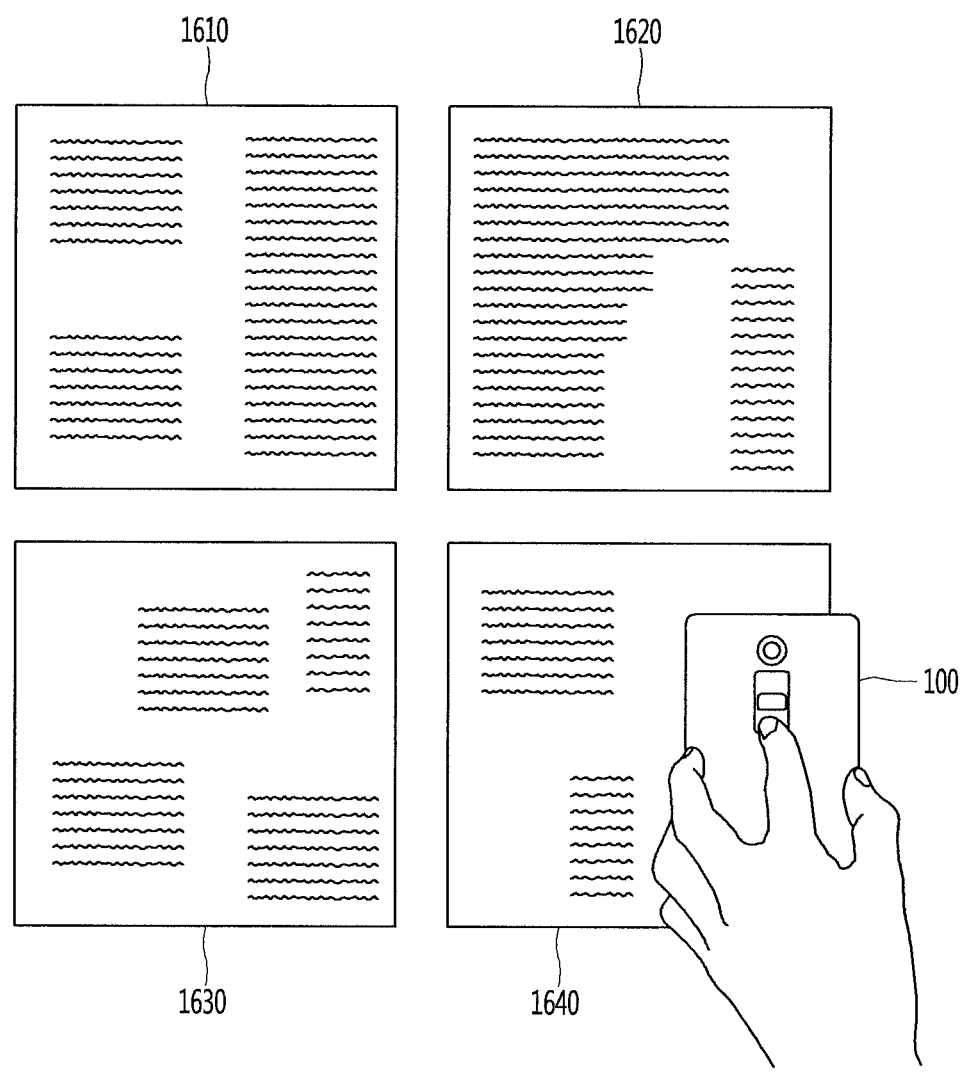
FIGS. 16A and 16B are diagrams illustrating examples of classifying and displaying images based on text that is detected in the images, according to some implementations.
Figure 16B:
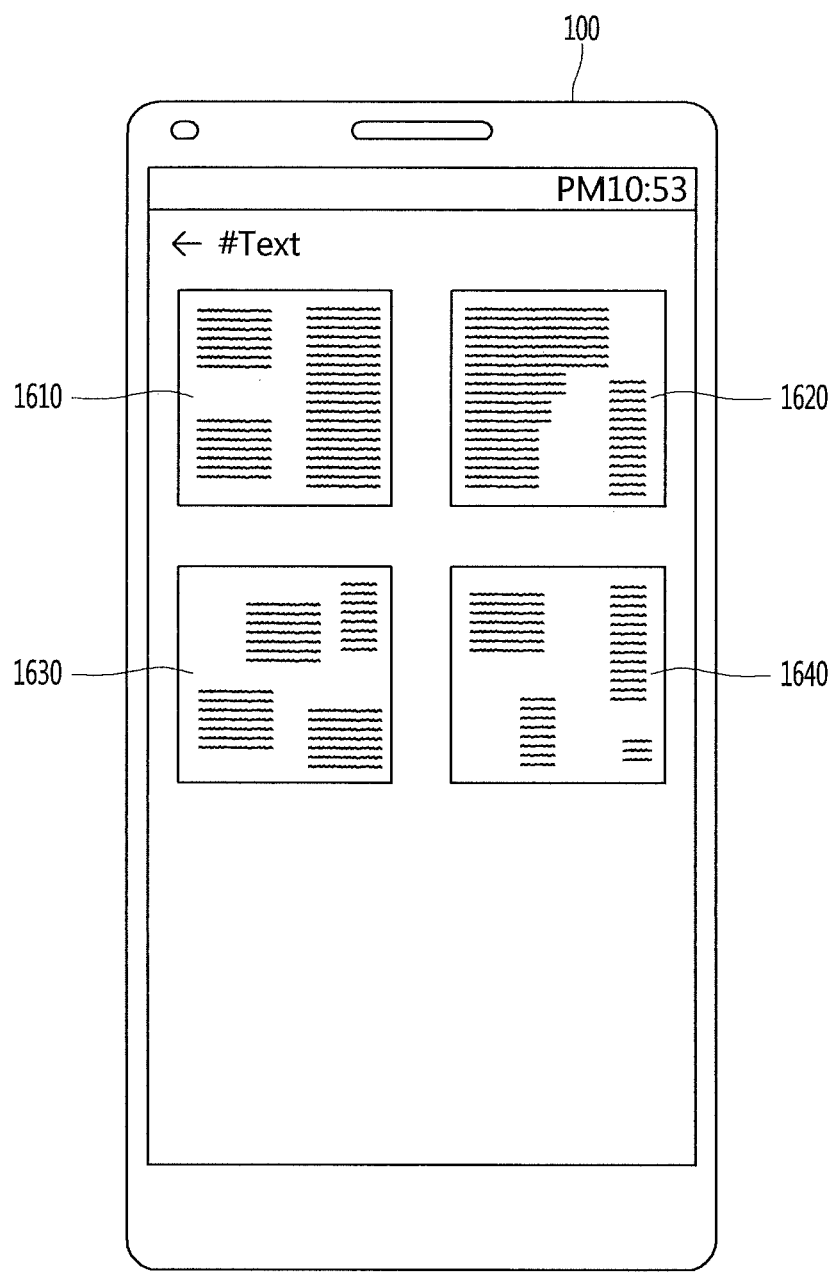

FIGS. 16A and 16B are diagrams illustrating a process of classifying and displaying an image including text among a plurality of images according to an implementation.

Referring to FIG. 16A, when images 1610, 1620, 1630, and 1640 are captured through a specific capturing mode, the control unit 180 may recognize texts included in the images 1610, 1620, 1630, and 1640 captured through the specific capturing mode and classify the images 1610, 1620, 1630, and 1640 including the texts.

Then, the control unit 180 may display a folder including the images 1610, 1620, 1630, and 1640 including the texts, and when the folder is selected by a user, as shown in FIG. 16B, the control unit 180 may display the images 1610, 1620, 1630, and 1640 including the texts.

Moreover, this implementation describes that images are classified and displayed based on whether text is included, but implementations are not limited thereto.

In more detail, the control unit 180 may classify and display images on the basis of texts and objects detected in an image captured through a specific capturing mode. As an example, if the images shown in FIGS. 16A and 16B were captured through a specific capturing mode from written contents on a white board, such that a user divides and captures texts written on a white board, then the control unit 180 may classify and display images including the white board and the texts among the images captured through the specific capturing mode.

Additionally, the control unit 180 may classify and display images on the basis of texts included in an image captured through a specific capturing mode based on a location where an image is captured. For example, when a user captures texts at an "A institute" location and captures texts at a "B institute" location through a specific capturing mode in order to remember the lectures, then the control unit 180 may classify and display images including the texts according to whether the images were captured at the "A institute" or the "B institute."

Referring back to FIG. 3, in the example process of operating a mobile terminal according to an implementation, if a specific event occurs, then an image is displayed corresponding to the specific event among at least one image that is matched to each of at least one event information and stored in operation S350. In more detail, when a specific event occurs, the control unit 180 may obtain event occurrence information on each of a plurality of images by using a plurality of event information matched to the plurality of images and display an image corresponding to the specific event among the plurality of images. This will be described in more detail with reference to FIGS. 17A to 17D and FIG. 19, below.

FIGS. 17A to 17D are diagrams illustrating a process of displaying an image when information on a place where the image is displayed is matched as event information according to some implementations.

When an event occurs indicating that the mobile terminal 100 moves to a specific place, the control unit 180 may obtain event occurrence information for each of a plurality of images by using event information matched to the plurality of images. For example, when the mobile terminal 100 moves to a parking lot, the control unit 180 may obtain the location information of the mobile terminal 100. Location information may be obtained by any suitable technique, for example, on the basis of the GPS coordinates of the parking lot or wireless signal information such as Bluetooth signals transmitted from an electronic device in a vehicle parked in the parking lot, BLE signals transmitted from Beacon, WiFi signals transmitted from a wireless Access Point (AP), and/or signals transmitted during an NFC process. If the control unit 180 determines that the current location information of the mobile terminal 100 corresponds to location information matched to the third image 1770 among the plurality of images 1710, 1720, 1730, 1740, 1750, 1760, 1770, and 1780 stored in the mobile terminal 100 shown in FIG. 17A, then the control unit 180 may display the third image 1770 that is an image corresponding to the currently occurring event.

Figure 17B:
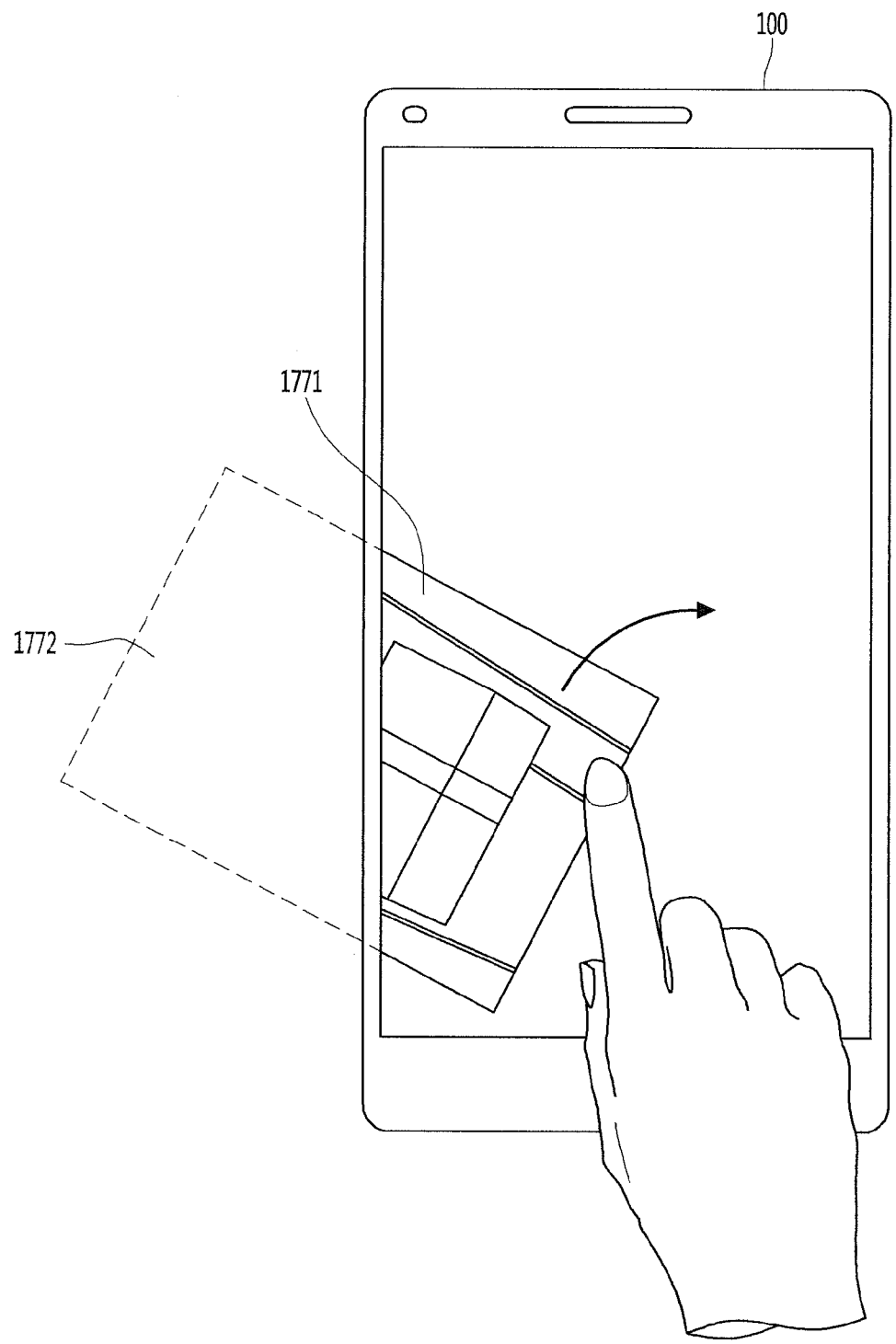

In some implementations, as shown in FIG. 17B, the control unit 180 may display a portion 1771 of the third image 1770 on the screen edge of the mobile terminal 100. For example, as shown in FIG. 17B, a portion 1771 of a first area of the third image 1770 is displayed on the screen and a portion 1772 of a second area of the third image 1770 is not displayed on the screen. In some implementations, the control unit 180 may control the display unit 151 to display the portion 1771 of the first area of the third image 1770 along the screen edge.

Furthermore, although this example describes a portion of the third image 1770 displayed along the screen edge, implementations are not limited thereto. In some implementations, the control unit 180 may display all or part of the third image 1770 in another area of the screen. For example, the control unit 180 may display the entire third image 1770 along the screen edge. As another example, the control unit 180 may display the entire third image 1770 in a specific area of the screen. As another example, the control unit 180 may display the entire third image 1770 in full screen mode.

In some implementations, as shown in FIG. 17B, when a user input for touching the portion 1771 of the third image 1770 displayed on the screen is received, the control unit 180 may control the display unit 151 to display the entire third image 1770 on the screen of a mobile terminal. In this case, the user input may be, as an example, a user input for touching and dragging the portion 1771 of the third image 1770.

Figure 17C:
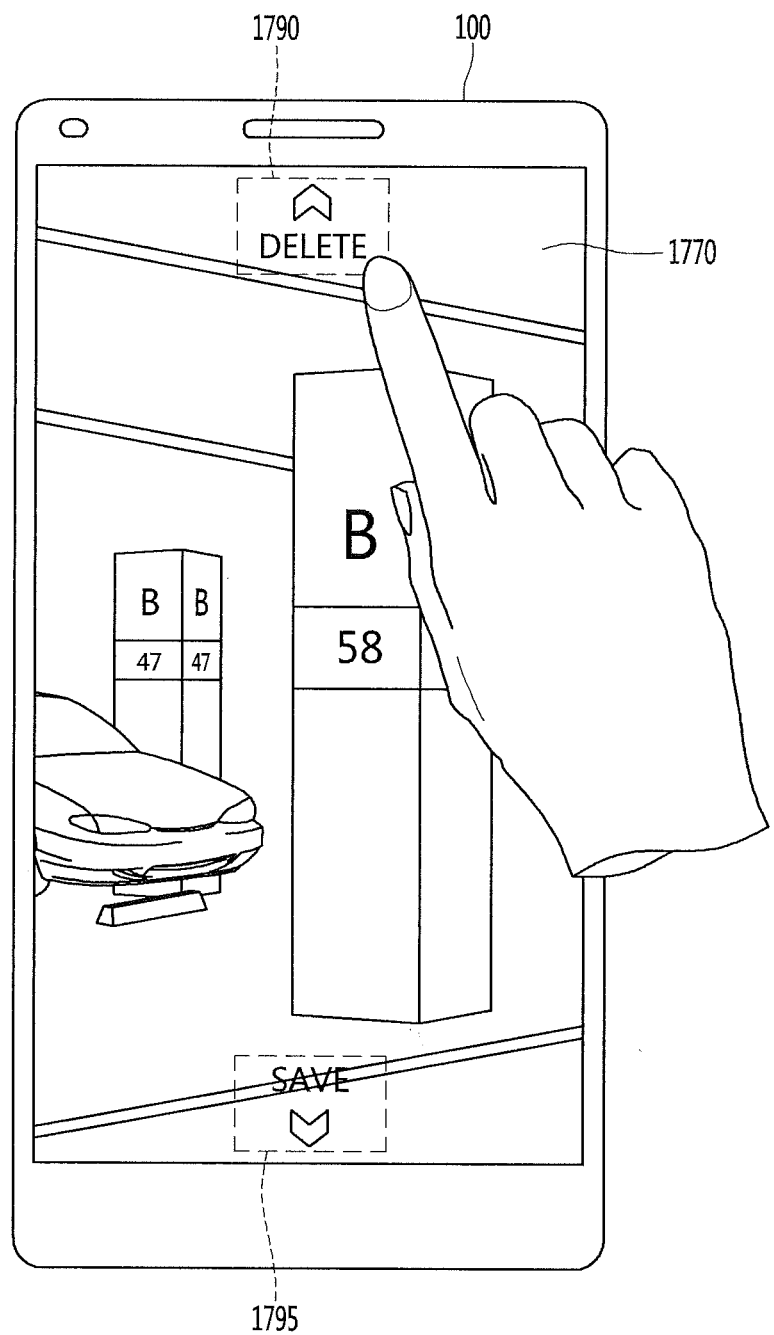

FIG. 17C is a diagram illustrating the third image 1770 displayed on a screen. Although FIG. 17C illustrates that the third image 1770 is displayed in full screen mode, implementations are not limited thereto and the third image 1770 may be displayed in a specific area of the screen of the mobile terminal 100.

In some implementations, when displaying the third image 1770, the control unit 180 may display a menu 1790 for receiving a user input for deleting the third image 1770, and/or a menu 1795 for receiving a user input for saving the third image 1770 in computer memory (e.g., storage unit 170).

Figure 17D:
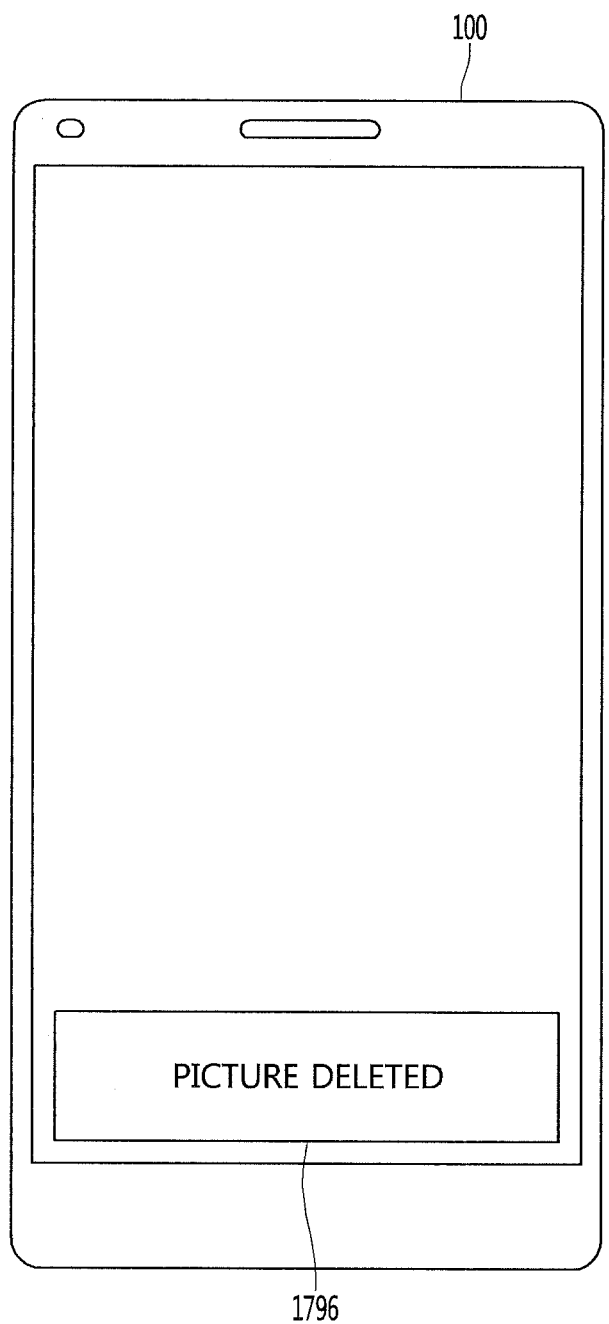

In some implementations, when a user touch input on the menu 1790 for deleting the third image 1770 is received, the control unit 180 may delete the third image 1770 from the storage unit 170 and as shown in FIG. 17D, may display a UI object 1796 for notifying the user that the third image 1770 is deleted.

Additionally, when a user touch input on the menu 1795 for storing the third image 1770 is received, the control unit 180 may maintain the third image 1770 stored in the storage unit 170.

In such a way, an image that a user captures to obtain information or an image captured through a general capturing mode but classified as an image for obtaining information by inputting event information may be provided in a place where a user seeks information.

Additionally, since only a portion of an image for obtaining information may be displayed at the edge of the screen without blocking the entire screen, such implementations may improve user convenience and reduce distractions when a user uses a mobile terminal.

Additionally, by enabling a user to obtain information by using an image that corresponds to that information, implementations described herein may enable easily deleting or replacing an image that loses relevance to that information.

Figure 18B:
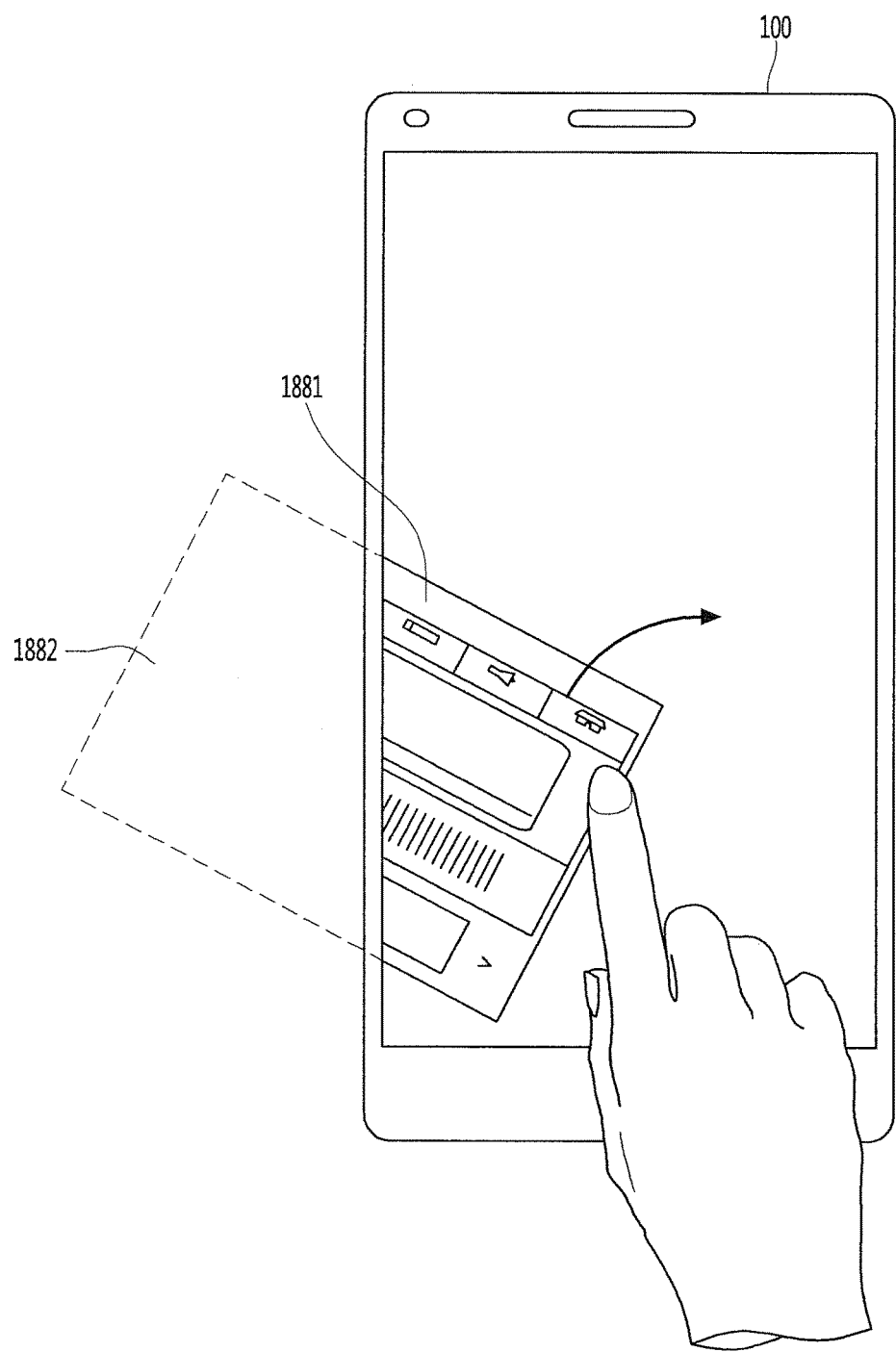

FIGS. 18A and 18B are diagrams illustrating a process of displaying an image when place information stored as event information is wireless signal information.

Referring to the example of FIG. 18A, a plurality of images 1810, 1820, 1830, 1840, 1850, 1860, 1870, and 1880 are stored in the mobile terminal 100. If one of the images is accessed while the mobile terminal 100 is connected to a wireless communication network, then information about the wireless signal may be stored in the event information that is matched to that image. As an example, a user may input event information such as "display the eighth image again when arriving at a B convenience store" with respect to the eighth image 1880. Upon arriving at the "B convenience store," if the mobile terminal 100 detects a wireless signal, then the wireless signal information at the B convenience store may be stored as event information that is matched to the eighth image 1880.

Subsequently, as the mobile terminal 100 moves between different locations, if the mobile terminal 100 detects the particular wireless signal information corresponding to the B convenience store that is stored event information for the eighth image 1880, then the control unit 180 may automatically display the eighth image 1880 corresponding to the occurring event. In this case, the control unit 180, as shown in FIG. 18B, may display a portion 1881 of the eighth image 1880 at the screen edge.

In such a way, implementations described herein enable matching event information, such as wireless signal information, to an image. The event information may correspond to a single location or may correspond to multiple locations that share a common characteristic. For example, when a user matches an "A convenience store" as event information to an "A convenience store discount coupon image," then the "A convenience store discount coupon image" may be displayed in a plurality of "A convenience stores" located in a plurality of locations.

Figure 19:
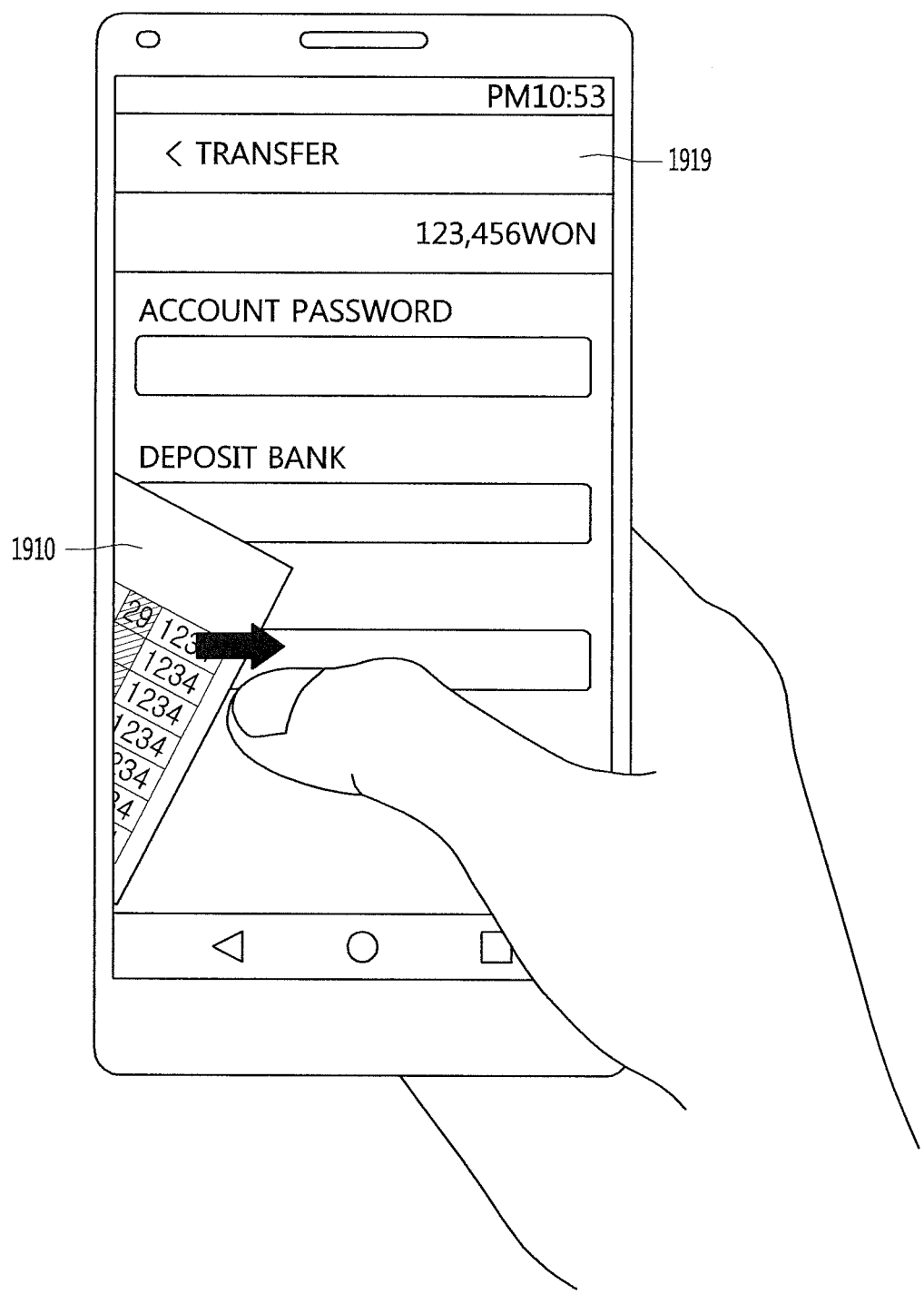
FIG. 19 is a diagram illustrating an example of displaying an image based on the event information indicating an application that is to be displayed with the image.

FIG. 19 is a diagram illustrating a process of displaying an image when application information to be displayed with the image is matched to the image.

A plurality of images stored in the mobile terminal 100 may include images where information on a specific application to be displayed with an image during application execution is matched as event information.

Then, as a user input for executing a specific application is received, the control unit 180 may display an execution screen 1919 of the specific application. Then, the control unit 180 may display a portion 1910 of an image where specific application information is matched as event information when a specific application is executed.

For example, when event information of an "A bank electronic payment application" is matched to a "security card" image and stored, when the "A bank electronic payment application" is executed, the control unit 180 may display the "security card" image together with the execution screen of the "A bank electronic payment application".

In such a way, in a case that specific information is required when a user executes a specific application, by displaying an image corresponding to the specific application, information that a user requires may be provided automatically when an application is executed.

Moreover, the control unit 180 may display an image where specific application information as event information is matched after an authentication on application execution is completed. In more detail, when a specific application is executed and a user authentication for the executed application is required, the control unit 180 may display an image where specific application information as event information is matched together with an application screen after the user authentication is completed. Therefore, an image for requiring security such as an electronic payment security card may be displayed after user authentication is completed.

The above example describes that when place information is matched as event information, application information is matched as event information. However, implementations are not limited thereto. For example, as shown in FIGS. 8A to 8E, in a case that information on a time point that an image is displayed is matched to the image, when an event reaching a specific time point occurs, the control unit 180 may display an image where event information corresponding to the occurring event is matched. For example, as the user input "display a first image on Nov. 26, 2015" is received, when the time point information "Nov. 26, 2015" is matched as event information, the control unit 180 may control the display unit 151 to display the first image on Nov. 26, 2015.

Additionally, the control unit 180 may determine whether an event occurs on the basis of a user input and additional information in a mobile terminal. In relation to this, it will be described in detail with reference to FIGS. 20A to 20C.

Figure 20A:
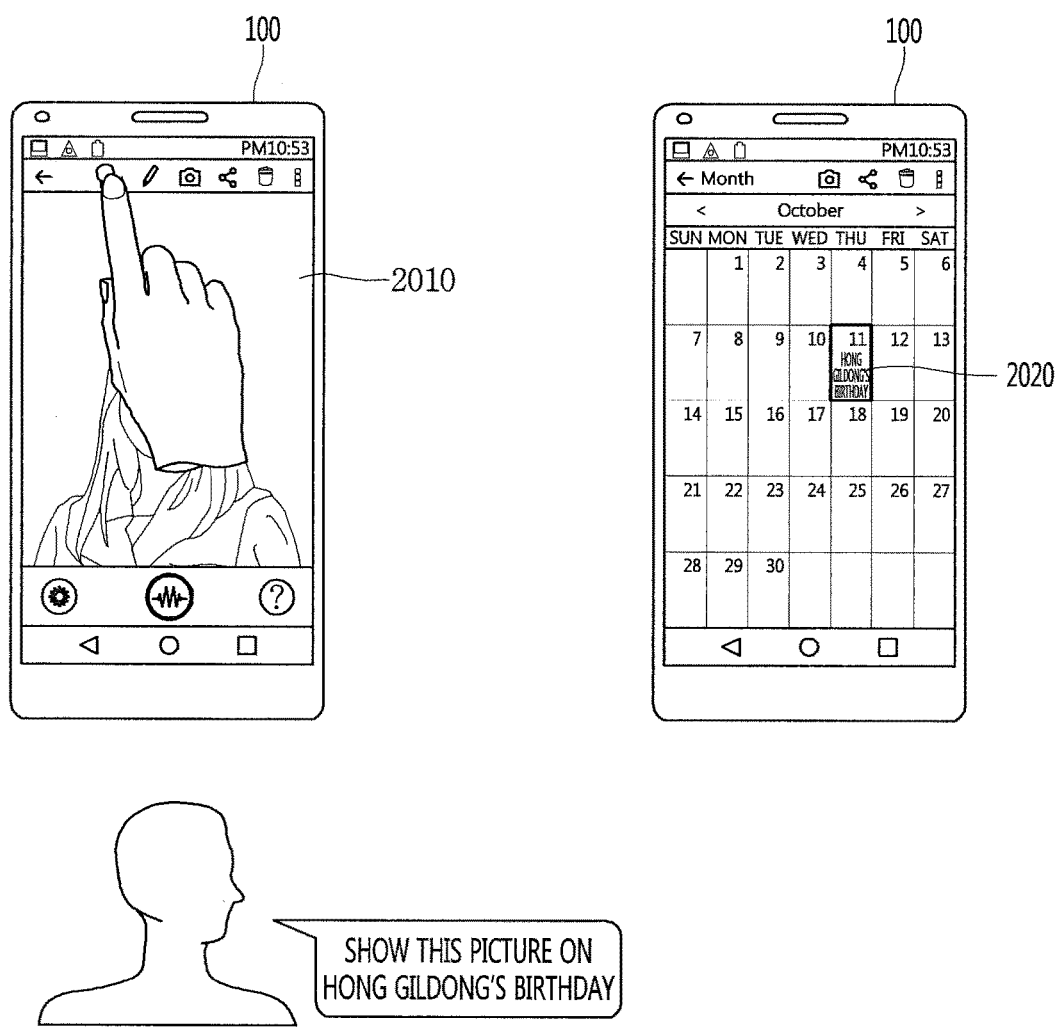
FIGS. 20A to 20C are diagrams illustrating examples of associating event information and determining whether an event occurs on the basis of predetermined information stored in a mobile terminal and based on a user input, according to some implementations.
Figure 20B:
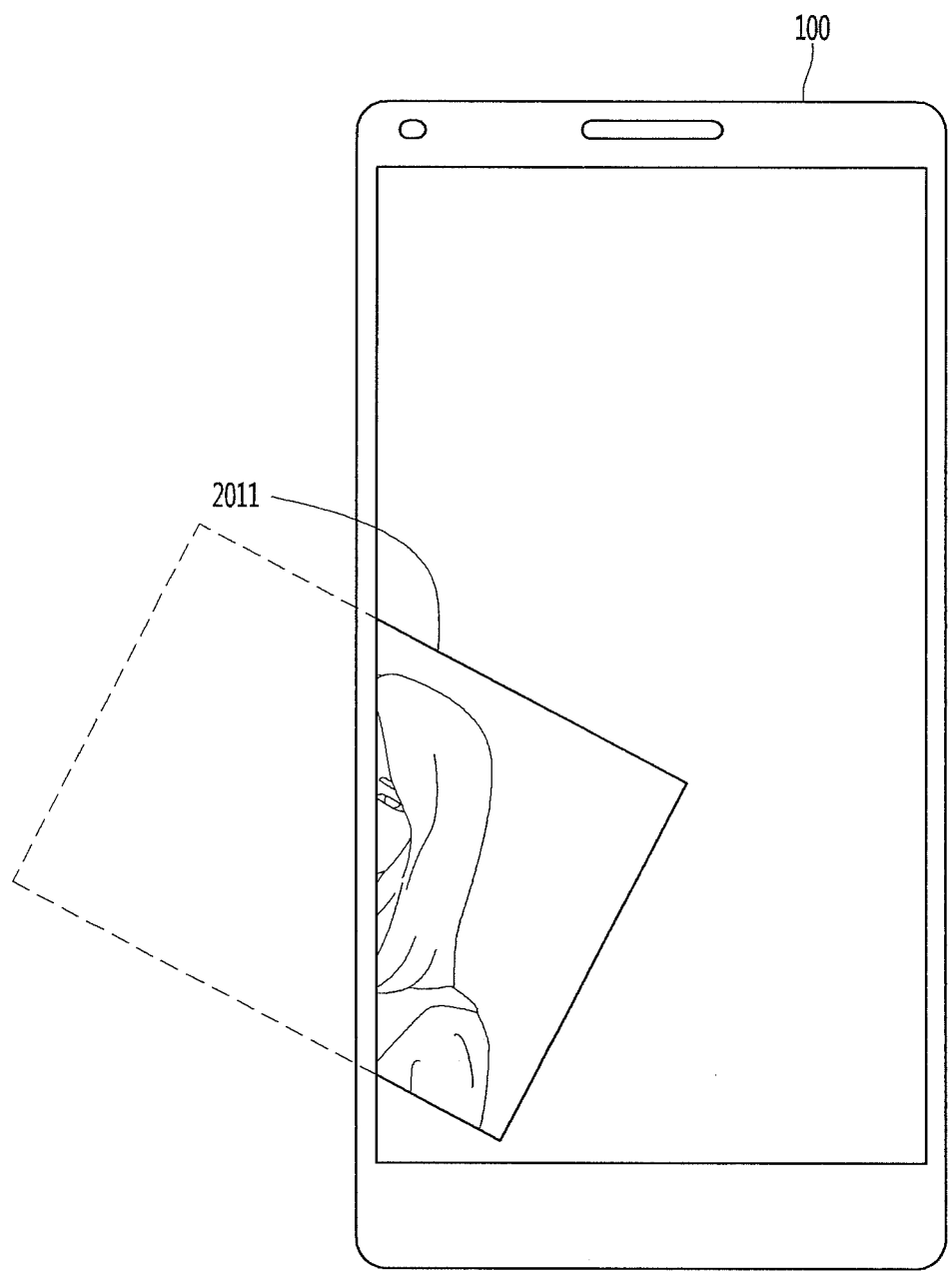
Figure 20C:

FIGS. 20A to 20C are diagrams illustrating a process of matching event information and determining whether an event occurs on the basis of schedule information stored in a mobile terminal and a user input according to some implementations.

The control unit 180 may match event information to a specific image and store it on the basis of a user input and schedule information in a mobile terminal. For example, as shown in FIG. 20A, when a user input for displaying a specific image 2010 on a specific person's birthday is received, the control unit 180 may obtain time information 2020 on the specific person's birthday from schedule information stored in the storage unit 170 and match the obtained time point information as event information to the specific image 2010 and store it.

If a user input for displaying an image again on a Hong Gildong's birthday is received, the control unit 180 may obtain information that the Hong Gildong's birthday is Oct. 11, 2015 from schedule information stored in the storage unit 170 and match the obtained time point information as event information to the specific image 2010 and store it.

Additionally, on Oct. 11, 2015, the control unit 180, as shown in FIG. 20B, may display a portion 2011 of an image where event information Oct. 11, 2015 is matched.

FIG. 20C is a view illustrating that an image 2010 where event information is matched is displayed on a screen as a user touch input on the portion 2011 of the image shown in FIG. 20B is received.

When an event occurs, the control unit 180 may transmit an image corresponding to the occurring event to a mobile terminal of a specific person relating to the occurring event on the basis of at least one of a user input and schedule information in the mobile terminal 100.

For example, when event information "Oct. 11, 2015" is matched to a specific image and an event that it comes to Oct. 11, 2015 occurs, the control unit 180 may transmit an image where a Hong Gildong's birthday is matched as event information to Hong Gildong on the basis of schedule information that the Hong Gildong's birthday is Oct. 11, 2015 and Hong Gildong's phone number information stored in the storage unit 170.

The above example describes the time point information "Oct. 11, 2015" being matched as event information. However, implementations are not limited thereto. For example, the control unit 180 may match time point information "Hong Gildong's birthday" as event information.

Then, in a case that event information "Hong Gildong's birthday" is matched to a specific image, when an event that it comes to Oct. 11, 2015 occurs, the control unit 180 may obtain event occurrence information on a specific image on the basis of the event information "Hong Gildong's birthday" and additional information in the storage unit 170, and display a specific image corresponding to the occurring event.

Additionally, on the basis of Hong Gildong's phone number information stored in the storage unit 170, an image corresponding to the occurring event may be transmitted to a Hong Gildong's mobile terminal.

FIG. 21 is a diagram illustrating a process of displaying additional information on an image displayed when an event occurs.

Referring to FIG. 21, as a specific event occurs, when a user input for obtaining additional information is received in a state that an image corresponding to the specific event is displayed, the control unit 180 may obtain additional information' 2130 relating to the displayed image and display it.

In detail, as a user input for touching a portion 2111 of an image corresponding to an occurring event is received, the control unit 180 may display an image 2110 corresponding to the occurring event.

Then, as a user input for dragging the displayed image 2110 is received, the control unit 180 may display a UI object 2120 for notifying that additional information relating to the image 2110 can be requested.

Moreover, according to a user input for requesting additional information relating to the image 2110, the control unit 180 may obtain the additional information relating to the image 2110 and display the obtained additional information 2130.

In more detail, when a user input for obtaining additional information on the displayed image 2110 is received, the control unit 180 may obtain additional information on the displayed image 2110 through web search using wireless internet and display it.

For example, as shown in FIG. 21, when a user input for searching for an image corresponding to the displayed image 2110 is received, the control unit 180 may search for an image corresponding to an object detected in the displayed image 2110 through a search engine and display a search result.

For another example, when a user input for identifying a location on a map of the displayed image 2110 is received, the control unit 180 may display an image displaying the location of the displayed image 2110 on the map.

FIG. 22 is a diagram illustrating a process of displaying additional information on a displayed image according to another implementation.

When a user input for obtaining additional information relating to the displayed image 2210 is received, the control unit 180 may obtain the additional information relating to the image 2210 and display the obtained additional information 2230.

For example, as shown in FIG. 22, when a user input for comparing the price of an object detected in the displayed image 2210 is received, the control unit 180 may search for price information of a product identical to the object detected in the displayed image 2210 through web search using wireless Internet and display a search result.

Moreover, this implementation describes that additional information is obtained through web search, but implementations are not limited thereto. In more detail, when a user input for obtaining additional information on a displayed image is received, the control unit 180 may obtain additional information on the displayed image by using data stored in the mobile terminal 100 and display it. For example, the control unit 180 may display an image that is classified as the same category as the displayed image. For another example, in a case that an image is displayed as an event that reaches a specific time point occurs, the control unit 180 may display schedule information corresponding to the occurring event in schedule information pre-stored in the storage unit 170, as additional information.

Figure 23A:
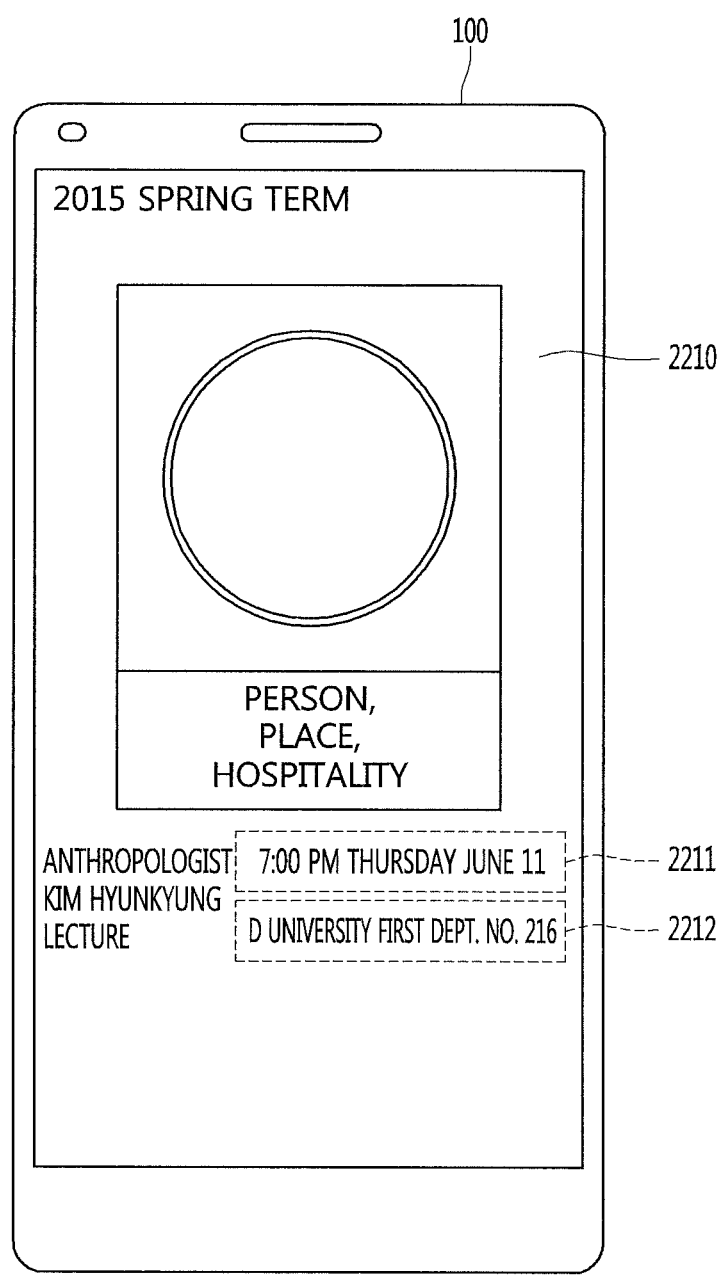
Figure 23B:
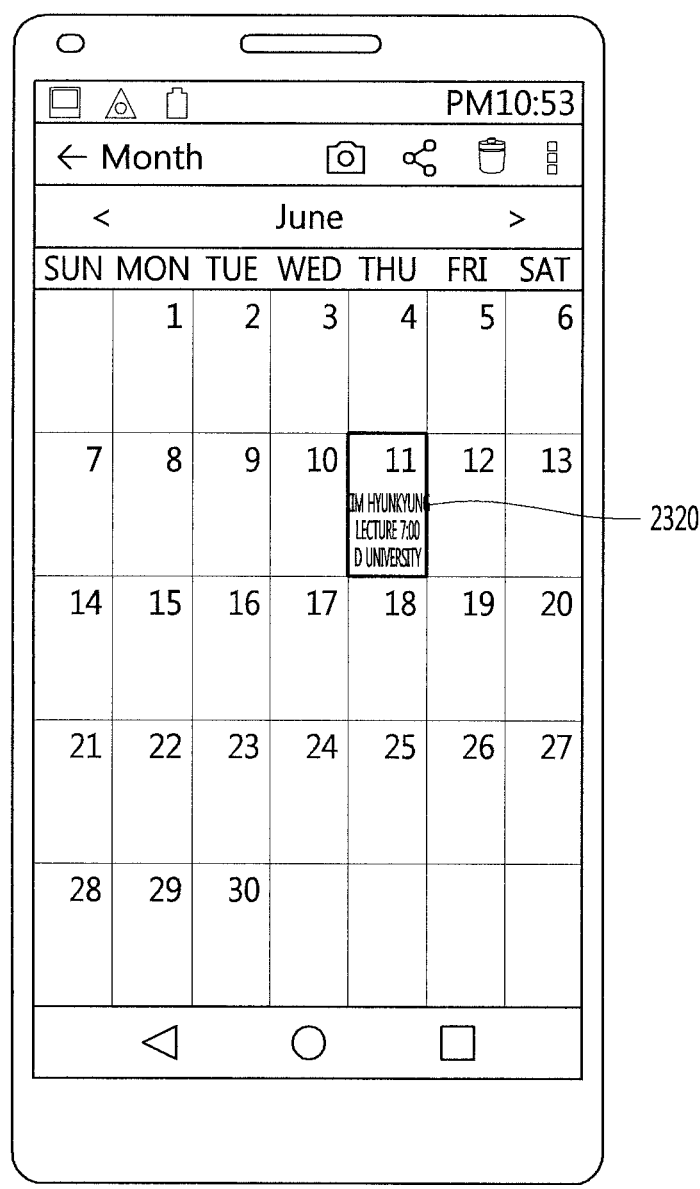

FIGS. 23A to 23C are diagrams illustrating an example of updating a schedule on the basis of a text included in an image captured through a specific image capturing mode.

As shown in FIG. 23A, the control unit 180 may obtain event information on an image captured through a specific capturing mode and match the captured image to the event information and store it. Herein, the event information may be obtained based on a text included in an image captured through a specific capturing mode. For example, the control unit 180 may obtain event information on a time point or a place for displaying an image 2210 by recognizing texts 2211 and 2212 included in the image 2210 captured through a specific capturing mode. The control unit 180 may then match the obtained event information to the image 2210 and store it.

Additionally, the control unit 180, as shown in FIG. 23B, may update schedule information on the basis of the text included in the image (e.g., texts 2211 and 2212 in the image 2210 of FIG. 23A) captured through a specific capturing mode. In more detail, the control unit 180 may obtain time information and location information 2320 from the texts 2211 and 2212 included in the image 2210 captured through a specific capturing mode, and may update schedule information on the basis of the obtained information.

Additionally, when an event occurs, the control unit 180, as shown in FIG. 23C, may control the display unit 151 to display a portion 2311 of an image corresponding to the occurring event.

Figure 24:
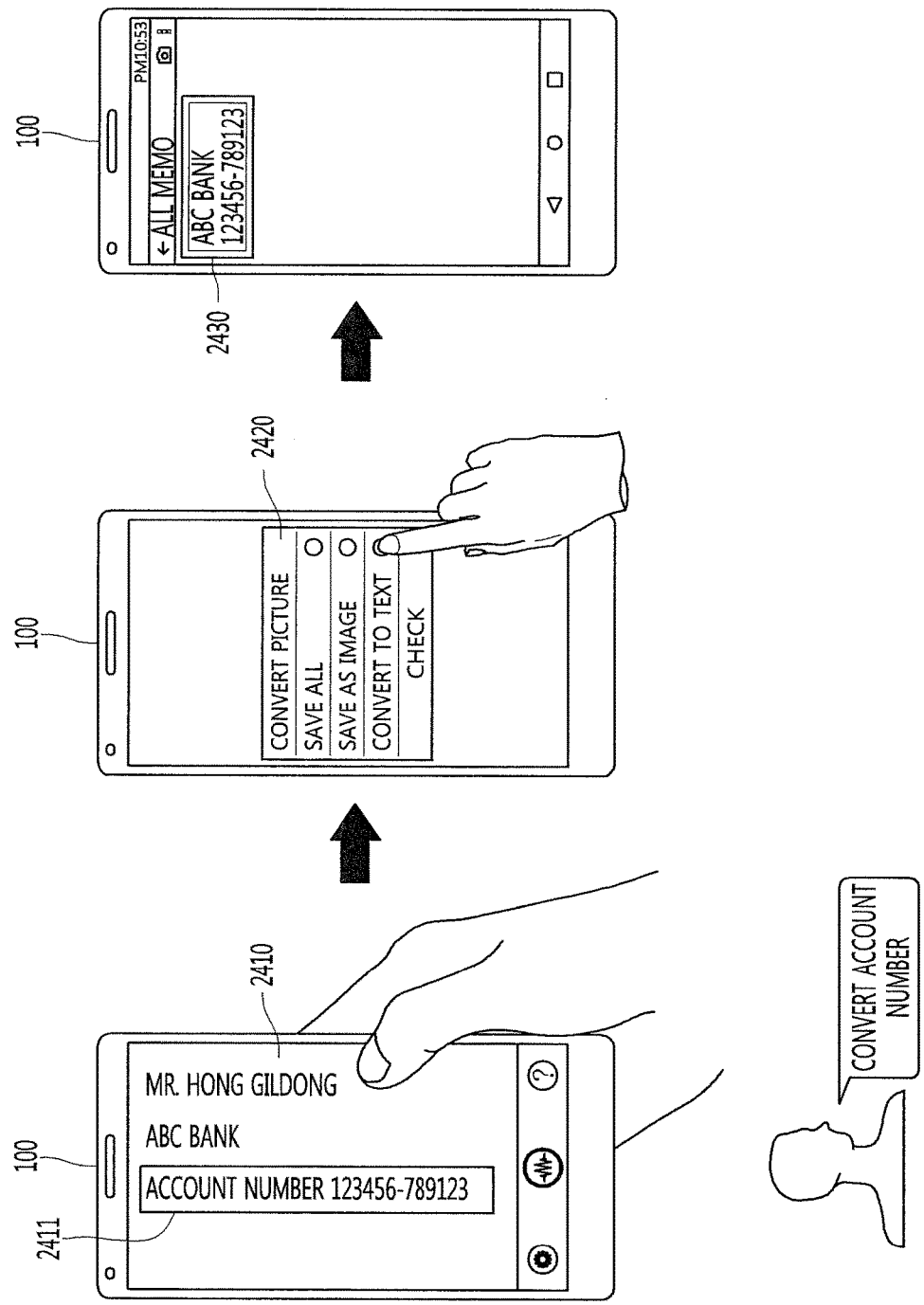
FIG. 24 is a diagram illustrating an example of performing text conversion from an image obtained through a specific image-capturing mode.

FIG. 24 is a diagram illustrating a process of performing text conversion from an image obtained through a specific capturing mode.

The control unit 180 may convert a text image 2411 included in an image 2410 obtained through a specific capturing mode into a text. In more detail, when a user input for converting an image into a text is received, the control unit 180 may display a menu 2420 for setting a method of storing an image. Then, when a user input for a menu for converting the image 2410 into a text is received, the control unit 180 may convert the text image 2411 included in the image 2410 into a text.

An image for providing information may include a text often. Therefore, according to some implementations, as the content of a text included in an image is automatically converted into a text without a user's input again, user's convenience may be improved.

Moreover, the control unit 180, as a component responsible for controlling a device generally, may be used interchangeably with the term of a central processing device, a micro-processor, and a processor.

Implementations may also be implemented as computer readable codes on a computer readable recording medium. The computer readable recording medium is any data storage device that can store data which can be thereafter read by a computer system. Examples of the computer readable recording medium include magnetic storage media (e.g., ROM, floppy disks, hard disks, etc.) and optical recording media (e.g., CD-ROMs, or DVDs) and carrier waves (e.g., transmission through the Internet). Additionally, the computer may include the control unit 180 of a terminal. Accordingly, the detailed description is not construed as being limited in all aspects and should be considered as illustrative. Various modifications of the above examples are included in the scope of this disclosure.

What is claimed is:

1. A mobile terminal comprising:
a memory;
an input interface;
a display; and
a controller configured to:
receive a voice input to input event information relating to an image through the input interface, while the image is displayed;
store, in the memory, the event information relating to the image;
detect an event;
determine that the detected event corresponds to the event information; and
display, on the display, the image related to the event information, based on the detected event corresponding to the event information,
wherein the event information includes at least one of time information indicating a time point at which the image is to be displayed or location information indicating a location where the image is to be displayed,
wherein the controller is configured to receive the voice input to input the event information by: receiving a first voice input to input first event information relating to a first image, wherein the first event information relating to the first image includes first time information indicating a first time point at which the first image is to be displayed, and
wherein the controller is configured to display the image related to the event information by: displaying the first image based on occurrence of the first time point.

2. The mobile terminal according to claim 1, wherein the event information is learned based on at least one of a user input, location of the mobile terminal, a visit history, a wireless signal sensed by the mobile terminal, or information obtained through wired/wireless network.

3. The mobile terminal according to claim 1, wherein the controller is further configured to output a query for obtaining the time point at which the image is to be displayed or the location where the image is to be displayed, based on the time point at which the image is to be displayed or the location where the image is to be displayed not being specified by the voice input.

4. The mobile terminal according to claim 1, further comprising:
a wireless communicator configured to communicate with an external device,
wherein the controller is configured to transmit the displayed image to a specific person's mobile terminal based on the specific person's phone number information stored in the memory.

5. The mobile terminal according to claim 1, wherein the controller is configured to:

store a plurality of event information relating, respectively, to a plurality of images; and display the plurality of images.

6. The mobile terminal according to claim 1, wherein the controller is configured to obtain additional information relating to the displayed image through web search and display the obtained additional information, wherein the additional information includes at least one of an image or price information corresponding to an object detected in the displayed image.

7. The mobile terminal according to claim 6, wherein the object comprises a price tag.

8. The mobile terminal according to claim 1, wherein the controller is further configured to display the obtained image at an edge of a screen of the mobile terminal.

9. The mobile terminal according to claim 1, wherein the event information includes application information indicating an application that is to be displayed together with the obtained image.

10. The mobile terminal according to claim 1, wherein the controller is configured to control the display to display a first portion of the image related to the event information at an edge of a screen of the display, and control the display to display a second portion of the image related to the event information that includes both the first portion and a third portion of the image related to the event information different than the first portion based on a user input to select the displayed first portion being received.

11. The mobile terminal according to claim 10, wherein the controller is further configured to control the display to display a first user interface configured to receive a user input to delete the displayed image and a second user interface configured to receive a user input to store the displayed image.

12. A method of operating a mobile terminal, the method comprising:

receiving a voice input to input event information relating to an image, while the image is displayed;

storing, in a memory, the event information relating to the image;

detecting an event;

determining that the detected event corresponds to the event information; and displaying, on a display, the image related to the event information, based on the detected event corresponding to the event information, wherein the event information includes at least one of time information indicating a time point at which the image is to be displayed or location information indicating a location where the image is to be displayed, wherein the receiving the voice input to input the event information comprises: receiving a first voice input to input first event information relating to a first image, wherein the first event information relating to the first image includes first time information indicating a first time point at which the first image is to be displayed, and wherein the displaying the image related to the event information comprises: displaying the first image based on occurrence of the first time point.

13. The method according to claim 12, wherein the event information is learned based on at least one of an user input, location of the mobile terminal, a visit history, a wireless signal sensed by the mobile terminal, or information obtained through wired/wireless network.

14. The method according to claim 12, wherein receiving the voice input comprises outputting a query for obtaining the time point at which the image is to be displayed or the location where the image is to be displayed, based on the time point at which the image is to be displayed or the location where the image is to be displayed not being specified by the voice input.

15. The method according to claim 12, further comprising:

storing a plurality of event information relating, respectively, to a plurality of images; and displaying the plurality of images.

16. The method according to claim 12, further comprising:

obtaining additional information relating to the displayed image through web search and displaying the obtained additional information, wherein the additional information includes at least one of an image or price information corresponding to an object detected in the displayed image.

17. The method according to claim 12, wherein displaying the image comprises:

displaying a first portion of the image related to the event information at an edge of a screen of the display, and displaying a second portion of the image related to the event information that includes both the first portion and a third portion of the image related to the event information different than the first portion, based on a user input to select the displayed first portion being received.

18. The method according to claim 17, wherein displaying the image comprises:

displaying a first user interface configured to receive a user input to delete the displayed image and a second user interface configured to receive a user input to store the displayed image.

* * * * *